United States Patent
Kahn et al.

(10) Patent No.: US 12,266,959 B2
(45) Date of Patent: Apr. 1, 2025

(54) SAFE BATTERY ENERGY MANAGEMENT SYSTEMS, BATTERY MANAGEMENT SYSTEM NODES, AND METHODS

(71) Applicant: Element Energy, Inc., Menlo Park, CA (US)

(72) Inventors: Seth Marshall Kahn, Sonoma, CA (US); Anthony John Stratakos, Edgartown, MA (US); Corrado Cammi, Mountain View, CA (US); Anderson Rennie John, Santa Clara, CA (US)

(73) Assignee: Element Energy, Inc., Meno Park, CA (US)

( * ) Notice: Subject to any disclaimer, the term of this patent is extended or adjusted under 35 U.S.C. 154(b) by 0 days.

(21) Appl. No.: 18/474,136

(22) Filed: Sep. 25, 2023

(65) Prior Publication Data
US 2024/0014674 A1 Jan. 11, 2024

Related U.S. Application Data

(60) Continuation of application No. 17/495,011, filed on Oct. 6, 2021, now Pat. No. 11,791,642, which is a
(Continued)

(51) Int. Cl.
*H02J 7/00* (2006.01)
*H01M 10/42* (2006.01)

(52) U.S. Cl.
CPC ....... *H02J 7/0036* (2013.01); *H01M 10/4235* (2013.01); *H01M 10/4257* (2013.01); *H02J 7/0063* (2013.01); *H01M 2010/4271* (2013.01)

(58) Field of Classification Search
CPC ...... H02J 7/0036; H02J 7/0063; H02J 7/0013; H02J 7/0018; H02J 7/0031; H02J 7/0048;
(Continued)

(56) References Cited

U.S. PATENT DOCUMENTS

| 6,160,441 A | 12/2000 | Stratakos et al. |
| 6,262,558 B1 | 7/2001 | Weinberg |

(Continued)

FOREIGN PATENT DOCUMENTS

| CA | 2667825 A1 | 5/2008 |
| CN | 109860740 | 6/2019 |

(Continued)

OTHER PUBLICATIONS

Walker, Geoffrey R., et al., "Cascaded DC-DC Converter Connection of Photovoltaic Modules", IEEE Transactions on Power Electronics, vol. 19, No. 4, (Jul. 2004), 1130-1139.
(Continued)

*Primary Examiner* — M Baye Diao
(74) *Attorney, Agent, or Firm* — PdZ Patent Law, PLLC

(57) ABSTRACT

A battery stack includes a plurality of battery management system (BMS) nodes and a controller. Each BMS node includes a battery, an isolation switch configured to selectably isolate the battery of the BMS node from the batteries of the other BMS nodes, and a bypass switch configured to selectably provide a path for electrical current flowing through the battery stack to bypass the battery of the BMS node. The batteries of the BMS nodes are electrically coupled in series. The controller is configured to control the isolation switch and the bypass switch of each BMS node such that the battery of each BMS node can be individually connected to and disconnected from an electrical power source/sink.

20 Claims, 50 Drawing Sheets

Related U.S. Application Data continuation-in-part of application No. 17/212,787, filed on Mar. 25, 2021, now Pat. No. 11,258,279, which is a division of application No. 17/066,238, filed on Oct. 8, 2020, now Pat. No. 10,992,149.

(58) Field of Classification Search
CPC ......... H01M 10/4235; H01M 10/4257; H01M 2010/4271; Y02E 60/10
USPC ...................................................... 320/135
See application file for complete search history.

(56) References Cited

U.S. PATENT DOCUMENTS

| | | | |
|---|---|---|---|
| 6,445,244 B1 | 9/2002 | Stratakos et al. | |
| 6,777,953 B2 | 8/2004 | Blades | |
| 6,835,491 B2 | 12/2004 | Gartstein et al. | |
| 6,876,203 B2 | 4/2005 | Blades | |
| 6,984,970 B2 | 1/2006 | Capel | |
| 7,068,017 B2 | 6/2006 | Willner et al. | |
| 7,142,407 B2 * | 11/2006 | Sibrai | B60R 21/0173 361/247 |
| 7,391,218 B2 | 6/2008 | Kojori et al. | |
| 8,158,877 B2 | 4/2012 | Klein et al. | |
| 8,395,519 B2 | 3/2013 | Cassidy | |
| 8,503,137 B2 | 8/2013 | Panetta | |
| 8,643,216 B2 * | 2/2014 | Lattin | H01M 10/441 307/65 |
| 8,686,693 B2 | 4/2014 | Bhowmik et al. | |
| 8,697,267 B2 | 4/2014 | Colello et al. | |
| 8,810,199 B2 | 8/2014 | Roeper | |
| 8,817,431 B2 | 8/2014 | Tomimbang | |
| 8,837,097 B2 | 9/2014 | Zuercher et al. | |
| 8,879,218 B2 | 11/2014 | Tomimbang | |
| 9,084,333 B2 * | 7/2015 | Chandran | H05B 45/30 |
| 9,132,734 B2 | 9/2015 | Auguet et al. | |
| 9,172,120 B2 | 10/2015 | Pariseau et al. | |
| 9,257,729 B2 | 2/2016 | Hermann | |
| 9,331,497 B2 | 5/2016 | Beaston | |
| 9,425,631 B2 | 8/2016 | Furtner | |
| 9,515,496 B1 | 12/2016 | Ying | |
| 9,564,762 B2 | 2/2017 | Lee et al. | |
| 9,705,341 B2 | 7/2017 | Komatsu et al. | |
| 9,806,545 B2 | 10/2017 | Fink | |
| 9,865,901 B2 | 1/2018 | Hwang | |
| 9,893,385 B1 | 2/2018 | Nayar et al. | |
| 9,965,007 B2 | 5/2018 | Amelio et al. | |
| 10,018,682 B2 | 7/2018 | Kaupp et al. | |
| 10,153,651 B2 | 12/2018 | Taylor et al. | |
| 10,270,262 B2 | 4/2019 | Kim et al. | |
| 10,347,952 B2 * | 7/2019 | Choi | G01R 31/3648 |
| 10,553,851 B2 | 2/2020 | Kim | |
| 10,714,974 B2 | 7/2020 | Clifton et al. | |
| 10,777,851 B2 | 9/2020 | Razzell | |
| 10,804,690 B2 * | 10/2020 | Ronne | H02H 1/0007 |
| 10,928,461 B1 | 2/2021 | Stafl | |
| 10,992,149 B1 | 4/2021 | Kahn et al. | |
| 11,043,821 B2 | 6/2021 | Nishikawa et al. | |
| 11,061,076 B1 | 7/2021 | Fasching et al. | |
| 11,258,279 B1 | 2/2022 | Kahn et al. | |
| 11,664,670 B1 | 5/2023 | Devie et al. | |
| 11,699,909 B1 | 7/2023 | Kahn et al. | |
| 11,735,934 B2 | 8/2023 | Kahn et al. | |
| 11,791,642 B2 * | 10/2023 | Kahn | H02J 7/0018 320/135 |
| 2005/0121067 A1 | 6/2005 | Toyomura et al. | |
| 2005/0139258 A1 | 6/2005 | Liu et al. | |
| 2005/0151513 A1 | 7/2005 | Cook et al. | |
| 2007/0223165 A1 | 9/2007 | Itri et al. | |
| 2008/0236648 A1 | 10/2008 | Klein et al. | |
| 2008/0303503 A1 | 12/2008 | Wolfs | |
| 2009/0284078 A1 | 11/2009 | Zhang et al. | |
| 2009/0284232 A1 | 11/2009 | Zhang et al. | |
| 2009/0284240 A1 | 11/2009 | Zhang et al. | |
| 2009/0284998 A1 | 11/2009 | Zhang et al. | |
| 2010/0207455 A1 | 8/2010 | Erickson, Jr. et al. | |
| 2010/0213897 A1 | 8/2010 | Tse | |
| 2010/0253150 A1 | 10/2010 | Porter et al. | |
| 2010/0288327 A1 | 11/2010 | Lisi et al. | |
| 2010/0305770 A1 | 12/2010 | Bhowmik et al. | |
| 2010/0327659 A1 | 12/2010 | Lisi et al. | |
| 2011/0062784 A1 | 3/2011 | Wolfs | |
| 2011/0090607 A1 | 4/2011 | Luebke et al. | |
| 2011/0141644 A1 | 6/2011 | Hastings et al. | |
| 2011/0234173 A1 | 9/2011 | Kao et al. | |
| 2011/0301772 A1 | 12/2011 | Zuercher et al. | |
| 2012/0013201 A1 | 1/2012 | Pariseau et al. | |
| 2012/0043818 A1 | 2/2012 | Stratakos et al. | |
| 2012/0043823 A1 | 2/2012 | Stratakos et al. | |
| 2012/0043923 A1 | 2/2012 | Ikriannikov et al. | |
| 2012/0044014 A1 | 2/2012 | Stratakos et al. | |
| 2012/0089266 A1 | 4/2012 | Tomimbang et al. | |
| 2012/0112760 A1 | 5/2012 | Yoscovich et al. | |
| 2012/0119746 A1 | 5/2012 | Macris | |
| 2012/0133521 A1 | 5/2012 | Rothkopf et al. | |
| 2012/0313560 A1 | 12/2012 | Hambitzer et al. | |
| 2013/0092208 A1 | 4/2013 | Robbins | |
| 2013/0106194 A1 | 5/2013 | Jergovic et al. | |
| 2013/0170084 A1 | 7/2013 | Strobl et al. | |
| 2013/0176401 A1 | 7/2013 | Monari et al. | |
| 2013/0234669 A1 | 9/2013 | Huang et al. | |
| 2013/0257323 A1 | 10/2013 | Diamond et al. | |
| 2014/0253045 A1 | 9/2014 | Poznar | |
| 2014/0300274 A1 * | 10/2014 | Acatrinei | H05B 45/3578 315/122 |
| 2014/0368205 A1 | 12/2014 | Svensson et al. | |
| 2014/0373894 A1 | 12/2014 | Stratakos et al. | |
| 2015/0115736 A1 | 4/2015 | Snyder | |
| 2015/0171628 A1 | 6/2015 | Ponec et al. | |
| 2015/0377976 A1 | 12/2015 | Maluf et al. | |
| 2016/0093921 A1 * | 3/2016 | Kadirvel | H02J 7/00308 429/61 |
| 2016/0226263 A1 * | 8/2016 | Seo | H02J 7/005 |
| 2016/0261127 A1 | 9/2016 | Worry et al. | |
| 2016/0311328 A1 | 10/2016 | Kim et al. | |
| 2016/0372940 A1 | 12/2016 | Canadi | |
| 2017/0054134 A1 | 2/2017 | Choi et al. | |
| 2017/0123008 A1 | 5/2017 | Frias et al. | |
| 2018/0147947 A1 | 5/2018 | Gebhart | |
| 2018/0252195 A1 | 9/2018 | Ciaccio et al. | |
| 2019/0198938 A1 | 6/2019 | Fujita et al. | |
| 2019/0212383 A1 | 7/2019 | Elliott | |
| 2019/0361075 A1 | 11/2019 | Lee et al. | |
| 2020/0021107 A1 | 1/2020 | Collins et al. | |
| 2020/0127489 A1 | 4/2020 | Chen et al. | |
| 2020/0161875 A1 | 5/2020 | Nishikawa et al. | |
| 2020/0207219 A1 | 7/2020 | Slepchenkov et al. | |
| 2020/0212959 A1 | 7/2020 | Eriksen et al. | |
| 2020/0254882 A1 | 8/2020 | Kwon | |
| 2020/0350779 A1 | 11/2020 | Tikhonski et al. | |
| 2021/0044119 A1 | 2/2021 | Poland et al. | |
| 2021/0096398 A1 | 4/2021 | Hekmat et al. | |
| 2021/0119455 A1 | 4/2021 | Jaipaul et al. | |
| 2022/0294238 A1 * | 9/2022 | Liu | H02J 7/0063 |
| 2023/0011716 A1 | 1/2023 | Kahn et al. | |

FOREIGN PATENT DOCUMENTS

| | | | |
|---|---|---|---|
| EP | 0762591 A2 | 3/1997 | |
| EP | 2721685 B1 * | 7/2018 | B60L 50/64 |
| EP | 3550581 A1 | 10/2019 | |
| EP | 35999653 A1 | 1/2020 | |
| WO | 2013053445 A1 | 4/2013 | |
| WO | 2015200366 A1 | 12/2015 | |

OTHER PUBLICATIONS

Wolfs, Peter, et al., "Distributed Maximum Power Tracking for High Performance Vehicle Solar Arrays", Australian Universities Power Engineering Conference (AUPEC 2004), (Sep. 2004), 6 pgs.
Machine Translation of WO 2013053445, 11 pages.

(56) References Cited

OTHER PUBLICATIONS

Machine Translation of CN 109860740, 24 pages.

* cited by examiner $V_{Stack} = V_1 + V_2 + V_3 \ldots + V_N + V_{Arc}$

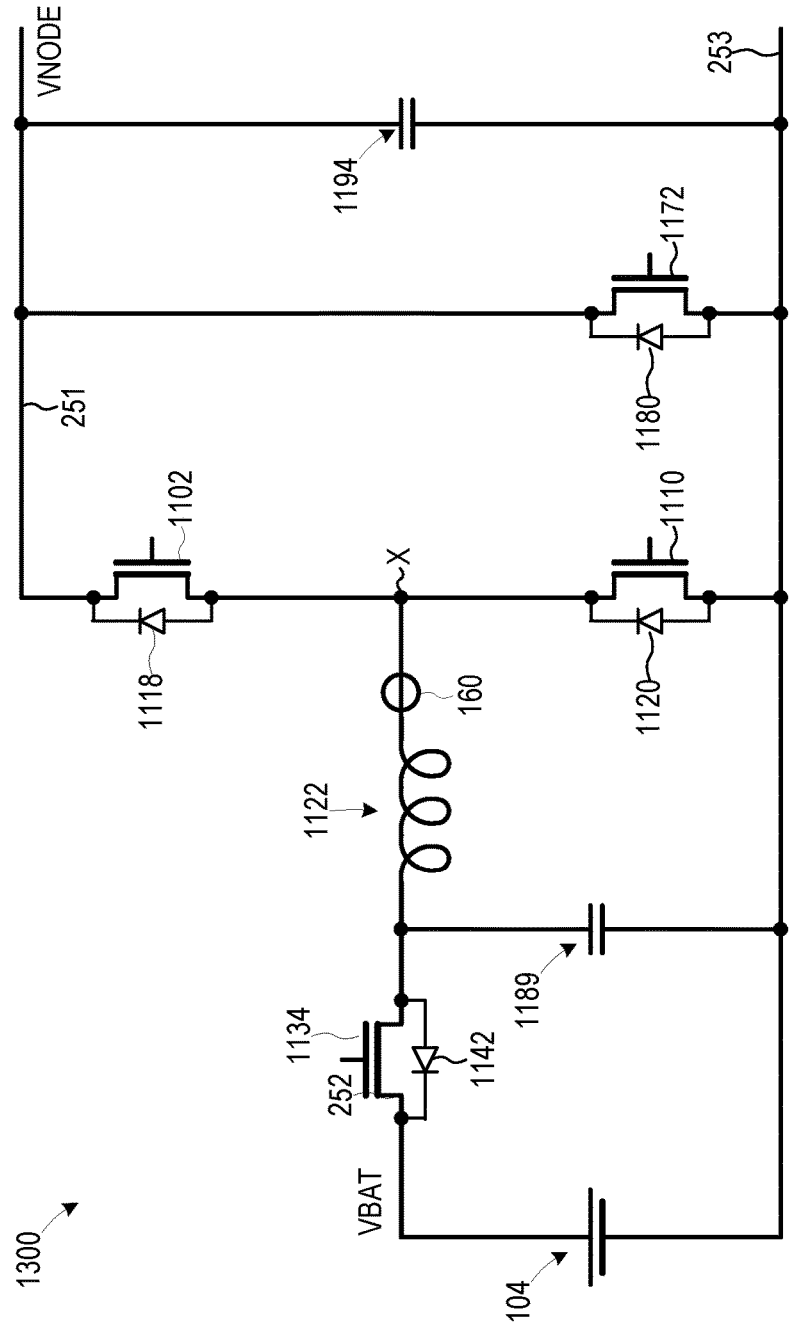
FIG. 13C
FIG. 13A
FIG. 13B

SAFE BATTERY ENERGY MANAGEMENT SYSTEMS, BATTERY MANAGEMENT SYSTEM NODES, AND METHODS

RELATED APPLICATIONS

This application is a continuation of U.S. patent application Ser. No. 17/495,011, filed on Oct. 6, 2021, which is a continuation-in-part of U.S. patent application Ser. No. 17,212,787, filed on Mar. 25, 2021, now U.S. Pat. No. 11,258,279, which is a divisional of U.S. patent application Ser. No. 17/066,238, filed on Oct. 8, 2020, now U.S. Pat. No. 10,992,149. Each of the aforementioned patent applications is incorporated herein by reference.

BACKGROUND

Battery packs, or arrangements of multiple battery devices coupled together, are used as power sources in a wide range of devices. A battery management system can be used to keep individual single battery devices of a battery pack within their safe operating ranges by monitoring physical quantities such as charge, current, voltage and temperature. Based on these quantities, not only can a battery device be operated safely, but also state of charge and state of health can be determined. A battery management system also performs battery cell balancing. In a battery stack, single battery cells can be arranged in parallel and in series in order to achieve a required capacity and operating voltage. Battery manufacturers attempt to provide stacks with identical battery cells, but this generally is not physically possible. Battery cells, even if accurately manufactured and selected, usually show at least slight differences from each other. Any mismatch in capacity between the battery cells within a pack can result in a reduction of the overall pack capacity. Even small differences lead to different charge or discharge levels, with the weakest battery cell in a stack disproportionately affecting overall stack performance. Energy management systems also are used for battery cell balancing, which involves techniques to equalize the voltage and state of charge among the battery cells when they are at full charge.

SUMMARY

In a first aspect, a method for hierarchical arc fault monitoring in an energy storage system including a plurality of stacks electrically coupled together, where each stack includes a plurality of battery management system nodes that are electrically coupled together, includes the following steps: (1) obtaining respective electrical measurement values for each stack; (2) determining, for each stack, that the stack is free of arc faults, using the respective electrical measurement values for the stack; (3) obtaining electrical measurement values for the energy storage system; and (4) determining that the energy storage system is free of arc faults outside of the plurality of stacks, using (a) the electrical measurement values for the energy storage system and (b) a subset of the respective electrical measurement values for each stack.

In an embodiment of the first aspect, the method further includes obtaining the respective electrical measurement values for each stack and the electrical measurement values for the energy storage system at a common time.

In another embodiment of the first aspect, obtaining the respective electrical measurement values for each stack includes, for a first stack of the plurality of stacks: (1) sending a measurement command to each battery management system node of the first stack; and (2) simultaneously obtaining one or more respective electrical measurement values for each battery management system node of the first stack at a common time prescribed by the measurement command.

In another embodiment of the first aspect, the method further includes propagating electrical measurement values for a first node of the plurality of battery management system nodes through at least one other node of the plurality of battery management system nodes.

In another embodiment of the first aspect, obtaining the respective electrical measurement values for each stack includes, for a first stack of the plurality of stacks: (1) sending a measurement command to each battery management system node of the first stack; and (2) at each battery management system node of the first stack, obtaining, from storage of the battery management system node, one or more respective saved electrical measurement values corresponding to a time prescribed by the measurement command.

In another embodiment of the first aspect, the method further includes determining, for each stack, that the stack is free of series arc faults in response to a sum of voltages across each battery management system node of the stack being consistent with a measured voltage across the stack.

In another embodiment of the first aspect, the method further includes (1) determining that a series arc fault has occurred in a first stack of the plurality of stacks in response to a mismatch between a sum of voltages across each battery management system node of the first stack and a measured voltage across the first stack; and (2) in response to determining that the series arc fault has occurred in the first stack, transitioning the first stack from an operational mode to a floating mode by isolating a respective battery in each battery management system node of the first stack.

In another embodiment of the first aspect, the method further includes determining that the energy storage system is free of series arc faults outside the plurality of stacks in response to a measured voltage across a load electrically coupled to the energy storage system being consistent with respective measured voltages across each stack.

In another embodiment of the first aspect, the load is capable of both receiving electrical power from the energy storage system and providing electrical power to the energy storage system.

In another embodiment of the first aspect, the method further includes determining that an arc fault has occurred in series with a first stack of the plurality of stacks in response to a mismatch between the measured voltage across the load and a measured voltage across the first stack.

In another embodiment of the first aspect, the method further includes transitioning the first stack from an operational mode to a floating mode by isolating the first stack from remaining stacks of the plurality of stacks, in response to determining that the arc fault has occurred in series with the first stack.

In another embodiment of the first aspect, the method further includes transitioning the first stack from an operational mode to a safe mode by reducing one or more of a voltage and a current of the first stack, in response to determining that the arc fault has occurred in series with the first stack.

In another embodiment of the first aspect, the method further includes determining, for each stack, that the stack is free of parallel arc faults in response to respective measured currents flowing through each battery management system node of the stack being consistent with a measured current flowing through the stack.

In another embodiment of the first aspect, the method further includes determining, for a first stack of the plurality of stacks, that a parallel electrical arc has occurred between two battery management system nodes of the first stack, in response to a mismatch between respective currents flowing through the two battery management system nodes of the first stack.

In another embodiment of the first aspect, the method further includes, in response to determining that the parallel arc fault has occurred between the two battery management system nodes of the first stack, transitioning the first stack from an operational mode to a floating mode by isolating a respective battery in each battery management system node of the first stack.

In another embodiment of the first aspect, the method further includes determining that the energy storage system is free of parallel arc faults outside the plurality of stacks in response to a measured current through a load electrically coupled to the energy storage system being consistent with respective measured currents flowing through each stack.

In another embodiment of the first aspect, the method further includes transitioning each stack from an operational mode to a safe mode by reducing one or more of a respective voltage and a respective current of each stack, in response to determining that a parallel arc fault has occurred in the battery management system outside of the plurality of stacks.

In another embodiment of the first aspect, the method further includes (1) removing power conversion switching noise and associated harmonics from the respective electrical measurement values for each stack, before determining, for each stack, that the stack is free of arc faults; and (2) removing power conversion switching noise and associated harmonics from the electrical measurement values for the energy storage system, before determining that the energy storage system is free of arc faults outside of the plurality of stacks.

In another embodiment of the first aspect, (1) removing power conversion switching noise and associated harmonics from the respective electrical measurement values for each stack is performed using a first low-pass filter; (2) removing power conversion switching noise and associated harmonics from the electrical measurement values for the energy storage system is performed using a second low-pass filter; and (3) the first and second low-pass filters have substantially the same bandwidth.

In a second aspect, an energy storage system includes (1) a plurality of stacks electrically coupled together, each stack including a plurality of battery management system nodes that are electrically coupled together; and (2) a control subsystem configured to (1) obtain respective electrical measurement values for each stack, (2) determine, for each stack, that the stack is free of arc faults, using the respective electrical measurement values for the stack, (3) obtain electrical measurement values for the energy storage system, and (4) determine that the energy storage system is free of arc faults outside of the plurality of stacks, using (i) the electrical measurement values for the energy storage system and (ii) a subset of the respective electrical measurement values for each stack.

In an embodiment of the second aspect, the control subsystem is further configured to determine, for each stack, that the stack is free of series arc faults in response to a sum of voltages across each battery management system node of the stack being consistent with a measured voltage across the stack.

In another embodiment of the second aspect, the control subsystem is further configured to determine that energy storage system is free of series arc faults outside the plurality of stacks in response to a measured voltage across a load electrically coupled to the energy storage system being consistent with respective measured voltages across each stack.

In another embodiment of the second aspect, the control subsystem is further configured to determine, for each stack, that the stack is free of parallel arc faults in response to respective measured currents flowing through each battery management system node of the stack being consistent with a measured current flowing through the stack.

In another embodiment of the second aspect, the control subsystem is further configured to determine that energy storage system is free of parallel arc faults outside the plurality of stacks in response to a measured current through a load electrically coupled to the energy storage system being consistent with respective measured currents flowing through each stack.

In a third aspect, a method for managing an energy storage system, including a stack of a plurality of battery management system nodes that are electrically coupled together, includes the following steps: (1) sending a measurement command to each battery management system node; (2) at each battery management system node, in response to the measurement command, obtaining one or more respective electrical measurement values for the battery management system node, each of the one or more respective electrical measurement values for the battery management system node corresponding to a time prescribed by the measurement command; and (3) using the one or more respective electrical measurement values for each battery management system node, managing at least one aspect of the energy storage system.

In an embodiment of the third aspect, the method further includes simultaneously obtaining the one or more respective electrical measurement values for each battery management system node.

In another embodiment of the third aspect, the method further includes propagating electrical measurement values for a first node of the plurality of battery management system nodes through at least one other node of the plurality of battery management system nodes.

In another embodiment of the third aspect, the method further includes obtaining the one or more respective electrical measurement values for each battery management system node from respective storage of the battery management system node.

In another embodiment of the third aspect, managing at least one aspect of the energy storage system comprises determining that the stack is free of arc faults, using the one or more respective electrical measurement values for each battery management system node.

In another embodiment of the third aspect, the method further includes determining that the stack is free of series arc faults in response to a sum of voltages across each battery management system node being consistent with a measured voltage across the stack.

In another embodiment of the third aspect, the method further includes determining that the stack is free of parallel arc faults in response to respective measured currents flowing through each battery management system node being consistent with a measured current flowing through the stack.

In another embodiment of the third aspect, managing at least one aspect of the energy storage system includes controlling at least one of charging and discharging of respective batteries of the plurality of battery management system nodes.

In a fourth aspect, an energy storage system includes (1) a stack including a plurality of battery management system nodes that are electrically coupled together, each battery management system node being configured to, in response to a measurement command, obtain one or more respective electrical measurement values for the battery management system node, each of the one or more respective electrical measurement values for the battery management system node corresponding to a time prescribed by the measurement command; and (2) a control subsystem configured to: (a) send the measurement command to each battery management system node, and (b) manage at least one aspect of the energy storage system, using the one or more respective electrical measurement values for each battery management system node.

In an embodiment of the fourth aspect, the control subsystem is further configured to manage at least one aspect of the energy storage system by determining that the stack is free of arc faults, using the one or more respective electrical measurement values for each battery management system node.

In another embodiment of the fourth aspect, the control subsystem is further configured to manage at least one aspect of the energy storage system by controlling at least one of charging and discharging of respective batteries of the plurality of battery management system nodes.

In a fifth aspect, a method for addressing an arc fault in an energy storage system, including a stack of a plurality of battery management system nodes that are electrically coupled together, includes the following steps: (1) determining that an arc fault has occurred in the stack; and (2) in response to determining that the arc fault has occurred in the stack, electrically isolating a respective battery of each battery management system node at least partially by opening a respective isolation switch electrically coupled to the battery.

In an embodiment of the fifth aspect, the method further includes causing the stack to operate in a floating mode by causing a respective node output shorting switch electrically coupled across an output port of each battery management system node to operate in its off state, in response to determining that the arc fault has occurred in the stack.

In another embodiment of the fifth aspect, the arc fault in the stack is a series arc fault in the stack, and the method further includes (1) obtaining electrical measurement values for the stack; and (2) determining that the series arc fault has occurred in the stack in response to a mismatch between a sum of voltages across each battery management system node of the stack and a measured voltage across the stack.

In another embodiment of the fifth aspect, the method further includes (1) sending a measurement command to each battery management system node; and (2) at each battery management system node, in response to the measurement command, obtaining a respective subset of the electrical measurement values for the stack, each subset of the electrical measurement values for the stack corresponding to a time prescribed by the measurement command.

In another embodiment of the fifth aspect, the method further includes propagating electrical measurement values for a first node of the plurality of battery management system nodes through at least one other node of the plurality of battery management system nodes.

In another embodiment of the fifth aspect, the method further includes removing power conversion switching noise and associated harmonics from the electrical measurement values for the stack, before determining that the series arc fault has occurred in the stack.

In another embodiment of the fifth aspect, the arc fault in the stack is a parallel arc fault in the stack, and the method further includes (1) obtaining electrical measurement values for the stack, and (2) determining that the parallel electrical arc fault has occurred in the stack in response to a mismatch between respective currents flowing through two battery management system nodes of the stack.

In another embodiment of the fifth aspect, the method further includes removing power conversion switching noise and associated harmonics from the electrical measurement values for the stack, before determining that the parallel arc fault has occurred in the stack.

In another embodiment of the fifth aspect, the method further includes performing a controlled discharge of each battery within its respective battery management system node, in response to determining that the arc fault has occurred in the stack.

In a sixth aspect, a method for safe operation of an energy storage system, including at least a first stack of a plurality of battery management system nodes with respective output ports electrically coupled in series, includes the following steps: (a) causing the battery management system nodes to operate in respective operational modes, such that each battery management system node is capable of providing electric power to a load electrically coupled to the energy storage system; and (b) in response to a signal for the first stack to operate in a safe mode, causing a first subset of the battery management system nodes to operate in respective bypass modes, while causing a second subset of the battery management system nodes to continue to operate in respective operational modes, to reduce at least one of a voltage and a current of the first stack.

In an embodiment of the sixth aspect, causing the first subset of the battery management system nodes to operate in respective bypass modes includes, for each battery management system node of the first subset, the following steps: (1) isolating a battery of the battery management system node from a direct-current to direct-current (DC-DC) converter of the battery management system node; and (2) electrically short circuiting an output port of the battery management system node.

In another embodiment of the sixth aspect, causing the second subset of the battery management system nodes to continue to operate in respective operational modes includes, for each battery management system node of the second subset, causing a DC-DC converter of the battery management system node to transform a battery voltage to a voltage across an output port of the battery management system node.

In another embodiment of the sixth aspect, each battery management system node of the first stack is a member of either the first subset of the battery management system nodes or the second subset of the battery management system nodes.

In another embodiment of the sixth aspect, the method further includes changing a division of battery management system nodes of the first stack between the first and second subsets of battery management system nodes.

In another embodiment of the sixth aspect, the method further includes periodically changing the division of battery management system nodes of the first stack between the first and second subsets of battery management system nodes.

In another embodiment of the sixth aspect, the method further includes changing the division of battery management system nodes of the first stack between the first and second subsets in response to a signal to change one or more of a voltage and a current of the first stack.

In another embodiment of the sixth aspect, the method further includes generating the signal for the first stack to operate in the safe mode in response to detection of a fault in the energy storage system outside of the first stack.

In another embodiment of the sixth aspect, the fault in the energy storage system is an arc fault in the energy storage system outside of the first stack.

In another embodiment of the sixth aspect, the fault in the energy storage system is a failure of a communication subsystem in the energy storage system.

In another embodiment of the sixth aspect, the method further includes generating the signal for the first stack operate in the safe mode in response to a user command.

In a seventh aspect, a method for safe operation of an energy storage system, including at least a first stack of a plurality of battery management system nodes with respective output ports electrically coupled in series, includes the following steps: (1) causing the battery management system nodes to operate in respective operational modes, such that each battery management system node is capable of providing electric power to a load electrically coupled to the energy storage system; and (2) in response to a failure of a communication subsystem of the energy storage system, causing the first stack to operate in either a bypass mode or a floating mode.

In an embodiment of the seventh aspect, causing the first stack to operate in the bypass mode includes causing a respective node output shorting switch electrically coupled across an output port of each battery management system node to operate in its on state.

In another embodiment of the seventh aspect, causing the first stack to operate in the floating mode includes (1) electrically isolating a respective battery of each battery management system node at least partially by opening a respective isolation switch electrically coupled to the battery; and (2) causing a respective node output shorting switch electrically coupled across an output port of each battery management system node to operate in its off state.

In another embodiment of the seventh aspect, the method further includes performing, within each battery management system node, a controlled discharge of a respective battery of the battery management system node, in response to the failure of the communication subsystem of the energy storage system.

In an eighth aspect, an energy storage system includes (1) a first stack of a plurality of battery management system nodes with respective output ports electrically coupled in series; and (2) a control subsystem configured to: (a) cause the battery management system nodes to operate in respective operational modes, such that each battery management system node is capable of providing electric power to a load electrically coupled to the energy storage system, and (b) in response to a signal for the first stack to operate in a safe mode, cause a first subset of the battery management system nodes to operate in respective bypass modes, while causing a second subset of the battery management system nodes to continue to operate in respective operational modes, to reduce at least one of a voltage and a current of the first stack.

In an embodiment of the eighth aspect, the control subsystem is further configured to change a division of battery management system nodes of the first stack between the first and second subsets of battery management system nodes.

In a ninth aspect, a method for safe operation of an energy storage system, including at least a first stack of a plurality of battery management system nodes, includes the following steps: (1) detecting a fault in the energy storage system; and (2) in response to detecting the fault in the energy storage system, reducing at least one (a) a voltage of the first stack to a non-zero value, and (b) a current of the first stack to a non-zero value, such that the first stack operates in a safe mode.

In an embodiment of the ninth aspect, the fault in the energy storage system is an arc fault in series with the first stack.

In another embodiment of the ninth aspect, the fault in the energy storage system is a parallel arc fault in the energy storage system outside of the first stack.

In another embodiment of the ninth aspect, the method further includes reducing at least one of a voltage and a current of a second stack of a plurality of battery management system nodes, in response to detecting the fault in the energy storage system.

In a tenth aspect, a method for safe operation of an energy storage system, including a plurality of battery management system nodes that are electrically coupled together, includes the following steps: (1) obtaining measurement values of a first battery of a first battery management system node of the plurality of battery management system nodes; (2) comparing the measurement values to expected values; (3) determining that the first battery is unsafe in response to the measurement values differing from the expected values by at least a threshold amount; and (4) in response to determining that the first battery is unsafe, electrically isolating the first battery from respective batteries of other battery management system nodes of the plurality of battery management system nodes.

In an embodiment of the tenth aspect, the measurement values of the first battery include at least one of an instantaneous voltage of the first battery, an instantaneous current of the first battery, and an instantaneous temperature of the first battery.

In another embodiment of the tenth aspect, the measurement values of the first battery include at least one of a rate of change of a voltage of the first battery, a rate of change of current flowing through the first battery, and a rate of change of a temperature of the first battery.

In another embodiment of the tenth aspect, the method further includes performing a controlled discharge of the first battery, within the first battery management system node, in response to determining that the first battery is unsafe.

In another embodiment of the tenth aspect, performing the controlled discharge of the first battery includes electrically coupling a resistor to the first battery within the first battery management system node.

In another embodiment of the tenth aspect, performing the controlled discharge of the first battery includes discharging the first battery via a current source electrically coupled to the first battery within the first battery management node.

In another embodiment of the tenth aspect, the method further includes commanding a load electrically coupled to the energy storage system to increase power drawn from the energy storage system, in response to determining that the first battery is unsafe.

In another embodiment of the tenth aspect, the method further includes commanding the load electrically coupled to the energy storage system to change a magnitude of the power drawn from the energy storage system, in response to a parameter of the first battery crossing a threshold value.

In another embodiment of the tenth aspect, the parameter of the first battery includes one of a state of charge (SOC) of the first battery and a voltage of the first battery.

In another embodiment of the tenth aspect, the load electrically coupled to the energy storage system includes an inverter.

In another embodiment of the tenth aspect, the method further includes inhibiting charging of the first battery, in response to determining that the first battery is unsafe.

In another embodiment of the tenth aspect, the method further includes increasing a discharge rate of the first battery, in response to determining that the first battery is unsafe.

In an eleventh aspect, a method for safe operation of an energy storage system, including a plurality of battery management system nodes that are electrically coupled together, includes the following steps: (1) receiving a signal indicating that a first battery of a first battery management system node of the plurality of battery management system nodes is unsafe; and (2) in response to receiving the signal indicating that the first battery is unsafe, performing a controlled discharge of the first battery within the first battery management system node.

In an embodiment of the eleventh aspect, performing the controlled discharge of the first battery includes electrically coupling a resistor to the first battery within the first battery management system node.

In another embodiment of the eleventh aspect, performing the controlled discharge of the first battery includes discharging the first battery via a current source electrically coupled to the first battery within the first battery management system node.

In another embodiment of the eleventh aspect, the method further includes commanding a load electrically coupled to the energy storage system to increase power drawn from the energy storage system in response to receiving the signal indicating that the first battery is unsafe.

In another embodiment of the eleventh aspect, the method further includes commanding the load electrically coupled to the energy storage system to change a magnitude of the power drawn from the energy storage system, in response to a parameter of the first battery crossing a threshold value.

In another embodiment of the eleventh aspect, the parameter of the first battery includes one of a state of charge (SOC) of the first battery and a voltage of the first battery.

In another embodiment of the eleventh aspect, the load electrically coupled to the energy storage system includes an inverter.

In another embodiment of the eleventh aspect, the method further includes inhibiting charging of the first battery, in response to receiving the signal indicating that the first battery is unsafe.

In another embodiment of the eleventh aspect, the method further includes increasing a discharge rate of the first battery, in response to receiving the signal indicating that the first battery is unsafe.

In a twelfth aspect, an energy storage system includes (1) a plurality of battery management system nodes that are electrically coupled together; and (2) a control subsystem configured to: (a) obtain measurement values of a first battery of a first battery management system node of the plurality of battery management system nodes, (b) compare the measurement values to expected values, (c) determine that the first battery is unsafe in response to the measurement values differing from the expected values by at least a threshold amount, and (d) in response to determining that the first battery is unsafe, electrically isolate the first battery from respective batteries of other battery management system nodes of the plurality of battery management system nodes.

In a thirteenth aspect, an energy storage system includes (1) a plurality of battery management system nodes that are electrically coupled together; and (2) a control subsystem configured to: (b) receive a signal indicating that a first battery of a first battery management system node of the plurality of battery management system nodes is unsafe, and (b) in response to receiving the signal indicating that the first battery is unsafe, cause a controlled discharge of the first battery to be performed within the first battery management system node.

In a fourteenth aspect, a method for safe operation of an energy storage system, including a first battery and a first direct-current to direct-current (DC-DC) converter electrically coupled to the first battery, includes the following steps: (1) controlling the first DC-DC converter to discharge the first battery into a load electrically coupled to the first DC-DC converter, to at least partially power the load from the first battery; and (2) in response to a signal to perform a controlled discharge of the first battery, controlling the first DC-DC converter to increase a rate of discharge of the first battery into the load.

In an embodiment of the fourteenth aspect, the method further includes commanding the load to increase power drawn from the energy storage system, in response to the signal to perform a controlled discharge of the first battery.

In another embodiment of the fourteenth aspect, the method further includes commanding the load to change a magnitude of the power drawn from the energy storage system, in response to a parameter of the first battery crossing a threshold value.

In another embodiment of the fourteenth aspect, the parameter of the first battery includes a state of charge (SOC) of the first battery or a voltage of the first battery.

In another embodiment of the fourteenth aspect, the load includes an inverter.

In another embodiment of the fourteenth aspect, the method further includes inhibiting charging of the first battery, in response to the signal to perform a controlled discharge of the first battery.

In a fifteenth aspect, a battery management system node with reverse voltage failure mode protection includes (1) a battery including a positive terminal and a negative terminal; (2) a direct-current to direct-current (DC-DC) converter including an output port configured to electrically couple in series with one or more additional battery management system nodes; (3) a first isolation switch electrically coupling the battery to the DC-DC converter and configured to selectably connect and disconnect the battery from the DC-DC converter; and (4) a second isolation switch configured to prevent flow of electric current in event of a short circuit with one or more of the additional battery management system nodes.

In an embodiment of the fifteenth aspect, the battery management system node further includes a controller configured to open each of the first and second isolation switches in response to a signal to electrically isolate the battery.

In another embodiment of the fifteenth aspect, the first isolation switch is electrically coupled between the positive terminal of the battery and the DC-DC converter, and the second isolation switch is electrically coupled between the negative terminal of the battery and the DC-DC converter.

In another embodiment of the fifteenth aspect, (1) the first isolation switch includes a first transistor including a first body diode, an anode of the first body diode being connected to the DC-DC converter, and a cathode of the first body diode being connected to the positive terminal of the battery; and (2) the second isolation switch includes a second transistor including a second body diode, an anode of the second body diode being connected to the negative terminal of the battery, and a cathode of the second body diode being connected to the DC-DC converter.

In another embodiment of the fifteenth aspect, the second isolation switch is electrically coupled to the output port of the DC-DC converter.

In another embodiment of the fifteenth aspect, (1) the first isolation switch includes a first transistor electrically coupled between the positive terminal of the battery and the DC-DC converter, the first transistor including a first body diode, an anode of the first body diode being electrically coupled to the DC-DC converter, and a cathode of the first body diode being electrically coupled to the battery; and (2) the second isolation switch includes a second transistor including a second body diode, a cathode of the second body diode being connected to a positive terminal of the output port of the DC-DC converter.

In another embodiment of the fifteenth aspect, (1) the first isolation switch includes a first transistor electrically coupled between the negative terminal of the battery and the DC-DC converter, the first transistor including a first body diode, an anode of the first body diode being electrically coupled to the negative terminal of the battery, and a cathode of the first body diode being electrically coupled to the DC-DC converter; and (2) the second isolation switch comprises a second transistor including a second body diode, a cathode of the second body diode being connected to a positive terminal of the output port of the DC-DC converter.

In another embodiment of the fifteenth aspect, the DC-DC converter includes one of a boost converter and a buck converter.

In a sixteenth aspect, a battery management system stack includes (1) a first battery management system node, including a first battery with a positive terminal and a negative terminal, a first direct-current to direct-current (DC-DC) converter, and a first isolation switch electrically coupling one of the positive and negative terminals of the first battery to the first DC-DC converter; and (2) a second battery management system node, including a second battery with a positive terminal and a negative terminal, a second DC-DC converter, a second isolation switch electrically coupling one of the positive and negative terminals of the second battery to the second DC-DC converter, and a third isolation switch configured to prevent flow of electric current in event of a short circuit between the first and second battery management system nodes.

In an embodiment of the sixteenth aspect, the first isolation switch is electrically coupled between the positive terminal of the first battery and the first DC-DC converter, the second isolation switch is electrically coupled between the positive terminal of the second battery and the second DC-DC converter, and the third isolation switch is electrically coupled between the negative terminal of the second battery and the second DC-DC converter.

In another embodiment of the sixteenth aspect, the third isolation switch includes a transistor including a body diode, an anode of the body diode being connected to the negative terminal of the second battery, and a cathode of the body diode being connected to the second DC-DC converter.

In another embodiment of the sixteenth aspect, the third isolation switch is electrically coupled to an output port of the second DC-DC converter.

In another embodiment of the sixteenth aspect, the third isolation switch includes a transistor including a body diode, a cathode of the body diode being connected to a positive terminal of the output port of the second DC-DC converter.

In another embodiment of the sixteenth aspect, each of the first DC-DC converter and the second DC-DC converter comprises a respective boost converter.

In a seventeenth aspect, a battery stack includes (1) a plurality of batteries electrically coupled in series, (2) a plurality of switches, and (3) a controller configured to control the plurality of switches such that each battery can be individually connected to and disconnected from an electrical power source/sink.

In an embodiment of the seventeenth aspect, the plurality of switches includes (1) a respective isolation switch for each battery, each isolation switch being configured to selectably isolate its respective battery from other batteries of the battery stack and (2) a respective bypass switch for each battery, each bypass switch being configured to selectably provide a path for electrical current flowing through the battery stack to bypass its respective battery.

In another embodiment of the seventeenth aspect, the controller and the plurality of switches are collectively configured such that the battery stack is capable of operating in a plurality of stack operating modes, the plurality of stack operating modes including a normal charge mode, a normal discharge mode, and a bypass mode.

In another embodiment of the seventeenth aspect, the plurality of stack operating modes further includes one or more of a floating mode and a safe mode.

In another embodiment of the seventeenth aspect, the controller is further configured to cause the battery stack to operate in one of the bypass mode, the floating mode, and the safe mode, in response to occurrence of a fault in an energy storage system including the battery stack.

In another embodiment of the seventeenth aspect, the fault is selected from the group consisting of a stack-level series electrical arc, a system-level series electrical arc, a stack-level parallel electrical arc, a system-level parallel electrical arc, and failure of a subsystem of the energy storage system.

In another embodiment of the seventeenth aspect, (1) the controller and the plurality of switches are collectively configured such that the battery stack is capable of operating in a plurality of stack operating modes, the plurality of stack operating modes including a normal charge mode, a normal discharge mode, and a floating mode, and (2) the controller is further configured to cause the battery stack to operate in the floating mode in response to occurrence of an electrical arc fault in an energy storage system including the battery stack.

In another embodiment of the seventeenth aspect, the battery stack further includes a respective DC-DC converter electrically coupled to each battery.

In another embodiment of the seventeenth aspect, each DC-DC converter is configured to transfer charge between its respective battery and another battery of the battery stack.

In another embodiment of the seventeenth aspect, each DC-DC converter is configured to transfer charge between its respective battery and a bus electrically coupled to the battery stack.

In another embodiment of the seventeenth aspect, each DC-DC converter is electrically coupled to the bus.

In another embodiment of the seventeenth aspect, the bus electrically couples the battery stack to an electrical load.

In another embodiment of the seventeenth aspect, the bus is a power transfer bus configured to transfer charge between the plurality of batteries.

In another embodiment of the seventeenth aspect, the controller is configured to control the DC-DC converter to regulate voltage on the bus.

In another embodiment of the seventeenth aspect, the controller is configured to control the DC-DC converter to regulate voltage on the bus.

In an eighteenth aspect, a battery stack includes a plurality of battery management system (BMS) nodes and a controller, Each BMS node includes (1) a battery, (2) an isolation switch configured to selectably isolate the battery of the BMS node from the batteries of the other BMS nodes, and (3) a bypass switch configured to selectably provide a path for electrical current flowing through the battery stack to bypass the battery of the BMS node. The controller is configured to control the isolation switch and the bypass switch of each BMS node such that the battery of each BMS node can be individually connected to and disconnected from an electrical power source/sink, and the batteries of the BMS nodes are electrically coupled in series.

In an embodiment of the eighteenth aspect, the controller is further configured to control the isolation switch and the bypass switch of each BMS node such that each BMS node is capable of operating in a plurality of operating modes independent of each other BMS node of the battery stack, the plurality of operating modes including a normal charge mode, a normal discharge mode, and a bypass mode.

In another embodiment of the eighteenth aspect, the plurality of operating modes further includes a floating mode.

In another embodiment of the eighteenth aspect, the plurality of operating modes further include a safe mode.

In another embodiment of the eighteenth aspect, the controller is further configured to cause a first BMS node of the plurality of BMS nodes to operate in its bypass mode in response to the battery of the first BMS node being unsafe.

In another embodiment of the eighteenth aspect, the controller is further configured to cause the battery of the first BMS node to be discharged in response to the battery of the first BMS node being unsafe.

In another embodiment of the eighteenth aspect, the first BMS node further includes discharge circuitry configured to discharge the battery of the first BMS node, and the controller is further configured to cause the battery of the first BMS node to be discharged by activating the discharge circuitry.

In another embodiment of the eighteenth aspect, each BMS node further includes a respective DC-DC converter electrically coupled to the battery of the BMS node.

In another embodiment of the eighteenth aspect, each DC-DC converter is configured to transfer charge between the battery of its respective BMS node and a battery of at least one other BMS node of the battery stack.

In another embodiment of the eighteenth aspect, each DC-DC converter is configured to transfer charge between the battery of its respective BMS node and a bus.

In another embodiment of the eighteenth aspect, each DC-DC converter is electrically coupled to the bus.

In another embodiment of the eighteenth aspect, the bus electrically couples the battery stack to an electrical load.

In another embodiment of the eighteenth aspect, the bus is a power transfer bus configured to transfer charge between respective batteries of the plurality of BMS nodes.

In another embodiment of the eighteenth aspect, the controller is further configured to control the DC-DC converter of each BMS node to regulate voltage of the bus.

In a nineteenth aspect, a method for mitigating a fault in an energy storage system including a battery stack of a plurality of battery management system (BMS) nodes including respective batteries electrically coupled in series includes (1) transferring electrical power between the batteries of the BMS nodes and an electrical load and (2) in response to occurrence of a fault in the energy storage system, causing the battery stack to transition from a normal charge/discharge mode to one of a bypass mode, a floating mode, and a safe mode.

In an embodiment of the nineteenth aspect, the fault is selected from the group consisting of a stack-level series electrical arc, a system-level series electrical arc, a stack-level parallel electrical arc, a system-level parallel electrical arc, and failure of a subsystem of the energy storage system.

In another embodiment of the nineteenth aspect, the method further includes discharging a battery of a first BMS node of the plurality of BMS noses in response to the battery of the first BMS node being unsafe.

In another embodiment of the nineteenth aspect, discharging the battery of the first BMS node includes discharging the battery of the first BMS node using discharge circuitry of the first BMS node.

In another embodiment of the nineteenth aspect, discharging the battery of the first BMS node includes (1) causing the first BMS node to operate in its bypass mode during charging of the battery stack and (2) causing the first BMS node to operate in its normal charge/discharge mode during discharging of the battery stack.

In another embodiment of the nineteenth aspect, discharging the battery of the first BMS node includes transferring charge of the battery of the first BMS node to one or more of (1) a respective battery of one or more other BMS nodes of the plurality of BMS nodes and (2) a bus electrically coupled to the first BMS node.

In another embodiment of the nineteenth aspect, the method further includes transferring charge of the battery of a first BMS node of the plurality of BMS nodes to the battery of a second BMS node of the plurality of BMS nodes.

In another embodiment of the nineteenth aspect, the method further includes transferring charge between the battery of a first BMS node of the plurality of BMS nodes and a bus electrically coupled to the battery stack.

In another embodiment of the nineteenth aspect, the method further includes regulating a voltage of the bus to provide an auxiliary power rail.

In another embodiment of the nineteenth aspect, the method further includes transferring charge between the battery of a first BMS node of the plurality of BMS nodes and an electrical load electrically coupled to the battery stack, the electrical load being capable of (1) providing electrical power to the battery stack and (2) receiving electrical power from the battery stack.

BRIEF DESCRIPTION OF DRAWINGS

FIG. 13A is an illustrative circuit diagram of an example bi-directional DC-DC converter circuit for use in an example node.

FIG. 13B is an illustrative signal diagram representing discharge and charge of a battery comprising the bi-directional DC-DC converter of FIG. 13A by the load.

FIG. 13C is an illustrative signal diagram representing discharge, with no charge, of the battery of FIG. 13A by the load.

DETAILED DESCRIPTION

While previous battery energy management systems and battery management system nodes generally have been effective, there have been shortcomings with their use. For example, conventional battery management system nodes are not capable of identifying and extinguishing an arc fault. Moreover, a battery isolation switch can isolate a weak or failed battery from a remainder of an energy storage system, but previous isolation switches ordinarily do not protect good batteries from a failed battery. Consequently, a good battery coupled within a failed battery can transfer short circuit voltages and currents to adjacent batteries, which can lead to fire. Furthermore, in general, only failed batteries are bypassed or de-energized. However, there is a need to be able to bypass a good battery when a battery energy management system fails but the battery is good. For example, during installation and maintenance, it is useful to have non-zero but safe voltage to power battery stacks to troubleshoot and test whether a system is properly functioning before full voltage and power power-up. There also is a need to be able to keep battery voltages at safe levels to humans, and low enough to easily extinguish most arcs. Although a battery generally is bypassed when it is determined to be possibly unsafe, merely bypassing an unsafe battery does not prevent it from catching fire and the fire spreading to other healthy batteries. Thus, there is a need to both identify and discharge unsafe, albeit not yet failed, batteries.

Disclosed herein are safe battery energy management systems, safe battery management system nodes, and associated methods which at least partially overcome one or more the above-discussed drawbacks of conventional systems, nodes, and methods. For example, certain embodiments are configured to perform a hierarchical arc fault detection method which can identify an electrical arc anywhere in a system. Additionally, some embodiments can operate in a plurality of modes, to promote safety as well as ease of system maintenance and troubleshooting. Furthermore, particular embodiments are configured to safely discharge a battery, such as in response to fault or a user command to discharge the battery. Moreover, certain embodiments are configured to prevent short circuit current flow in response to a reverse voltage.

Battery Management System Node Example

Figure 1:
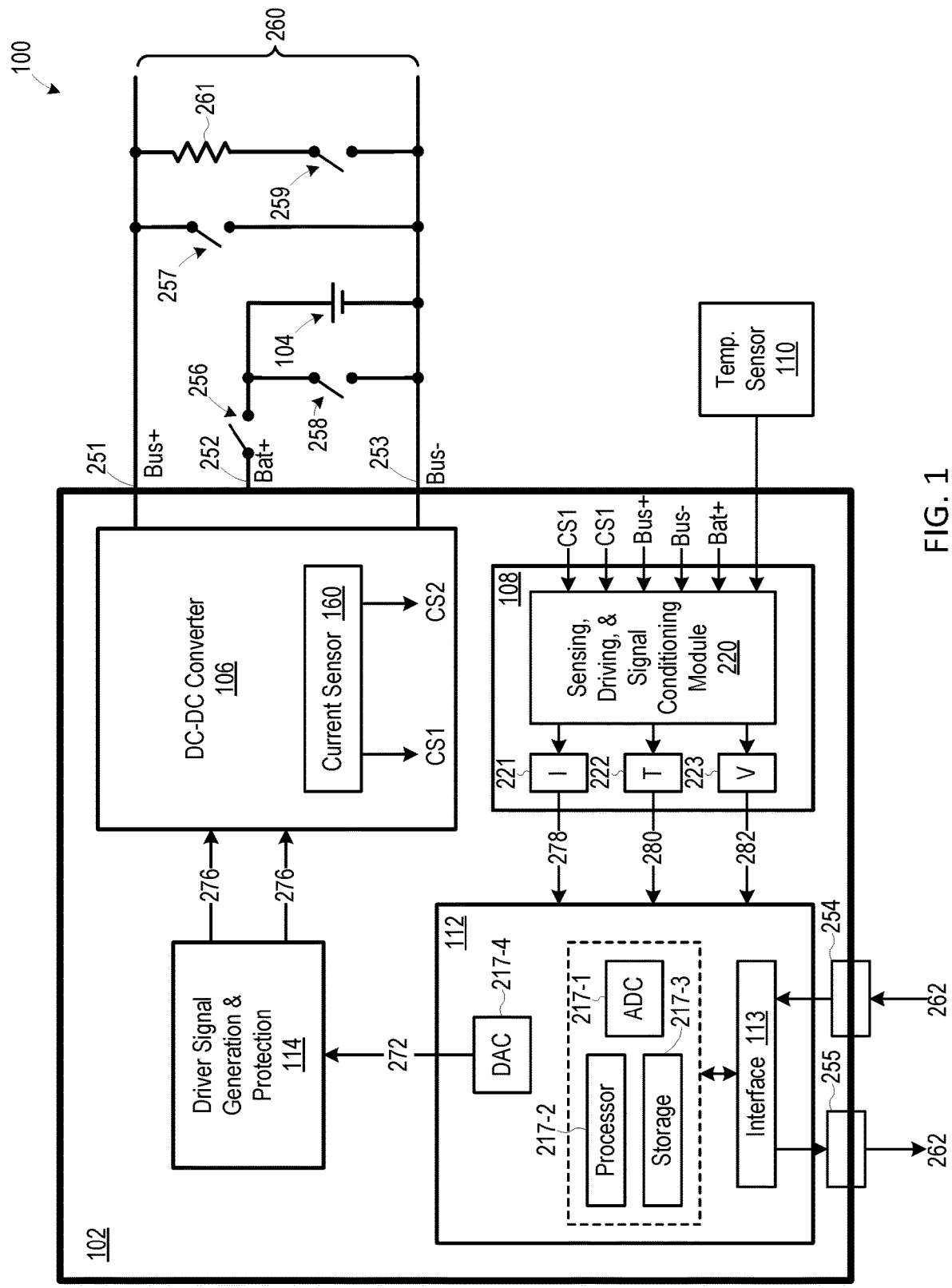
FIG. 1 is an illustrative block diagram of an example battery management system (BMS) node.

FIG. 1 is an illustrative block diagram of an example battery management system (BMS) node 100. The example BMS node 100 includes a control circuit 102 and battery 104. In this document, the term "battery" includes a single electrochemical cell as well as a device including a plurality of electrochemical cells. Accordingly, the battery 104 may be a single electrochemical cell. Additionally, the battery 104 may be a multi-cell assembly including a plurality of electrochemical cells that are electrically coupled together in series and/or parallel. The battery 104 may be a stand-alone device, or the battery 104 may be co-packaged with, or part of, another device.

The example node 100 includes a positive power bus (Bus+) terminal 251, a positive battery terminal (Bat+) 252, and a negative battery/power bus terminal (Bus−, Cell−) (the 'negative battery terminal') 253. The node 100 is coupled to the communication bus 262. More particularly, the node 100 includes a communication bus input terminal 254 and a communication bus output terminal 255. In an example node 100, the communication bus 262 comprises a serial data bus.

The control circuit 102 includes a bidirectional DC-DC converter 106, a sensing and measurement system 108, a temperature sensor 110, a processing and communications system 112, and a drive signal generation system 114. The converter 106 receives as input voltage, a battery voltage across terminals 252 and 253, and provides as output voltage, a node output voltage across terminals 251 and 253. Thus, the converter 106 transforms, e.g. either increases or decreases, a battery voltage across terminals 252 and 253 to an output node voltage across terminals 251 and 253, or vice versa. The sensing system 108 monitors battery temperature, battery current and battery voltage characteristics over time and provides that information to the processing and communication system 112. The sensing system 108 also monitors node output voltage output current and DC-DC converter temperature and/or temperature of the battery 104. The node output voltage is output voltage of the DC-DC converter 106, which is provided across positive power bus (Bus+) terminal 251 and the negative battery 253, which is the voltage output of the DC-DC converter 106. Node current flows through the battery, which is coupled to the DC-DC converter 106. The node output voltage and/or the node output current can be used to identify an arc fault, such as discussed below with respect to FIGS. 5A-8C. The DC-DC converter temperature can be used as a proxy for temperature of the battery 104 to ensure safe discharge.

Alternately, BMS node 100 can directly measure temperature of battery 104, and the temperature can be used to ensure safe discharge.

An example node 100 performs periodic voltage, current and temperature ('VIT') measurements. More particularly, battery voltage, battery current, battery temperature and node output voltage measurements are used, as explained more fully below, to determine state of charge estimates for the battery 104 and/or to dynamically control charge and discharge of the battery 104. An example node performs voltage, current and temperature ('VIT') measurements at least once every 5-10 milliseconds, for example.

In one aspect, the processing and communication system 112 processes the information from the sensing system 108 based on stored control information that specifies how to control the DC-DC converter 106 depending on the VIT measurements, and then outputs information to the drive system 114 for appropriately controlling the converter 106 to convert a battery voltage to a node output voltage while achieving enhanced performance of the battery 104. In another aspect, the processing and communication system 112 controls opening and closing of a node battery isolation switch 256 to selectably isolate the battery 104 from the converter 106. In yet another aspect, the processing and control system 112 controls energy drain circuitry 258, which provides a mechanism to safely discharge the battery 104 within the BMS node 100 without providing a node output voltage. Although energy drain circuitry 258 is depicted as being a single switch, energy drain circuitry 258 can take other forms, such as discussed below with respect to FIGS. 11 and 12, as long as energy drain circuitry 258 can perform a controlled discharge of the battery 104 within the BMS node 100.

The battery 104 provides a voltage across positive battery terminal 252 and the negative battery terminal 253. The converter 106 provides a node output voltage across the positive power bus terminal 251 and the negative power terminal 253. The positive power bus terminal 251 and the negative power terminal 253 together act as an output port 260 at which the node output voltage is provided. Some embodiments of BMS node 100 additionally include a node output shorting switch 257 electrically coupled across output port 260, i.e. across the positive power bus terminal 251 and the negative power terminal 253. Additionally, BMS node 100 optionally includes a soft shorting switch 259 and a resistor 261 electrically coupled in series across output port 260. As discussed below, controller 102 closes soft shorting switch 259, for example, to equalize node output voltages among a plurality of BMS node 100 instances during certain off states. Resistor 261 need not be a discrete resistor but could instead be parasitic resistance of soft shorting switch 259.

The converter 106 converts the battery voltage, which is provided across positive battery terminal 252 and the negative battery terminal 253 to a node output voltage, which is provided across the positive power bus terminal 251 and the negative battery terminal 253. The exemplary sensing and measurement system 108 includes a sensing, driving, and signal conditioning module 220 with electrical connections to the outputs CS1 and CS2 of a current sensor 160 that measures battery current, to a temperature sensor 110 that measures temperature of the converter and/or the battery 104, to positive power bus terminal 251, to positive battery terminal 252, and negative power terminal 253. The sensing, driving, and signal conditioning module 220 prepares and conditions the current, temperature, and voltage input signals to be measured over time at current measurement module 221, temperature measurement module 222, and voltage measurement module 223. The sensing and measurement system 108 includes current, temperature and voltage signal lines 278, 280, 282 coupled to transmit the measured values to the processing and communication system 112.

The processing and communication system 112 is coupled to receive signals from the sensing system 108. The processing system 112 also includes an output connection to the drive system 114. The drive system 114 includes an input signal connection 272 from the processing system 112 and one or more output signal connections 276 to the DC-DC converter 106.

Processing and communications system 112 includes a module 217 that contains an analog-to-digital converter (ADC) circuit 217-1, a processor circuit 217-2, digital storage 217-3, and an optional digital-to-analog converter 217-4 (DAC). The analog-to-digital converter 217-1 converts the analog measurements of voltage, current, and temperature received from sensing system 108 into corresponding digital values. In one aspect, the processor circuit 217-2 correlates the current, temperature, and voltage data with instructions contained within digital storage 217-3, and processes cell charge/discharge algorithms to determine control signals to send to the drive system 114. In some embodiments, the DAC 217-4 converts the control signals generated by processor circuit 217-2 from digital to analog form before the control signals are transmitted to the drive system 114. An example processing and communications module 112 of node 100 sends data to and receives data and instructions from a stack controller 210, described below with reference to FIG. 2, over the communication bus 262. An alternative example node (not shown) can use wireless communications to send data and instructions to and to receive data and instructions from a stack controller. For example, in some alternate embodiments, communication bus input terminal 254 and communication bus output terminal 255 are replaced with one or more wireless transceivers to enable node 100 to wirelessly communicate with stack controller 210 and/or other node 100 instances. In these alternate embodiments, communication bus 262 is optionally omitted.

Drive system 114 processes control signals received from the processing and communication system 112 and produces drive control signals to control the DC-DC converter 106 to control battery charge operations and battery discharge operations.

Processing and communications system 112 includes bus interface circuitry 113 to send and to receive information over the communication bus 262. In some embodiments, the bus interface circuitry 113 receives input information at communication bus input terminal 254 and provides output information at communication bus output terminal 255, for sequential transfer of information among multiple BMS node 100 instances. An example communication bus 262 includes a differential daisy chain circuit. An alternative example node (not shown) includes a wireless communication interface for communication with a stack controller (not shown) and/or other nodes. In some alternate embodiments, data need not be sent or received sequentially but could instead be sent or received using another data transmission technique. For example, in some alternate embodiments, data is transmitted between BMS node 100 and two or more other points, such as other BMS nodes, in parallel.

The example processing and communication circuitry 112 sends commands to the drive system 114 to control the DC-DC converter 106 based upon voltage, current and temperature measurements obtained by the sensing system 108 and based upon algorithms stored as instructions and lookup tables within the digital storage 217-3. An example node 100 receives the instructions and lookup tables from a host controller 212 via a stack controller 210 described below with reference to FIG. 2. The algorithms are coded to adjust the voltage and/or current characteristics of a battery 104 (via converter 106) to achieve the performance desired. For example, if it is determined by the processing system 112 based upon VIT measurements, for example, that the present discharge rate of a particular battery 104 (assessed via measurements from sensing system 108) suggests that the cell's lifetime will be two months too short than what is required, an algorithm looks up in a look-up table an appropriate adjustment to be applied to the converter 106 of that battery 104 based upon the calculated lifetime shortfall and the present current and voltage operating characteristics of the battery 104. An example battery management system node 100 is disclosed in U.S. Pat. No. 8,686,693, which is expressly incorporated herein in its entirety by this reference.

Energy Storage System Example

Figure 2:
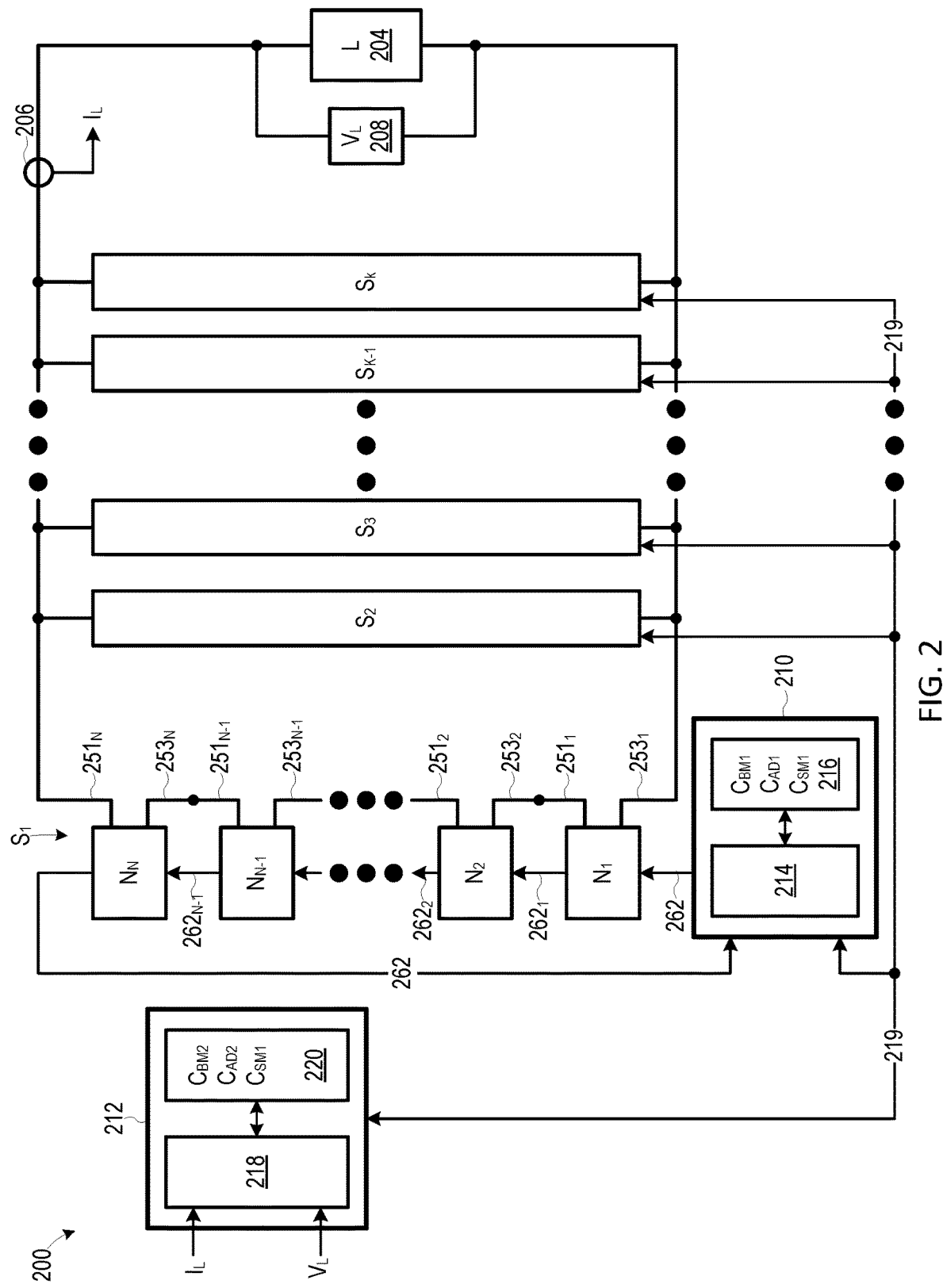
FIG. 2 is an illustrative block diagram of an example energy storage system that includes multiple BMS stacks coupled in parallel with an electrical load, each stack including multiple nodes coupled in series.

FIG. 2 is an illustrative block diagram of an example energy storage system 200 that includes multiple BMS battery stacks $S_1$-$S_K$ with node output voltages coupled in parallel with electrical load 204. Batteries within each stack $S_1$-$S_K$ are stacked in series to produce sufficient voltage. As discussed above with respect to FIG. 1, each battery 104 may be either (a) a single electrochemical cell or (b) a multi-cell assembly including a plurality of electrochemical cells that are electrically coupled in series and/or parallel. To avoid unnecessary complexity of presentation and to promote illustrative clarity of explanation, details of a stack $S_1$ are explained and stacks $S_2$-$S_K$ are shown in block form with details omitted. However, it will be understood that the details and principles of operation explained with reference to stack $S_1$ also apply to the other stacks $S_2$-$S_K$. Stack $S_1$ includes multiple nodes $N_1$-$N_N$ with the sum of their node output voltages $V_1$-$V_N$ coupled in parallel with an electrical load 204. The load 204, for example, can be a Photovoltaic (PV) system and an inverter attached to a power grid. Alternatively, for example, the load 204 can be an electric motor and battery charger of an electric vehicle (EV). Accordingly, the load 204 can both receive power from energy storage system 200 as well as provide power to energy storage system 200 for charging the batteries 104. Each node in the example BMS stacks $S_1$-$S_K$ is equivalent to the node 100 of FIG. 1, although details of nodes $N_1$-$N_N$ are not shown to simplify the drawing.

The stack $S_1$ includes multiple nodes $N_1$-$N_N$. Each node converts a cell voltage of its respective battery 104 to a respective node output voltage, as discussed above with respect to FIG. 1. The multiple nodes $N_1$ to $N_N$ of $S_1$ have their node output voltages $V_1$ to $V_N$ coupled in series. For example, a negative power bus terminal $253_N$ of Node $N_N$ is coupled to a positive power bus terminal $251_{N-1}$ of node $N_{N-1}$. Also, for example, a negative power bus terminal $253_2$ of Node $N_2$ is coupled to a positive power bus terminal $251_1$ of node $N_1$. The series-coupled node output voltages $V_1$-$V_N$ of the nodes $N_1$-$N_N$ of the stack $S_1$ are electrically coupled in parallel with the electrical load 204. The example stack $S_1$ includes a stack controller 210 coupled to supervise operation of the nodes $N_1$-$N_N$ of the stack $S_1$. A host controller 212 is operatively coupled to the stack controller 210. In some alternate embodiments, two or more stacks $S_1$-$S_K$ share a common stack controller 210, such that each stack need not necessarily have its own stack controller 210. Additionally, although host controller 212 is depicted as a discrete entity, some or all aspects of host controller 212 could be incorporated in one more stack controllers 210. Furthermore, host controller 212 could be partially or completely implemented by one or more computing devices that are remote from the remainder of energy storage system 200, such as in a distributed or cloud computing system. Moreover, in some embodiments, host controller 212 is not dedicated to energy storage system 200 but is instead configured to at least partially control a plurality of energy storage systems. Additionally, in certain other alternate embodiments, host controller 212 and each stack controller 210 are implemented by a single controller (not shown).

For grid-tied energy storage, for example, stack voltages of hundreds of volts to over a thousand volts are common. With battery voltage (per battery cell) of approximately four (4) volts, battery stacks of one hundred (100) to three hundred (300) or more series battery cells are common. Assuming a boost ratio of 1.2, for example, stacks typically would include from fifty (50) to one-hundred and fifty (150) or more nodes per stack. The number of parallel stacks sets the total power and energy capability of the example system 200 and typically is in a range from one to many ten (10) or more, or one hundred (100) or more, for example. For large-format batteries used in a known automobile, for example, a stack of nodes that includes one hundred (100) batteries would be a twenty-four (24) kWh system. So, approximately fifty (50) parallel stacks would provide a 1 MWh system for commercial applications. Utility scale systems often can be one hundred (100) MWh and larger. Of course, there would be a practical limit to how many parallel stacks to use, such as the number of stacks that could physically (and safely) fit in a standard shipping container. A load current measurement circuit 206 is coupled to measure a load current $I_L$ through the load 204. A load voltage measurement circuit 208 is coupled to measure a voltage $V_L$ across the load. The host controller 212 is coupled to receive the $I_L$ measurements and to receive the $V_L$ measurements.

During normal operation, DC-DC converters of respective nodes $N_1$, $N_2$, . . . , $N_{N-1}$, $N_N$ of stack $S_1$ charge and discharge their associated batteries $104_{N1}$, $104_{N2}$, . . . , $104_{N-1}$, $104_{NN}$ independently of one another such that the voltage, current and other parameters of the one battery can be managed independently of the other batteries in the stack $S_1$. Moreover, each node includes a respective node cell isolation switch 256 to selectably connect and disconnect the node's DC-DC converter 106 to and from the node's battery 104 during a safe mode operation described below.

The example stack $S_1$ includes a communication bus 262 that couples the nodes of the stack to send information to and to receive information from the $S_1$ stack controller 210. The communication bus 262 communicates information to and from the nodes according to a sequential ordering of the nodes $N_1$ to $N_N$. In an example stack $S_1$, the sequential communication bus 262 has a daisy chain architecture in which communication bus segments $262_1$ to $262_N$ are provided between sequentially ordered nodes. Signals are transmitted sequentially from node-to-node according to node ordering. In the example stack $S_1$, node ordering progresses sequentially from the stack controller 210 to a first node in the sequence $N_1$, to a second node in the sequence $N_2$, . . . to a last node in the sequence $N_N$. The example sequential bus has a ring topology in which the last node $N_N$ of the sequence is coupled in a loop through the stack controller 210 to the start of the sequence.

In an example system, the nodes $N_1$-$N_N$ of a stack S1 are coupled to form a communications controller area network in which control and data signals are communicated between the nodes and stack controller 210. More particularly, in an example system, the communication bus 262 includes two wires, i.e. low and high. However, communication bus 262 can have other configurations without departing from the scope hereof. For example, communication bus 262 could be an alternative type of wireline communication bus. As another example, communication bus 262 could be a wireless communication bus or a hybrid wireline-wireless communication bus. Each node can prepare and broadcast information (e.g. voltage, current and temperature data) via the bus 262 in response to commands received from the stack controller 210 over the bus 262. The broadcasted data can be accepted by all other nodes on the communication bus 262. Each node checks information received over the communication bus 262 and decides whether to process it, ignore it, or pass it along to the next node in the network.

An example stack controller 210 includes stack processor circuitry 214 operatively coupled to a storage device 216 that includes first battery management code ($C_{BM1}$), first arc detection code ($C_{AD1}$), and first safety management code ($C_{SM1}$) that are accessible to, and executable by, the processor circuitry 214.

In the example stack $S_1$, the first battery management ($C_{BM1}$) code in storage device 216 includes instructions that, when executed, configure the stack processor circuitry 214 for use in management of the charge and discharge of the cells of the nodes of the stack $S_1$ based upon measured voltage, current and temperature of the nodes of the stack, for example. For instance, example first $C_{BM1}$ code configures the stack processor circuitry 214 to collect battery, current and temperature measurements from the individual nodes $N_1$-$N_N$ of the stack $S_1$ and to send the measurements to the host controller 212 for processing. The example first $C_{BM1}$ code also configures the stack processor circuitry 214 of the $S_1$ stack controller 210 to receive instructions from the host controller 212 over timing and control bus 219 to assist in determining adjustment of operation of the batteries 104 of individual nodes, to optimize overall performance of the nodes of the stack $S_1$, and to send the received instructions to the nodes $N_1$-$N_N$ to implement the adjustments. An alternative example stack controller 210 wirelessly exchanges information with the host controller 212.

In the example stack $S_1$, the first arc detection ($C_{AD1}$) code in storage device 216 includes instructions that, when executed, configure the stack processor circuitry 214 for use in detecting and responding to arc fault conditions based upon measurements of voltage and current within the nodes of the stack $S_1$. For instance, example first $C_{AD1}$ code configures the stack processor circuitry 214 to impart measurement request commands to cause the BMS nodes $N_1$-$N_N$ of the stack $S_1$ to provide synchronized voltage measurements and to provide synchronized current measurements, to collect the synchronized measurements from the nodes, and to send the synchronized measurements to the host controller 212 over timing and control bus 219 for processing. In some embodiments, voltage measurements are synchronized independently of current measurements, such that voltage measurements are not necessarily synchronized with current measurements. The example first $C_{AD1}$ code also configures the stack processor circuitry 214 to detect an occurrence of a series arc fault in the stack $S_1$ and to detect an occurrence of a parallel arc fault in the example stack $S_1$ and to cause opening of isolation switches 256 of nodes of the stack $S_1$ and/or another action in response to such occurrences. The example first $C_{AD1}$ code also configures the stack processor circuitry 214 to receive instructions from the host controller 212 over timing and control bus 219 indicating an occurrence of a system-level series arc fault or indicating an occurrence of a system-level parallel arc fault, and to cause opening of isolation switches 256 of $N_1$-$N_N$ of the stack $S_1$ and/or another action in response to such occurrences, for example. In some embodiments, the stack processor circuitry 214 is further configured to cause the soft shorting switches 259 to close in response to a detected series or parallel arc fault, to equalize voltages across the nodes. An alternative example stack controller 210 wirelessly exchanges system series arc fault information or system-level parallel arc fault information with the host controller 212.

In the example stack $S_1$, the first safety management ($C_{SM1}$) code includes instructions that, when executed, configure the stack processor circuitry 214 for use in transitioning the nodes $N_1$-$N_N$ of the stack $S_1$ between operational, bypass, floating and safe functional modes. For instance, example first $C_{SM1}$ code configures the stack processor circuitry 214 to receive instructions from the host controller 212 over timing and control bus 219 that indicate a command to transition the nodes between modes of operation of the stack. The example first $C_{SM1}$ code also configures the stack controller to send instructions to the nodes of the stack $S_1$ to selectably open and close isolation switches 256 to transition the stack between modes of operation based upon instructions received from the host controller 212. An alternative example stack controller 210 wirelessly exchanges operational, safe, floating, and low power functional mode information with the host controller 212.

The host controller 212 includes controller processor circuitry 218 operatively coupled to a storage device 220 that includes second battery management ($C_{BM2}$) code, second arc detection ($C_{AD2}$) code and second safety management ($C_{BM2}$) code that are accessible to, and executable by, the controller processor circuitry 218. Example second $C_{BM2}$ code includes instructions that, when executed, configure the controller processor circuitry 218 for use in management of the charge and discharge of the batteries of the nodes of the BMS stack $S_1$ based upon measured voltage, current and temperature of the nodes of the stack, for example. For instance, example second $C_{BM2}$ code configures the controller processor circuitry 218 to collect voltage, current and temperature measurements from the stack $S_1$ and to use information in stored tables to select instructions to adjust performance of individual batteries 104 of the stack based upon the collected measurements that are indicative of the unique and evolving performance characteristics of the individual cells, so that overall system performance is enhanced. The example second $C_{BM2}$ code also configures the controller processor circuitry 218 to send instructions to the stack processor circuitry 214 over timing and control bus 219 to cause adjustment of operation of individual batteries 104 of the stacks $S_1$-$S_K$ to optimize overall performance of the system 200. An alternative example stack controller 210 wirelessly exchanges information with the host controller 212 of the stacks $S_1$-$S_K$.

Example second $C_{AD2}$ code includes instructions that, when executed, configure the controller processor circuitry 218 for use in detecting and responding to arc fault conditions based upon synchronized measurements of voltage and synchronized measurements of current within the nodes $N_1$-$N_N$ of the stack $S_1$, as well as measured stack currents and measured stack voltages. For instance, example second $C_{AD2}$ code configures the controller processor circuitry 218 to send instructions to cause the stack controllers of the multiple stacks $S_1$-$S_K$ to collect node voltage and node current measurements in synchrony with the collection by the host controller 212 of measurements of stack voltages $V_L$ and stack currents $I_L$. However, in some embodiments, voltage measurements are synchronized independently of current measurements, such that voltage measurements are not necessarily synchronized with current measurements. The example second $C_{AD2}$ code also configures the controller processor circuitry 218 to detect an occurrence of a system-level series arc fault and to detect an occurrence of a system-level parallel arc fault in the stack and to send information over timing and control bus 219 to one or more of the stacks $S_1$-$S_K$ to cause opening of node isolation switches 256 and/or another action in response to such occurrences. An alternative example host controller 212 wirelessly exchanges information with the stack controllers of the stacks $S_1$-$S_K$.

Example second $C_{SM2}$ code includes instructions that, when executed, configure the controller processor circuitry 218 for use in transitioning the nodes of one or more of the multiple stacks $S_1$-$S_K$ between operational, bypass, floating and safe functional modes. For instance, example second $C_{SM2}$ code configures the controller processor circuitry 218 to send instructions over timing and control bus 219 to the multiple BMS stacks to indicate a mode of operation. Example second $C_{SM2}$ code also sends instructions to one or more of the example stacks $S_1$-$S_K$ to indicate which isolation switches to selectably open and close during low power operation, for example. An alternative example host controller 212 wirelessly exchanges information with the stack controllers of the stacks $S_1$-$S_K$.

Arc Faults

An example electrical storage system may experience an electrical arc, where gas (typically air) between two nearby electrical conductors at different electrical potential ionizes due to a large voltage and/or small separation distance between the electrical conductors, resulting in current flow between the electrical conductors. Such potential for an electrical arc is compounded by the fact that typical electrical storage systems include many electrical connectors and long electrical cables, thereby presenting many possible points of failure. Some electrical storage systems are vulnerable to physical damage, such as from environmental conditions, maintenance personnel working in the system's vicinity, or from an animal chewing on the system's components. An electrical arc can be classified as either a series electrical arc or a parallel electrical arc. A series electrical arc occurs across an opening in a series electrical circuit, such as across an opening caused by a connector failure, for example. A parallel electrical arc occurs between parallel voltage or current paths of an electrical system, or between a voltage or current carrying conductor and ground, such as due to an insulation failure, for example.

Electrical arc detection devices have been proposed for energy management systems, which detect an electrical arc by identifying high frequency components, or "noise," of an energy storage system current that is generated by the electrical arc. The noise's amplitude is very small and must be increased by amplification, or by use of a current transformer, for detection. Additionally, the noise must be distinguished from other high frequency components commonly present in photovoltaic system current, such as switching power converter ripple current and harmonics thereof. Thus, conventional arc detection devices typically decompose photovoltaic system current into its constituent AC components using Fast Fourier Transform (FFT) techniques, or similar techniques, to distinguish electrical arc noise from other system noise. Significant computational generally resources are required to satisfactorily perform this signal decomposition.

Government and/or industry standards often specify a certain time from when an arc is established until an arc detection system detects or interrupts the arc. For example, for a Type 1 series arc detector, UL 1699B specifies that the time shall be no longer than two (2) seconds, and for higher power arcs shall be no longer than t=750 Joules/IV. When no arc is present in the energy storage system 200 that includes multiple battery stacks $S_1$-$S_K$ that provide DC voltage and DC current, AC signal components generally are quite small except for peaks related to switching of power electronics within the system such as DC-DC converters 106 or an inverter, for example. During an occurrence of an arc, a more complex AC spectrum may occur with larger amplitude than in the no arc situation. However, even during occurrence of an arc, peaks due to switching of power electronics can be considerably larger in amplitude than electrical noise due to the arc. Furthermore, these peaks are not guaranteed to be located at a particular frequency, even for a specific piece of equipment, as it may operate at different frequencies depending upon the conditions present. In an energy storage system that includes a large number of nodes per stack such as fifty (50) to one-hundred and fifty (150) or more nodes per stack in which each node takes VIT measurements approximately at least every 5-10 milliseconds, for example, there can be greater challenges synchronizing DC voltage measurements and synchronizing DC current measurements for use in arc detection. Moreover, there is a possibility that DC measurements of voltage and current can alias large AC peaks that occur due to switching of power electronics. Thus, an arc detection scheme that uses synchronized DC voltage and synchronized DC current measurements to detect arcs must quickly and reliably detect arcs without creating nuisance trips due to other sources of noise in the system such as power electronics switching, for example.

Measurement Synchronization

Figure 3A:
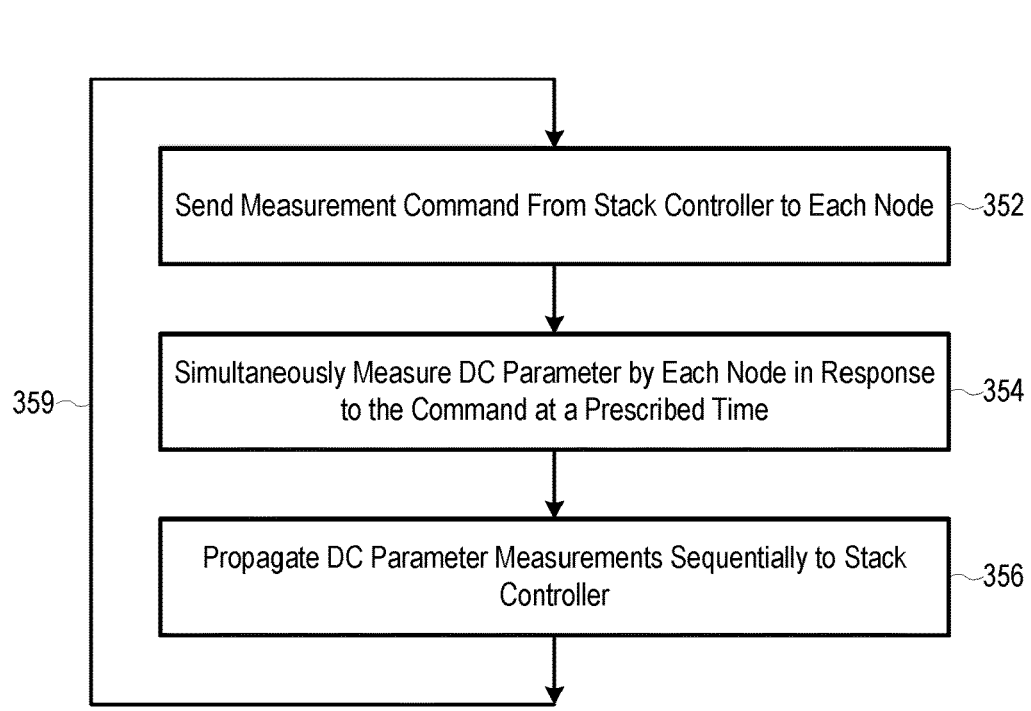
FIG. 3A is an illustrative flow diagram representing a first method to obtain synchronized DC measurement values produced by nodes of an example node stack of FIG. 2.

FIG. 3A is an illustrative flow diagram representing a first method 350 to obtain synchronized DC measurement values produced by nodes of the example node stack $S_1$ of FIG. 2. Method 350 is used, for example, to obtain synchronized electrical and/or temperature measurement values for arc fault detection and/or for managing other aspects of energy storage system 200, such as for use by processor circuitry 217-2, processor circuitry 214, and/or processor circuitry 218 to control charging and discharging of batteries 104. At step 352, the stack controller 210 sends a measurement request command to nodes $N_1$-$N_N$. At step 354, at a prescribed time, each node simultaneously measures at least one DC parameter, e.g., voltage, current, and/or temperature in response to the command. At step 356, the commanded DC measurement values are propagated through the nodes $N_1$-$N_N$ to the stack controller 210. Control next flows on loop 359 back to step 352 so that steps 352-356 repeat to thereby produce a continuing sequence of measurement samples. In an alternate embodiment, step 356 is modified so that the DC measurement values are transmitted from the nodes $N_1$-$N_N$ to the stack controller 210 is another manner, such as by wireline or wireless transmission directly from each node to the stack controller 210.

Figure 3B:
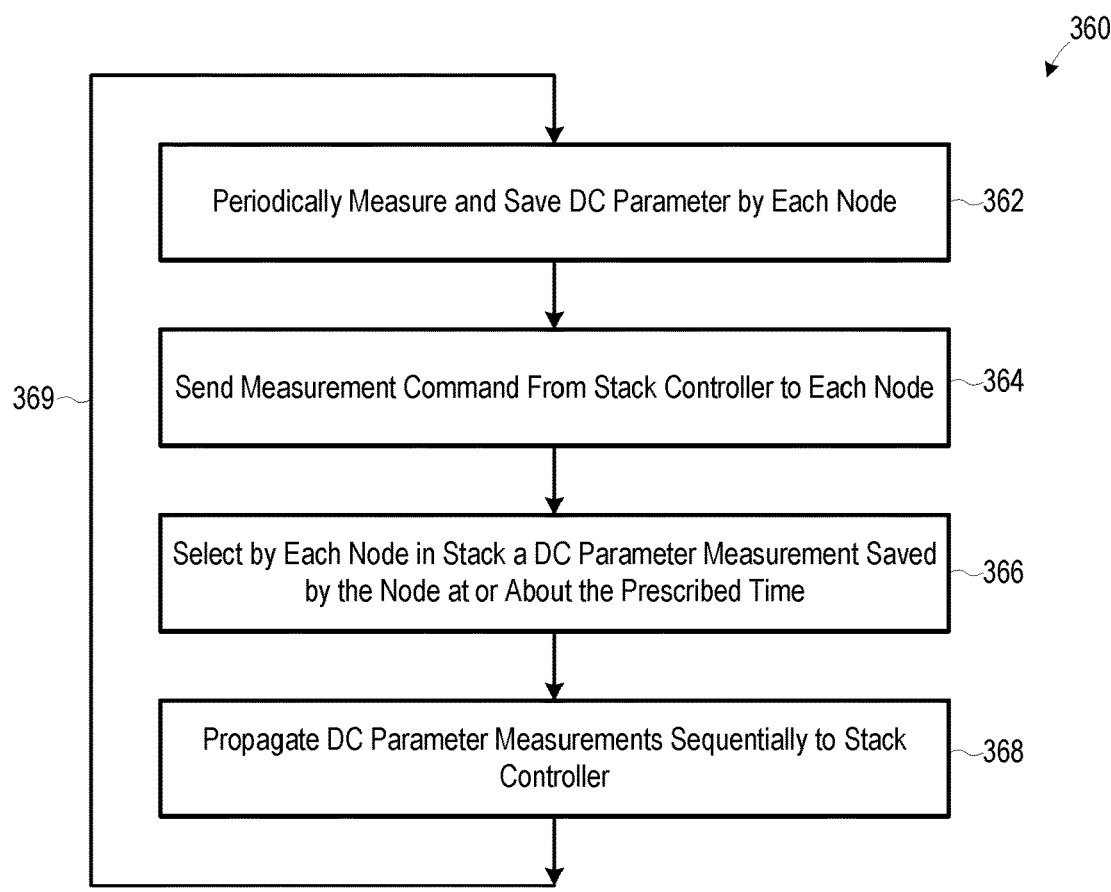
FIG. 3B is an illustrative flow diagram representing a second method to obtain synchronized DC measurement values produced by nodes of an example node stack of FIG. 2.

FIG. 3B is an illustrative flow diagram representing a second method 360 to obtain synchronized DC measurement values produced by nodes of the example node stack $S_1$ of FIG. 2. Method 360 is used, for example, to obtain synchronized electrical and/or temperature measurement values for arc fault detection and/or for managing other aspects of energy storage system 200, such as for use by processor circuitry 217-2, processor circuitry 214, and/or processor circuitry 218 to control charging and discharging of batteries 104. At step 362, each node $N_1$-$N_N$ of the stack $S_1$ periodically measures and saves to its storage 217-3 one or more DC parameters, e.g., voltage, current and temperature. As explained above, an example node performs voltage, current and temperature ('VIT') measurements at least once every 5-10 milliseconds, for example. Each node $N_1$-$N_N$ optionally time stamps each measurement.

At step 364, the stack controller 210 sends a measurement request command to nodes $N_1$-$N_N$. At step 366, each node selects one or more saved measurements, e.g., voltage and/or current corresponding to a time or time window prescribed by the measurement request command, in response to the measurement request command. For example, each node $N_1$-$N_N$ may select one or more saved measurement values corresponding to a time or time window prescribed by the measurement command, or each node $N_1$-$N_N$ may select a plurality of measurement values that are available in storage at the time when the node receives the measurement command. In some embodiments, each node $N_1$-$N_N$ has a common time reference, to enable the node to select saved time measurement values corresponding to the time or time window prescribed by the measurement command.

In some other embodiments, each node $N_1$-$N_N$ selects saved measurement values based at least partially on the node's position in a string and a time required for the measurement request command to propagate from one node to another. For example, assume that a propagation time between adjacent nodes in the string is $\Delta t$. A third node in the string may select stored measurement values corresponding to a time that is $3*\Delta t$ before a time when the third node receives the measurement request command, to compensate for propagation delay of the measurement request command in the string.

In yet some other embodiments, stack controller 210 may provide a custom timing reference to each node $N_1$-$N_N$, to enable the node to select one or more measurement values corresponding to a prescribed time or time window. Stack controller 210 determines custom timing references, for example, based on measured propagation delay between stack controller 210 and each node $N_1$-$N_N$. Stack controller 210 measures propagation delay, for example, at start-up or on a periodic basis.

At step 368, the selected DC measurements, which optionally include time stamps, are propagated through the nodes of the stack to the stack controller 210. Control next flows on loop 369 back to step 362 so that steps 362-368 repeat to thereby produce a continuing sequence of measurement samples. In an alternate embodiment, step 368 is modified so that the DC measurement values are transmitted from the nodes $N_1$-$N_N$ to the stack controller 210 in another manner, such as by wireline or wireless transmission directly from each node to the stack controller 210.

It will be appreciated that the first method 350 involves performing synchronized measurement values and the second method 360 involves selecting previously saved measurement values. The measurements performed at step 354 during the first method 350 are performed synchronously at multiple nodes at a time determined based upon a measurement request command signal. The measurements selected during the second method 360 include measurements saved previously at multiple nodes and that are selected during a time window determined based upon a measurement command request signal. Both the first and second methods 350, 360 obtain measurement values for each of multiple nodes. As explained more fully below, the measurement values are optionally processed to remove potential aliasing due to switching of circuit components and to produce measurement values indicative of whether or not an arc fault may be occurring. In the case of measurement values obtained through the second method 360, processing can involve temporally aligning measurements selected from within a time window at different nodes.

Figure 4A:
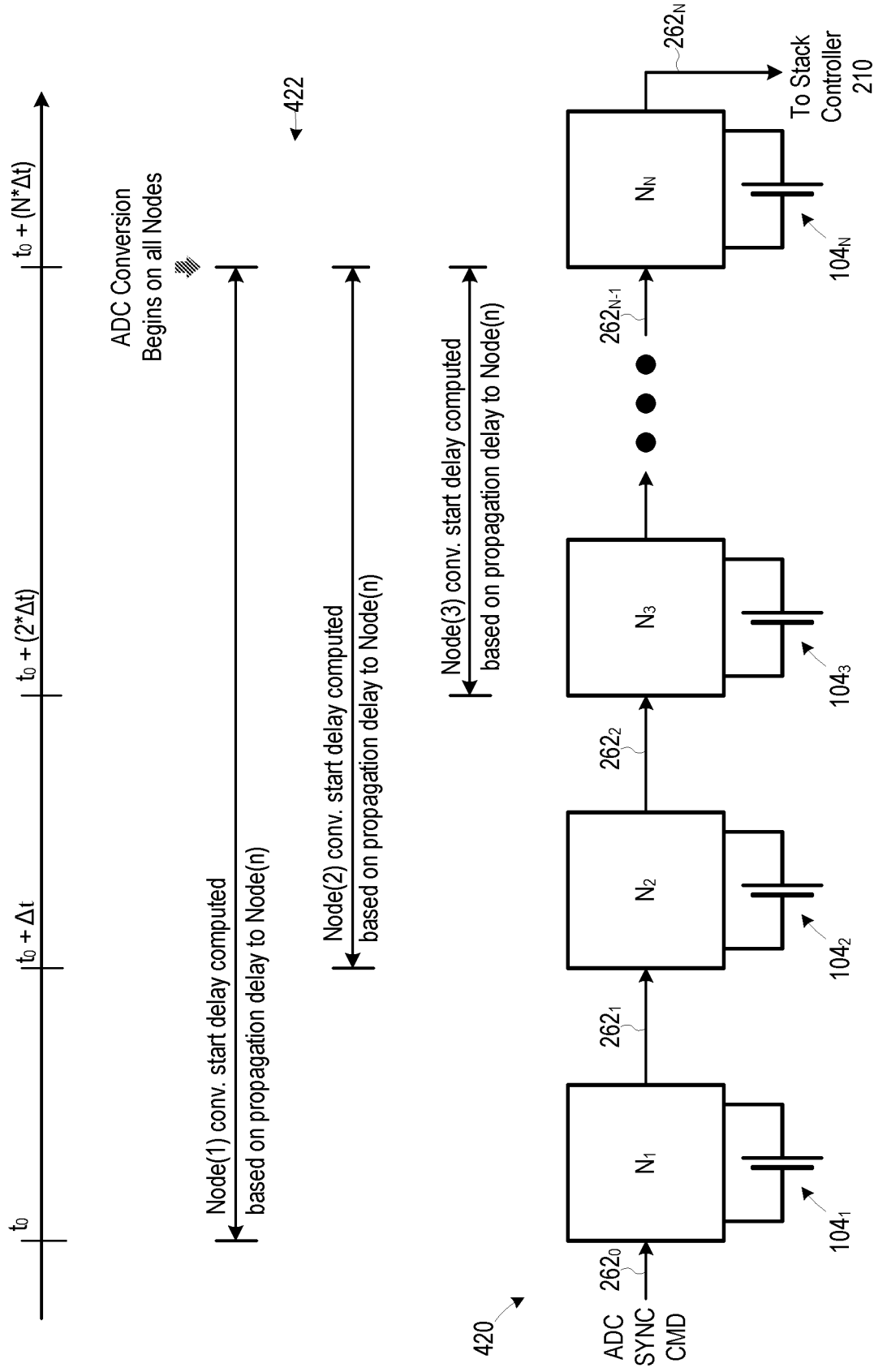
FIG. 4A is an illustrative block diagram showing nodes of a first example embodiment of a stack of FIG. 2 and an example timing diagram showing propagation delay of signals transmitted between the nodes.

FIG. 4A is an illustrative block diagram showing nodes $N_1$-$N_N$ of a first example stack 420, which is an embodiment of a stack S of FIG. 2, and an example timing diagram 422 showing propagation delay of signals transmitted between the nodes. Synchronized voltage measurements at the nodes $N_1$-$N_N$ are used to detect and protect against series arc faults, as explained below, and/or for managing one or more other aspects of energy storage system 200. Synchronized current measurements at the nodes $N_1$-$N_N$ also are used to detect and protect against parallel arc faults, as explained below, and/or for managing one or more other aspects of energy storage system 200. In some embodiments, voltage measurements are synchronized independently of current measurements, so that voltage measurements are not necessarily synchronized with current measurements.

The first example stack embodiment 420 of FIG. 4A is operable according to the first method 350 of FIG. 3A and is operable according to the second method 360 of FIG. 3B. Referring to FIG. 3A and FIG. 4A, when operating according to the first method 350, at step 352 the stack controller 210 of the first example stack embodiment 420 sends a measurement request command over communication bus 262 to command each of the nodes $N_1$-$N_N$ to perform synchronized measurements. More specifically, at step 352, the stack controller 210 transmits a measurement request command over the communication bus segment $262_0$ to node $N_1$. Node $N_1$ in turn, transmits the measurement request commands over the communication bus segment $262_1$ to node $N_2$, and so on until node $N_{N-1}$ transmits the measurement commands over communication bus segment $262_{N-1}$ to node $N_N$.

At step 354, at a prescribed time, each node simultaneously measures one or more DC parameters in response to the measurement request command, e.g., voltage and/or current. The prescribed time is determined to allow adequate time for the measurement request command to propagate sequentially to each node in the stack 420 before the nodes simultaneously measure the commanded parameters. More specifically, at step 354, after each of node $N_1$ through node $N_N$ has received the measurement request command, the nodes $N_1$-$N_N$ synchronously use their ADCs 217-1 to digitally perform the commanded DC measurements at each of the nodes $N_1$-$N_N$. Referring to FIG. 2 and FIG. 4A, in an example embodiment, the host controller 212 provides a master clock signal over timing and control bus 219 to stack controllers of each of the stacks $S_1$-$S_K$, which in turn, provide the master clock signal to the nodes for use to synchronize measurements at the nodes of individual stacks and to synchronize measurements across different stacks of the system 200. The master clock also can be used for time stamping of the synchronized measurements.

In an example stack $S_1$, the nodes $N_1$-$N_N$ delay measurement in response to receipt of a measurement request command until the last node in the ordered sequence, $N_N$, receives the measurement request command. In the example stack $S_1$, the nodes are aware of the total number of nodes in the stack and their sequential locations in the stack. In the first example stack embodiment 420, the nodes are configured to synchronize digitally capturing voltage measurements and to synchronize digitally capturing current measurements, for example, based upon propagation delay in transmission of measurement request command signals between the nodes. In the first example stack embodiment 420, propagation delay is $\Delta t$ between a time when a node receives a voltage measurement request command or a current measurement request command and a time when a next node in the sequence receives the voltage or current measurement request command. Thus, assuming for example, that $N_1$ receives a command at time t0, then $N_2$ receives the command at t0+$\Delta t$, $N_3$ receives the command at t0+2$\Delta t$, and so on, until node $N_N$ receives the command at t0+N$\Delta t$. In the first example stack embodiment 420, to achieve synchronous measurements in response to a measurement command, each node in the sequence delays performing a commanded measurement at least until the last node in the sequence receives the measurement command. More particularly, in the first example stack embodiment 420, $N_1$ delays measurement for at least a time interval N$\Delta t$; $N_2$ delays measurement for at least a time interval (N−1)$\Delta t$, and so on, and node N measure without a $\Delta t$ related delay.

Referring to FIG. 3A and FIG. 4A, at step 356, the time stamped commanded DC measurements are propagated through the nodes of the stack to the stack controller 210. More particularly, within the first example stack embodiment 420, following a synchronous digital capture of the commanded voltage and current measurements, for example, each node transmits a time stamped voltage measurement and a time stamped current measurement to the stack controller 210 via the communication bus 262. For example, $N_1$ transmits its measurements over bus segment $262_1$ to $N_2$, which in turn transmits $N_1$'s measurements over bus segment 2622 to $N_3$, and so on until $N_1$'s measurements reach $N_N$, which in turn, transmits $N_1$'s measurements over bus segment $262_N$ to the stack controller 210. Moreover, for example, $N_{N-1}$ transmits its commanded measurements over bus segment $262_{N-1}$ to $N_N$, which in turn, transmits $N_{N-1}$'s measurements over bus segment $262_N$ to the stack controller. Node $N_N$, for example, transmits its measurements directly to the stack controller 210 over bus segment $262_N$. An example stack controller 210 at each stack processes voltage and current measurements, as explained below, received from the respective nodes within its stack to identify occurrences of arc fault conditions within its stack.

Referring to FIG. 3B and FIG. 4A, when operating according to the second method 360, at step 362 each node performs routine periodic voltage, current and temperature measurements, for example, to determine state of charge estimates for the battery 104 and/or to dynamically control charge and discharge of the battery 104. Each node also optionally time stamps and stores at least a portion of the periodic measurements to its local storage 217-3. In certain embodiments, the host controller 212 provides a master clock signal over timing and control bus 219 to stack controllers 210 of each of the stacks $S_1$-$S_K$, which in turn, provide the master clock signal to the nodes for use to time stamp the saved measurements and to synchronize collection of the saved measurements across nodes of an individual stack and across different stacks. In some embodiments, at step 364, the stack controller 210 of the first example stack embodiment 420 sends a measurement request command over communication bus 262 to command each of the nodes $N_1$-$N_N$ to perform synchronized collection of measurements made previously by the nodes $N_1$-$N_N$ as described above with reference to step 352. The measurement request command is propagated node-to-node with the propagation delays described above. At step 366, each node in the first example embodiment of a stack 420 selects one or more saved measurements that were performed within a prescribed time window or at a prescribed time. Assuming, for example, that each node performs one DC voltage measurement and one DC current measurement at 5-10 millisecond intervals, then a time window having a duration of 5-10 milliseconds can encompass one voltage and one current measurement and a time window having a duration of 50-100 milliseconds can encompass ten voltage and ten voltage measurements, for example. At step 368, the time stamped measurements collected in response to the command are propagated through the nodes of the stack to the stack controller 210 as described above with reference to step 356.

Figure 4B:
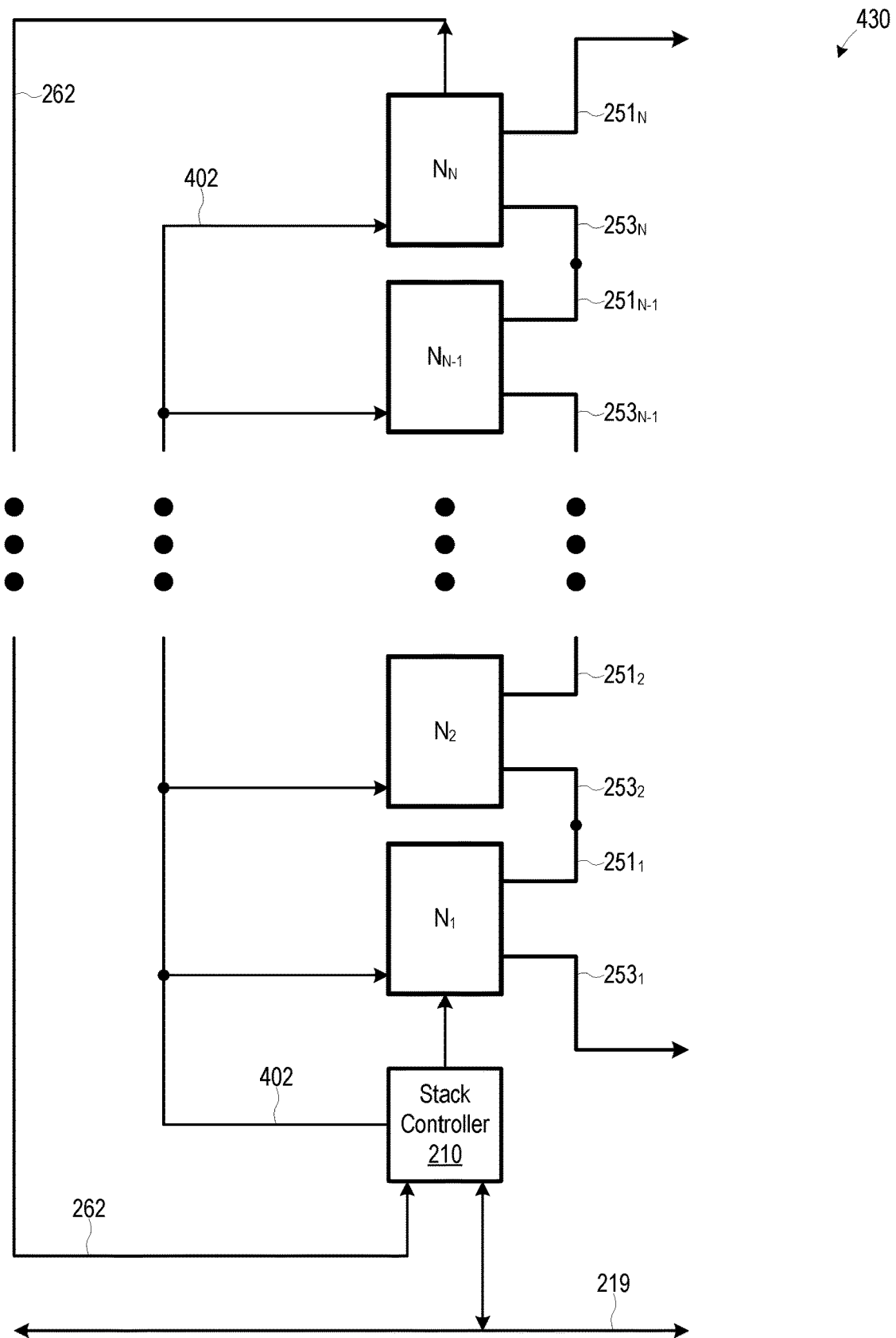
FIG. 4B is an illustrative block diagram showing nodes of a second example embodiment of a stack of FIG. 2.

FIG. 4B is an illustrative block diagram showing nodes $N_1$-$N_N$ of a second example embodiment of a stack 430 of FIG. 2. The second example embodiment of a stack 430 includes a synchronous command bus 402 coupled to synchronously provide measurement request commands to multiple nodes without propagation delay, although a communication bus 262 that couples signals between the nodes experiences propagation delays like those described above with reference to FIG. 4A. The synchronous bus 402 also acts as an alarm line to transmit alarm signals such as to force the energy storage system into bypass mode, floating mode, or safe mode, or to suddenly change from charging to discharging or back again, for example. An advantage of this alternative implementation is ease of synchronization and faster results. Measurements still are transmitted along the daisy chain bus (N*Delta t) but there is no need for a measurement request command to also propagate through the bus (another N*Delta t). To avoid unnecessary complexity of presentation and to promote illustrative clarity of explanation, components of the second example embodiment of a stack 430 that correspond to components of the first example embodiment of a stack 420 will not be described again.

The second example stack embodiment 430 of FIG. 4B is operable according to the first method 350 of FIG. 3A and is operable according to the second method 360 of FIG. 3B. Referring to FIG. 3A and FIG. 4B, when operating according to the first method 350, at step 352 the stack controller 210 of the second example stack embodiment 430 sends a measurement request command over the synchronous command bus 402 to provide a measurement request command simultaneously to nodes $N_1$-$N_N$. At step 354, at a prescribed time, the nodes $N_1$-$N_N$ simultaneously measure one or more parameters in response to the measurement request command, e.g., voltage and/or current. The prescribed time can be instantaneous upon receipt of the measurement request command over the bus 402, for example. The host controller 212 provides a master clock signal over timing and control bus 219, which is used for time stamping of the synchronized measurements. At step 356, the time stamped measurements performed in response to the command are propagated through the nodes of the stack to the stack controller 210 as described above. In certain embodiments, measurements performed in one stack $S_1$-$S_K$ are synchronized with measurements performed in each other stack $S_1$-$S_K$, such as based on a master clock signal from host controller 212.

Referring to FIG. 3B and FIG. 4B, when operating according to the second method 360, at step 362 the nodes $N_1$-$N_N$ perform routine periodic voltage, current and temperature measurements, such as to determine state of charge estimates for the battery 104 and/or to dynamically control charge and discharge of the battery 104 as described above. The host controller 212 provides a master clock signal over timing and control bus 219, which is used for time stamping of the measurements. At step 364, the stack controller 210 of the second example stack embodiment 430 sends a measurement request command over the synchronous command bus 402 to provide a measurement request command simultaneously to nodes $N_1$-$N_N$. At step 366, at a prescribed time, each node selects one or more saved measurement, e.g., voltage and/or current, in response to the measurement request command. More particularly, at step 366, each node in the second example embodiment of a stack 430 selects one or more saved measurements that were performed within a prescribed time window or at a prescribed time. In some embodiments, measurements performed in a prescribed time window might not be performed at the same time, such as due to propagation delays or processing delays. In such cases, saved measurements are optionally aligned in time, such as by using an interpolation technique. At step 368, the selected measurements with time stamps are propagated through the nodes of the stack to the stack controller.

Figure 4C:
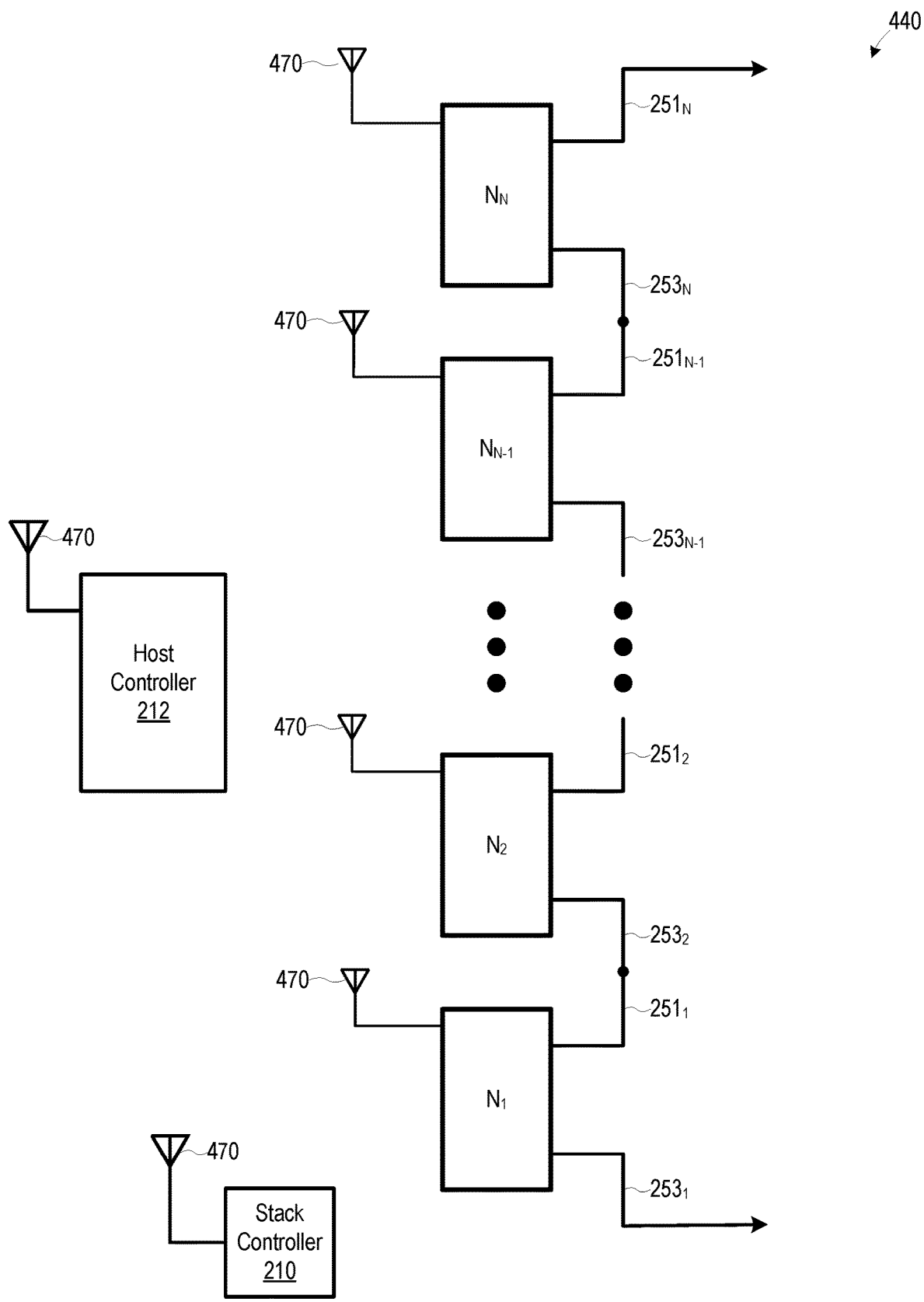
FIG. 4C is an illustrative block diagram showing nodes of a third example embodiment of a stack.

FIG. 4C is an illustrative block diagram showing nodes $N_1$-$N_N$ of a third example embodiment of a stack 440. The nodes $N_1$-$N_N$, stack controller 210 and host controller 212 of the third example stack embodiment 440 include wireless transceivers 470 for wireless communication among them. Wireless communication supplants the synchronous command bus 402 and supplants the communication bus 262, in this embodiment. In an example system 400, the nodes, stack controller and the host controller are configured to operate as a wireless mesh communications area network. The third example stack embodiment 440 of FIG. 4C is operable generally in accordance with the first method 350 of FIG. 3A and is operable generally in accordance with the second method 360 of FIG. 3B, although the transceivers 470 at the nodes may obviate the need to propagate signals sequentially between nodes. Instead, nodes can communicate directly, wirelessly, with the stack controller 210, for example, in some embodiments. Persons skilled in the art will understand the applicability of the first and second methods 350, 360 based upon the above explanations with reference to FIGS. 4A-4B, and therefore, to avoid unnecessary complexity of presentation and to promote illustrative clarity of explanation, details of application of the first and second processes 350, 360 are not set forth with reference to FIG. 4C.

Stack-Level Series Arc Fault Detection

Figure 5A:
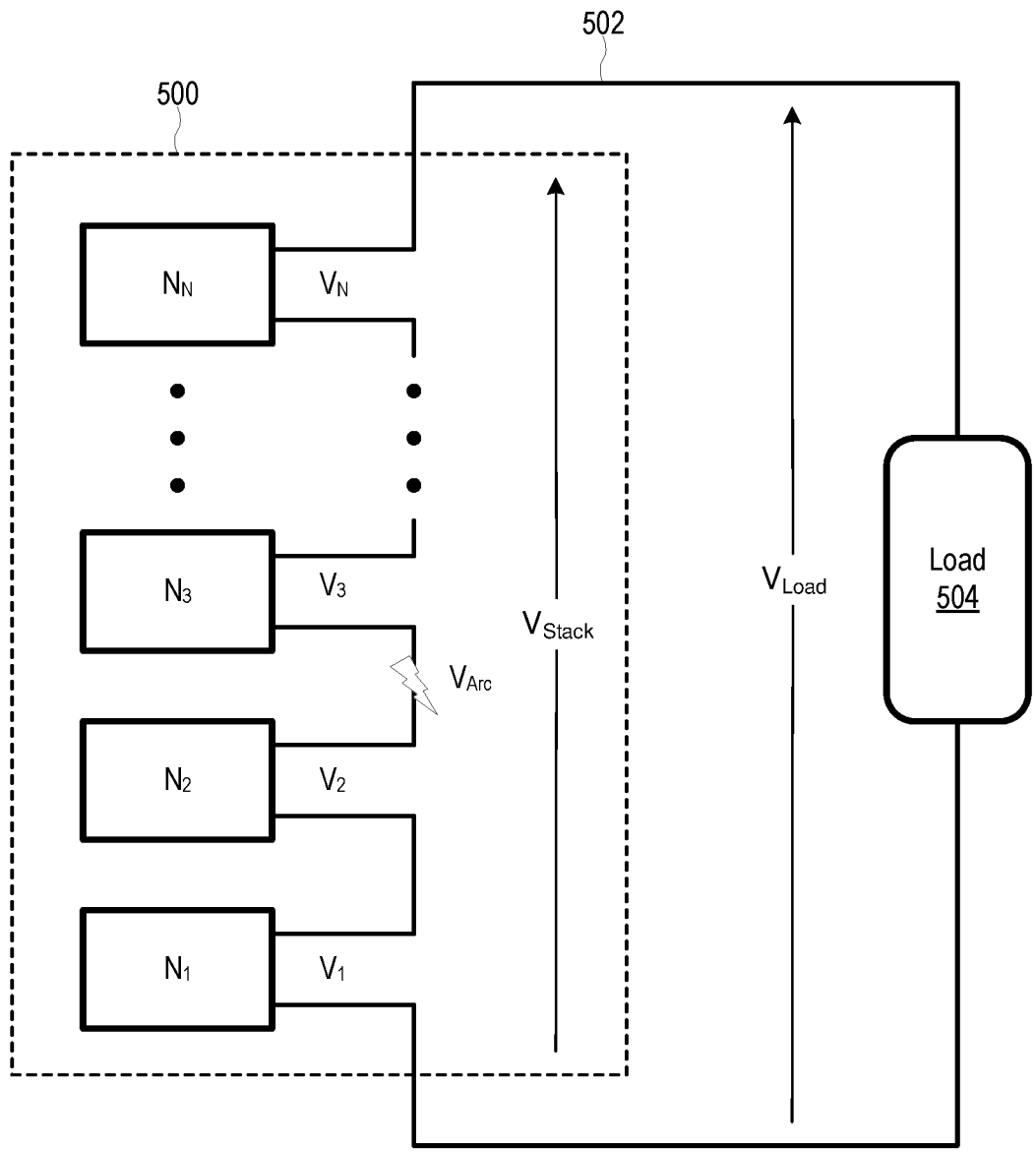
FIG. 5A is an illustrative diagram of an example stack including multiple nodes showing an occurrence of a stack-level series arc fault within the stack.

FIG. 5A is an illustrative diagram of an example BMS stack 500 including multiple nodes $N_1$-$N_N$ showing an occurrence of a stack-level series arc fault within the stack. A series arc is the result of the failure of the intended continuity of a conductor or connector in an electrical circuit. As used herein, a stack-level series arc fault refers to an arc within an individual stack instead of in the connections between stacks. The stack 500 is coupled in parallel with an electrical load 504. Each node $N_1$-$N_N$ produces a corresponding node output voltage $V_1$-$V_N$, which are coupled in series. The series-coupled node voltages $V_1$-$V_N$ are coupled by a conductor network 502 in parallel with the load 504. During normal operation when no series arc fault occurs within the stack 500, a sum of the node voltages within the stack 500 matches a setpoint voltage for the stack and is consistent with, e.g. equals, a measured voltage for the stack.

$$V_{STACK} = V_1 + V_2 + V_3 + \ldots + V_N$$

However, an occurrence of a series arc fault at a node within the stack 500 adds a series voltage element to the stack voltage, $V_{STACK}$. An occurrence of a series arc fault will cause $V_{STACK}$ across the stack 500 to be greater than or less than the setpoint sum of the voltages $V_1 \ldots V_N$ across the individual nodes $N_1$-$N_N$ of the stack 500 and to be greater than or less than a measured sum of $V_1 \ldots V_N$ across the individual nodes $N_1$-$N_N$ of the stack 500. For example, if a series arc fault voltage $V_{ARC}$ occurs between node $N_2$ and node $N_3$ within the stack 500 then, $$V_{STACK} = V_1 + V_2 + V_3 + \ldots + V_N + V_{ARC}$$

Figure 5B:
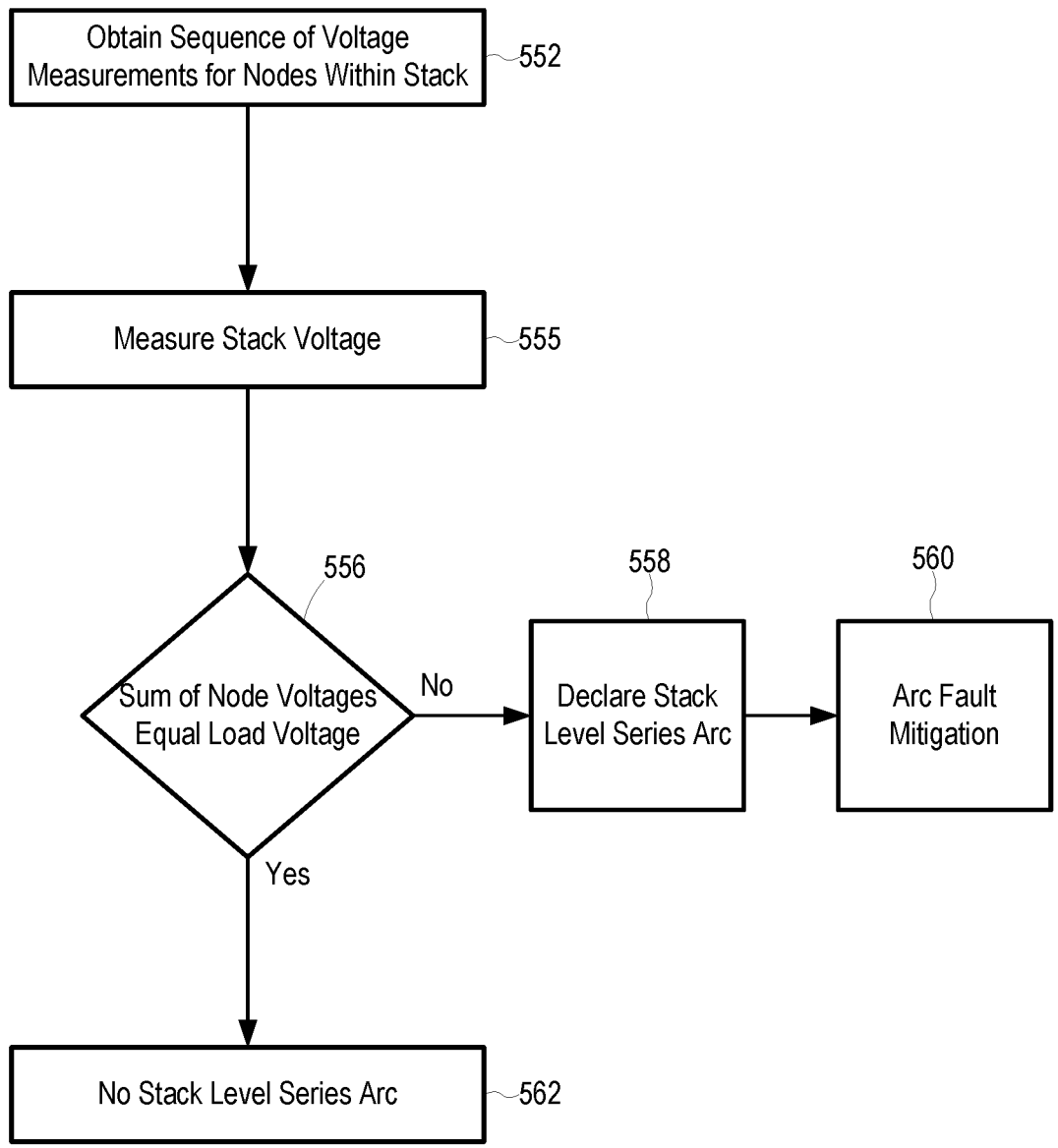
FIG. 5B is an illustrative flow diagram representing a method to detect and react to a series arc fault within the stack of FIG. 5A.

Thus, in this illustrative example, a series arc voltage $V_{ARC}$ within a stack causes voltage, $V_{STACK}$, across the stack 500 to not match the sum of the node output voltages of the stack. FIG. 5B is an illustrative flow diagram representing of a method 550 to detect and react to a series arc fault within the stack of FIG. 5A. Code instructions $C_{AD1}$ and $C_{AD2}$ are used to configure a stack's stack controller (not shown) to perform the method of FIG. 5B. At step 552 a voltages measurement value is obtained for each node of the stack. An example step 552 can involve the first method 350 of FIG. 3A resulting in obtaining node voltage measurements that are synchronized across nodes with a measurement command signal. An alternative example step 552 can involve the second method 360 of FIG. 3B resulting in obtaining node voltage measurements that contain measurements that fall within a common time window or a performed at a common time. In some embodiments, the node voltage measurements obtained in step 552 are filtered, such as by using one or more low-pass filters, to remove noise injected by power conversion circuitry and associated harmonics that may otherwise interfere with arc fault detection.

At step 555 a stack voltage $V_{stack}$ is measured synchronously with the synchronous node voltage measurements. Decision step 556 determines whether the summation of the measured node voltages of the stack is consistent with, e.g. matches, the measured stack voltage. At step 558 a stack-level series arc fault is declared, i.e. an occurrence of a voltage $V_{ARC}$, in response to a determination that the summation of the measured node voltages $V_1 + V_2 + V_3 + \ldots + V_N$ does not match the stack voltage and differs from the stack voltage by at least a prescribed threshold amount. In an example system 500, the prescribed difference is large enough to indicate an occurrence of a series arc as opposed to normal variation in stack voltage level that can occur due to the voltage drop across resistance in series with the nodes from connectors and wires, for example. In addition, the prescribed difference may be large enough to account for normal variations due to measurement tolerance. In an example system 500, with a stack voltage in a range 500V-1000V, a 1%, 2% or even up to 5% difference or a several volt up to about 20V difference between a sum of node voltages and stack voltage sustained for at least a prescribed minimum time interval such as at least one second typically is indicative of an occurrence of a stack-level series arc fault. In some other embodiments, decision step 556 detects that there is a mismatch between the sum of measured node voltages and the measured stack voltage only if the mismatch persists for a predetermined amount of time or a predetermined number of measurement cycles.

In still other embodiments, at least some of the voltages considered in step 556 are filtered to achieve a desired arc fault detection profile. For example, in particular embodiments, (a) an error value equal to a difference between the sum of the measured node voltages and the measured stack voltage is determined, (b) the error value is filtered by a low-pass filter, and (c) a stack-level series arc fault is determined in response to the filtered error value meeting or exceeding a prescribed threshold amount, in step 556. The low-pass filter weights the arc fault detection profile by increasing required magnitude or duration of an arc fault voltage for detection in step 556.

At step 560, nodes are controlled so as to safely extinguish the arc. This can include isolating any energy storage cells that can feed power to the arc while providing the desired node output characteristic (floating, shorted, low-power or power-limited state) and with or without emergency cell discharge, as needed. These fault reactions are discussed in more detail below. Alternately or additionally, stack 500 could be controlled to discharge its batteries into load 204 or into another stack, such as in a manner which limits discharge current magnitude to a safe value, to help extinguish the arc. The method 550 repeats periodically. During active fault management in an example system 500, the method 550 is repeated multiple times per second, every few seconds, or every few minutes, for example. Alternatively, the method 550 can be repeated less frequently, on the order of once per day at power up to avoid overly taxing computer resources.

System-Level Series Arc Fault Detection

Figure 6A:
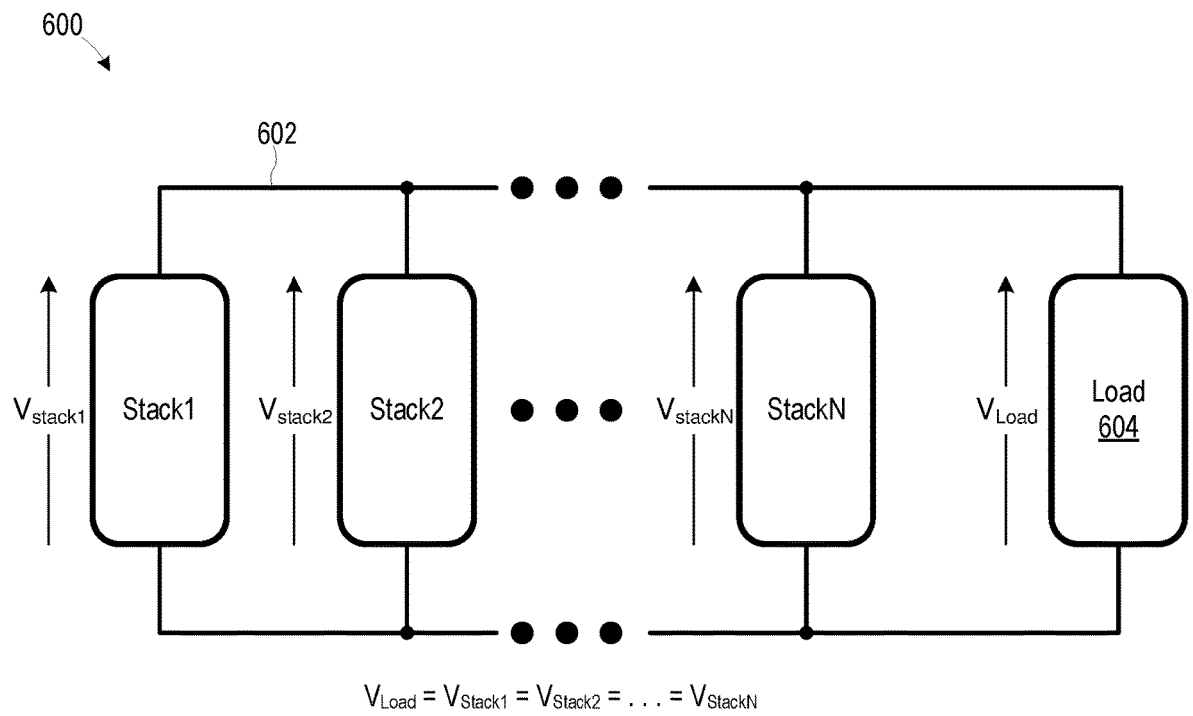
FIG. 6A is an illustrative diagram of an example energy storage system during normal operation with no arc fault occurrences.
Figure 6B:
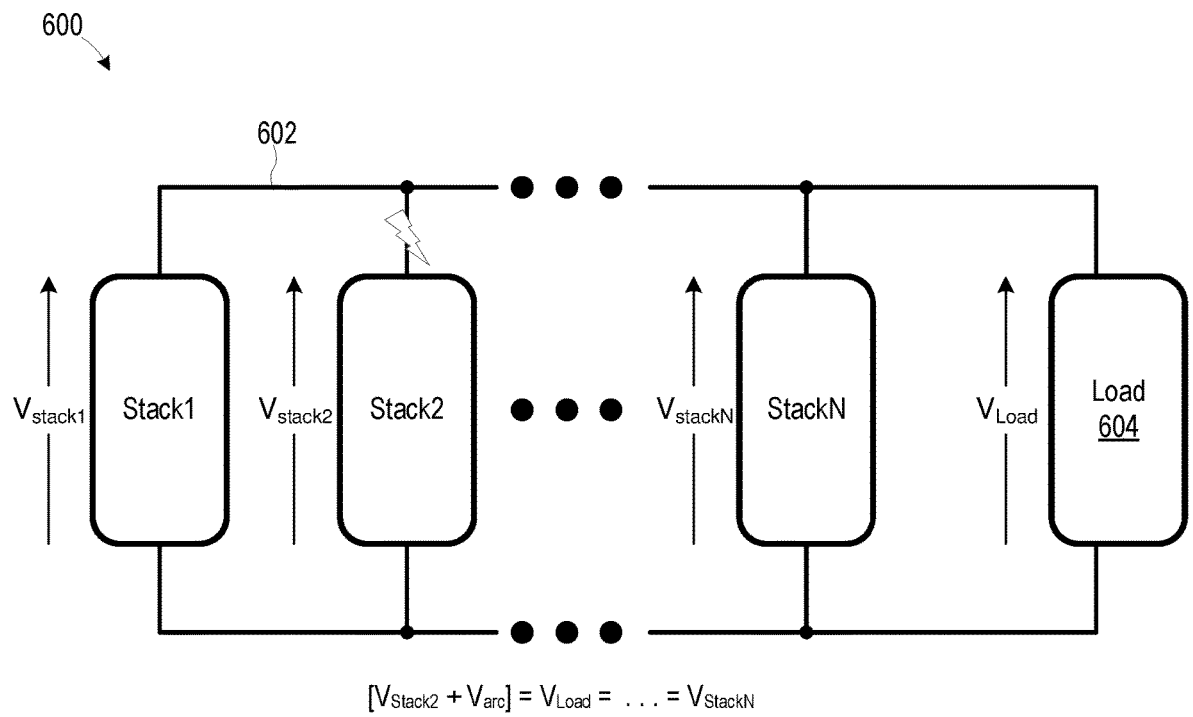
FIG. 6B is an illustrative diagram of the example energy storage system of FIG. 6A during an occurrence of a system-level series arc fault.

FIG. 6A is an illustrative diagram of an example energy storage system 600 during normal operation with no arc fault occurrences. FIG. 6B is an illustrative diagram of the example energy storage system 600 of FIG. 6A during an occurrence of a system-level series arc fault. As used herein, a system-level series arc fault refers to a series arc fault that occurs outside of a node stack in an electrical connection between node stacks or in an electrical connection between the node stacks and a load. Each stack includes one or more nodes, and the stack voltage for a stack is a sum of measured voltages of the nodes of the stack. Alternately, the stack voltage is a measured voltage across the stack as described above with reference to FIGS. 5A-5B. The stack voltages can be summed locally at stack controllers (not shown) of individual stacks and be reported to a host controller, or alternatively the node voltages at the individual stacks can be reported to a host controller (not shown), which sums node voltages received from individual stacks to determine individual stack voltages. The stack voltages and a load voltage are compared at a host controller (not shown). The system 600 includes multiple BMS stacks, Stack1, Stack2, Stack3 coupled in parallel by a conductor network 602 with an electrical load 604. To avoid unnecessary complexity of presentation and to promote illustrative clarity of explanation, details of stacks are omitted. However, it will be appreciated that an example system 600 can have a topology like that of system 200 of FIG. 2, for example. During normal operation represented by FIG. 6A, when no series arc fault present, the stacks have matching stack voltages across them, which matches a voltage $V_L$ across the load:

$$V_{LOAD} = V_{STACK1} = V_{STACK2} = \ldots = V_{STACKN}$$

However, an arc fault in series with one of the stacks will result in a voltage reading that is different (higher or lower) than the voltages across the other stacks and different from the voltage $V_L$ across the load. For example, as represented by FIG. 6B, if a series arc fault $V_{ARC}$ occurs in series with Stack2 then, $$V_{LOAD} = V_{STACK1} = [V_{STACK2} + V_{ARC}] \ldots = V_{STACKN}$$

Thus, in this illustrative example, a system-level arc fault, with voltage $V_{ARC}$ across a stack, causes a voltage measured across Stack2, $V_{STACK2}$, to be lower than the other stack voltages and the load voltage, $V_{LOAD}$. The arc, for example, can be in a wire itself or the connections from a wire to the stack or from a wire to the bus. In the event that one of the stack voltages does not match the other stack voltages, the host controller can determine that a system-level series arc fault has occurred at that mismatching stack. In this example, the host is configured to identify the location of the arc as being in an electrical connection between Stack2 based upon a determination at the host that the voltage across Stack2 does not match voltages of the other stacks and does not match a load voltage, $V_{LOAD}$. In an example system, a host controller (not shown) can send a command to the stack controller (not shown) of the mismatching stack to cause that stack to control the nodes of the stack so as to extinguish the arc while the other stacks remain operational, for example. Mitigation techniques can include putting the stack into a disconnect state or a low-power safe state, while optionally discharging the cells to improve safety, for example. In one example, the batteries 104 can be isolated from the nodes with the node outputs floating so as to extinguish the current path for the series arc. Moreover, alternatively, for example, the nodes of the mismatching stack can be transitioned to a safe mode in which technicians can more safety, explained below, trouble-shoot to locate the source of the system-level series arc fault.

Figure 6C:
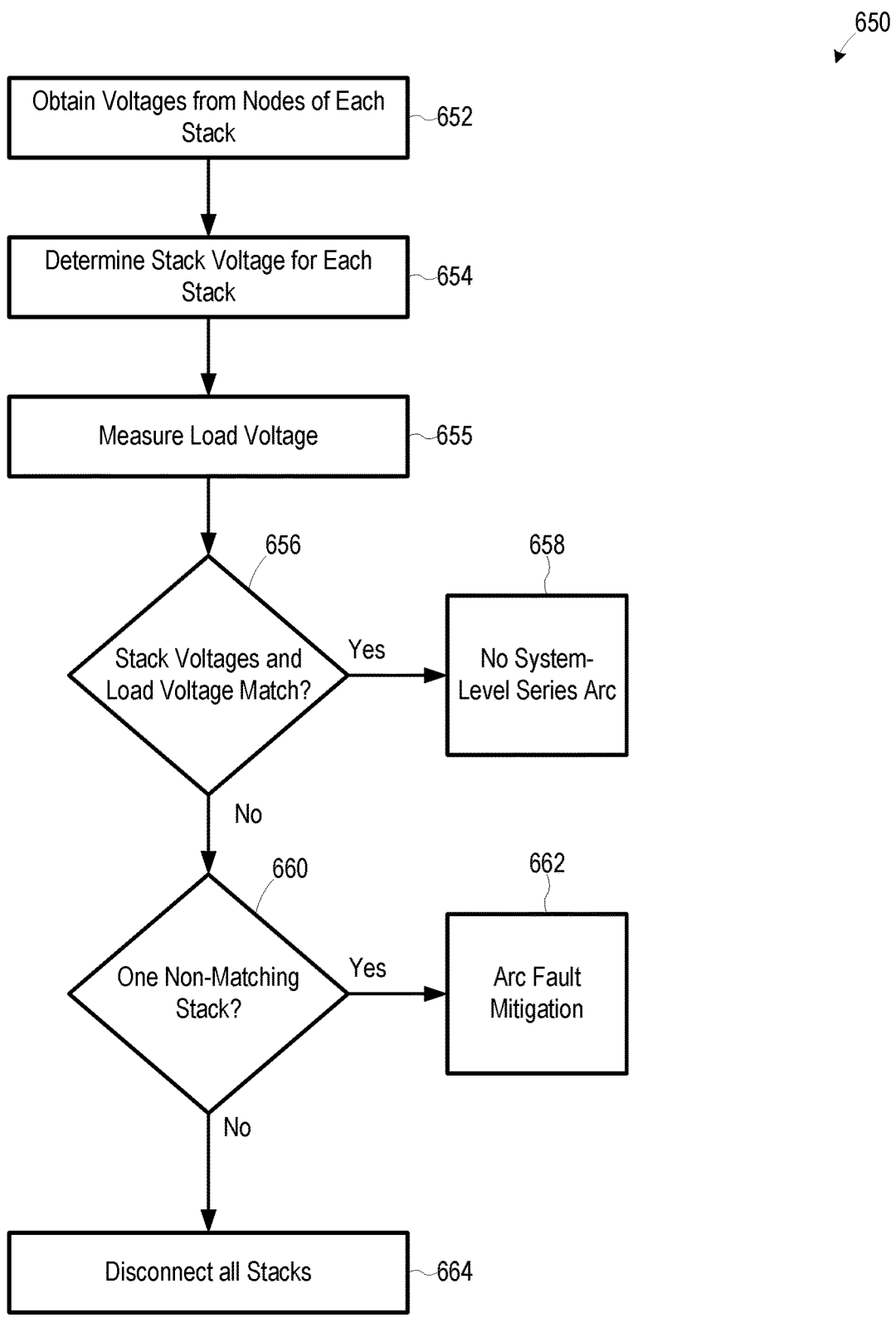
FIG. 6C is an illustrative flow diagram representing a method to detect and react to the system-level series arc fault voltage of FIG. 6B.

FIG. 6C is an illustrative flow diagram representing a method 650 to detect and react to the system-level series arc fault voltage of FIG. 6B. Code instructions $C_{AD1}$ and $C_{AD2}$ are used to configure the stack controllers (not shown) and a host controller (not shown) of the system 600 of FIGS. 6A-6B to cooperate to perform the method of FIG. 6C. At step 652, node voltages measurements are obtained for each node of each stack, Stack1, Stack2, Stack3. An example step 652 can involve the first method 350. An alternative example step 652 can involve the second method 360. At step 654, a summation of the measured voltages is determined for each stack to determine stack voltages $V_{STACK1}$, $V_{STACK2}$, $V_{STACK3}$, for the stacks. In an alternate embodiment, steps 652 and 654 are replaced with a step of obtaining respective measured stack voltages for each stack. At step 655 a load voltage $V_L$ is measured synchronously with the stack voltage measurements.

In some embodiments, the voltage measurements obtained in steps 654 and 655 are filtered, such as by using one or more low-pass filters, to remove noise injected by power conversion circuitry and associated harmonics that may otherwise interfere with arc fault detection. In certain embodiments, one or more low-pass filters that are used to filter measured load voltage values have substantially the same bandwidth as one or more low-pass filters that are used to filter stack voltage measurements and/or node voltage measurements. In this document, first and second low-pass filters are considered to have substantially the same bandwidth if a bandwidth of the first low-pass filter differs from a bandwidth of the second low-pass filter by no more than ten percent.

Decision step 656 determines whether the stack voltages match one another and match the load voltage. In some embodiments, at least some of the voltages considered in decision step 656 are filtered to achieve a desired arc fault detection profile, such as in a manner analogous to that discussed above with respect to step 556 of FIG. 5B. Step 658 determines that there is no system-level series arc in response to a determination that all stack voltages match one another and match the load voltage. Decision step 660 determines whether a single stack voltage mismatches the other stack voltages. Step 662, in response to a system-level series arc fault, nodes are controlled so as to safely extinguish the arc. This can include isolating any energy storage cells that can feed power to the arc while providing the desired node output characteristic (floating, shorted, low-power or power-limited state) and with or without emergency cell discharge, as needed. Step 664 electrically isolates each of the nodes of each stack from all other stacks and from the load in response to a determination that more than a single stack voltage mismatches other stack voltages or that the load voltage mismatches the stack voltages. The method 650 repeats periodically. During active fault management in an example system 600, the method 650 is repeated multiple times per second, every few seconds, or every few minutes, for example. Alternatively, the method 650 can be repeated less frequently, on the order of once per day at power up to avoid overly taxing computer resources.

In some embodiments, stack controllers 210 and/or host controller 212 perform both of methods 550 and 650, either sequentially or concurrently, to achieve hierarchical series arc fault detection. More specifically, stack controllers 210 and/or host controller 212 perform method 550 to realize a first level of series arc fault detection, i.e. stack-level series arc fault detection to detect a series arc fault within a stack. Additionally, stack controllers 210 and/or host controller 212 perform method 650 to realize a second level of series arc fault detection, i.e. system-level series arc fault detection to detect a series arc fault outside of the stacks. Consequently, these embodiments are advantageously capable of detecting a series arc fault at any location in the energy storage system 200, i.e. both within the stacks and outside of the stacks. Additionally, methods 550 and 650 optionally share measured stack voltage values and/or measured node voltage values, which helps minimize measurement acquisition and processing requirements. Furthermore, the concept of hierarchical series arc fault detection could be extended to include additional levels. For example, in some alternate embodiments where the stacks include multiple modules, series arc fault detection is performed at a module-level, as well as at the aforementioned stack-level and system-level, to achieve hierarchical series arc fault detection.

Stack-Level Parallel Arc Fault Detection

Figure 7A:
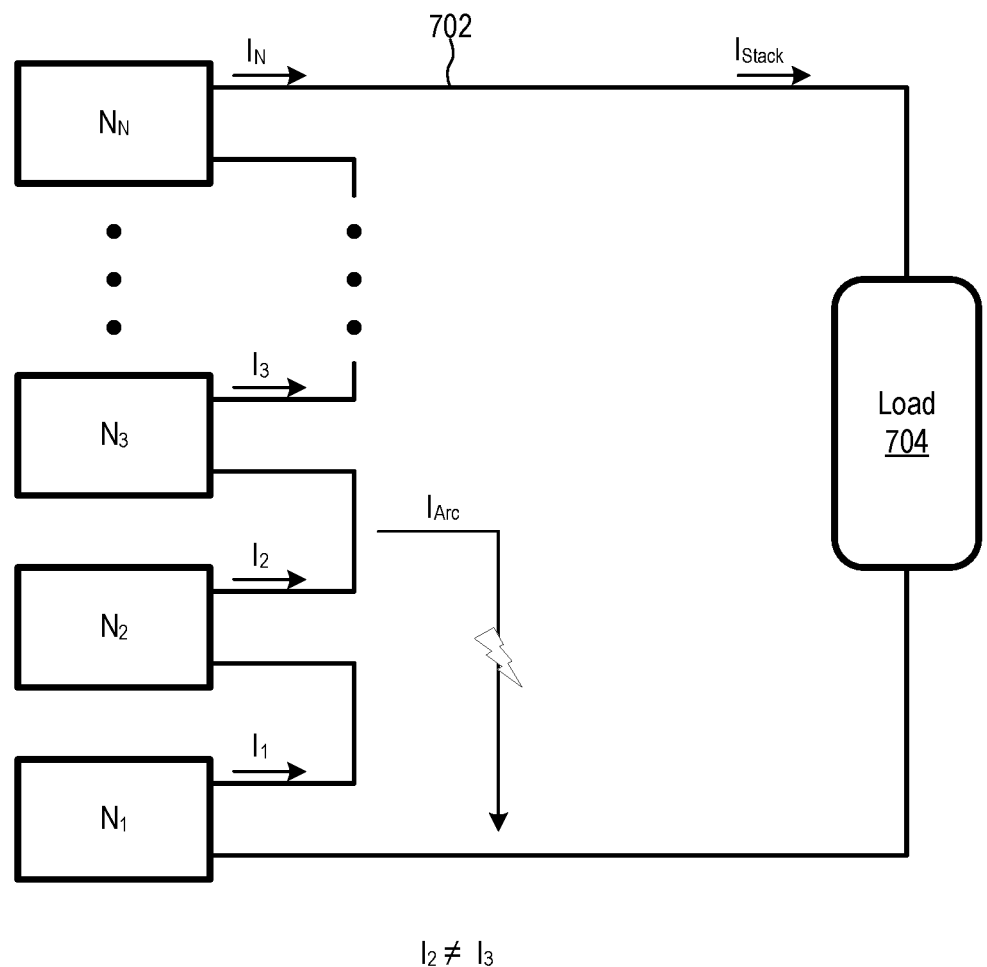
FIG. 7A is an illustrative diagram of an example stack including multiple nodes showing an occurrence of a stack-level parallel arc fault within the stack.

FIG. 7A is an illustrative diagram of an example BMS stack 700 including multiple nodes $N_1$-$N_N$ showing an occurrence of a stack-level parallel arc fault within the stack. To avoid unnecessary complexity of presentation and to promote illustrative clarity of explanation, details of the stack 700 are omitted. However, it will be appreciated that an example stack 700 can have a topology like that of stack $S_1$ of FIG. 2, for example. As used herein, a stack-level parallel arc fault refers to an arc from a point inside the stack to another point inside the stack or to electrical ground. The stack 700 is coupled in parallel with an electrical load 704. Each node $N_1$-$N_N$ produces a corresponding node output current $I_1$-$I_N$. The series-coupled nodes are coupled by a conductor network 702 in parallel with the load 704. During normal operation when no parallel arc fault occurs within the stack 700, a sum of the currents within the stacks $I_1$-$I_N$ match.

$$I_{STACK}=I_1=I_2=I_3= \ldots =I_N$$

However, a parallel arc fault current within the stack 700 results in a parallel arc fault current $I_{ARC}$ that can add to or subtract from some of the currents within the stack. For ground faults and parallel arc faults within a stack, the arc fault current $I_{ARC}$ results in node currents no longer being equal. For example, if a sustained parallel arc fault $I_{ARC}$ occurs between nodes $N_2$ and $N_3$ then, $$I_1=I_2 \neq I_3= \ldots =I_N, \text{ and}$$

$$I_{STACK}=I_N=I_3=I_2+I_{ARC}=I_1+I_{ARC}$$

It will be appreciated that a direction of an arc fault current can vary, and therefore, it could add or subtract current from nodes; the above illustrative example assumes addition of the arc fault. Thus, in this illustrative example, an occurrence of a stack-level parallel current fault $I_{ARC}$ causes the current through at least one of the nodes to not match current through other nodes.

A node location, within a stack, of a stack-level parallel arc fault is determined by an arc fault location process that includes steps of comparing currents of a sequence of adjacent nodes within the stack. A stack's stack controller is configured to perform an arc fault location process that determines whether current in adjacent pairs of nodes matches. The process identifies a node where current within the node does not match current within a node adjacent to that node. A node location in a sequence of nodes where the current changes from matching the current of its adjacent nodes to not matching at least one of its adjacent nodes is determined to be a node location of a stack-level parallel arc fault. Therefore, a location of a stack-level parallel arc fault within the stack is determined by finding where in the stack the current changes. For example, referring to FIG. 7A, $I_1=I_2$ and $I_3=I_4= \ldots =I_N$. However, $I_2=I_3+I_{ARC}$. In this example, there is extra current flowing from the connection between $N_2$ and $N_3$ to another point in the stack, and an arc is determined to be occur at either node $N_2$ or node $N_3$.

Figure 7B:
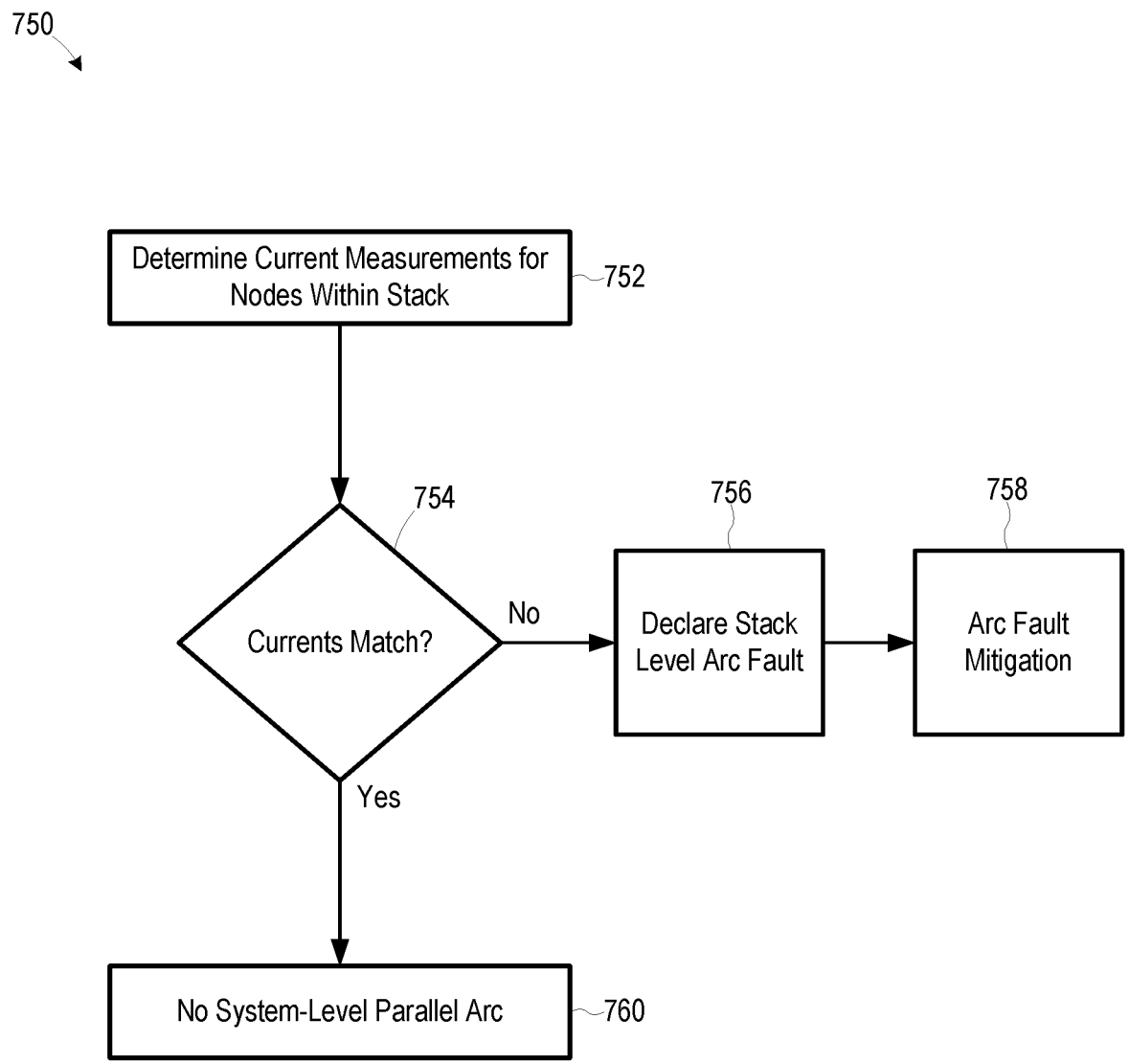
FIG. 7B is an illustrative flow diagram representing a method to detect and react to a stack-level parallel arc fault current within the stack of FIG. 7A.

Thus, a location of the parallel current can be determined to be at a point in the stack of nodes where a series current discontinuity occurs, that is where a current magnitude changes, e.g., at a juncture between node $N_2$ and node $N_3$ in the example. The arc fault location process can be used, for example, by a maintenance technician to more rapidly locate and repair the fault. In an example system, the stack's stack controller can send a command to the nodes of the stack to isolate their battery devices and thereby de-energize the nodes and extinguish the arc. Moreover, alternatively, a subset of the nodes of stack 700 can be transitioned to a safe mode in which technicians can more safely trouble-shoot to locate the source of the stack-level parallel arc fault. FIG. 7B is an illustrative flow diagram representing of a method 750 to detect and react to a stack-level parallel arc fault current within the stack of FIG. 7A. Code instructions $C_{AD1}$ and $C_{AD2}$ are used to configure a stack controller (not shown) and a host controller (not shown) associated with the stack of FIG. 7A to perform the method of FIG. 7B. At step 752, node current measurements are obtained for each node of the stack. For example, the current at each DC-DC 106 converter is measured. An example step 752 can involve the first method 350 of FIG. 3A resulting in obtaining node currents that are synchronized across nodes with a measurement command signal. An alternative example step 752 can involve the second method 360 of FIG. 3B resulting in obtaining node currents that contain measurements that fall within a synchronized time window or at a synchronized time.

In some embodiments, the node currents are estimated instead of being directly measured. For example, measured battery 104 current may be scaled by a transfer ratio of a respective DC-DC converter 106 to obtain estimated node current. DC-DC converter 106 efficiency may be considered when determining estimated node current to improve estimation accuracy. In some embodiments, the node current measurements obtained in step 752 are filtered, such as by using one or more low-pass filters, to remove noise injected by power conversion circuitry and associated harmonics that may otherwise interfere with arc fault detection.

Decision step 754 determines whether all measured node currents match. In an example stack 700, a determination of not matching is reached in response to a one percent (1%) or greater, a two percent (2%) or greater or even a five percent (5%) or greater difference for a duration of up to one second or more. Current measurements are often no more accurate than one percent (1%) or so, although measurement accuracy may improve with use of precision equipment or new technology. Additionally, dynamic node operation may also cause discrepancy in node currents. Otherwise, these currents should very closely match. Thus, it will be appreciated that we are, in other words, simply avoiding "measurement error" in setting a one percent (1%), two percent (2%), or five percent (5%) error. At step 756 a stack-level parallel arc fault is declared in response to a determination that not all measured node currents match. In some other embodiments, decision step 754 detects that there is a mismatch in node currents only if the mismatch persists for a predetermined amount of time or a predetermined number of measurement cycles.

In some embodiments, at least some of the currents considered in step 754 are filtered to achieve a desired arc fault detection profile. For example, in particular embodiments, (a) an error value equal to a difference between node currents is determined, (b) the error value is filtered by a low-pass filter, and (c) a stack-level parallel arc fault is detected in response to the filtered error value meeting or exceeding a prescribed threshold amount, in step 754. The low-pass filter weights the arc fault detection profile by increasing required magnitude or duration of an arc fault current for detection in step 754.

At step 758, in response to a declaration of a stack-level parallel arc fault, isolation switches (not shown) of the nodes are controlled so as to safely extinguish the arc. This can include isolating any batteries that can feed power to the arc while providing the desired node output characteristic (floating, shorted, low-power or power-limited state) and with or without emergency cell discharge, as needed. At step 760 a determination of no stack-level parallel arc fault is declared in response to a determination that the measured node currents of the stack all match one another.

System-Level Parallel Arc Fault Detection

Figure 8A:
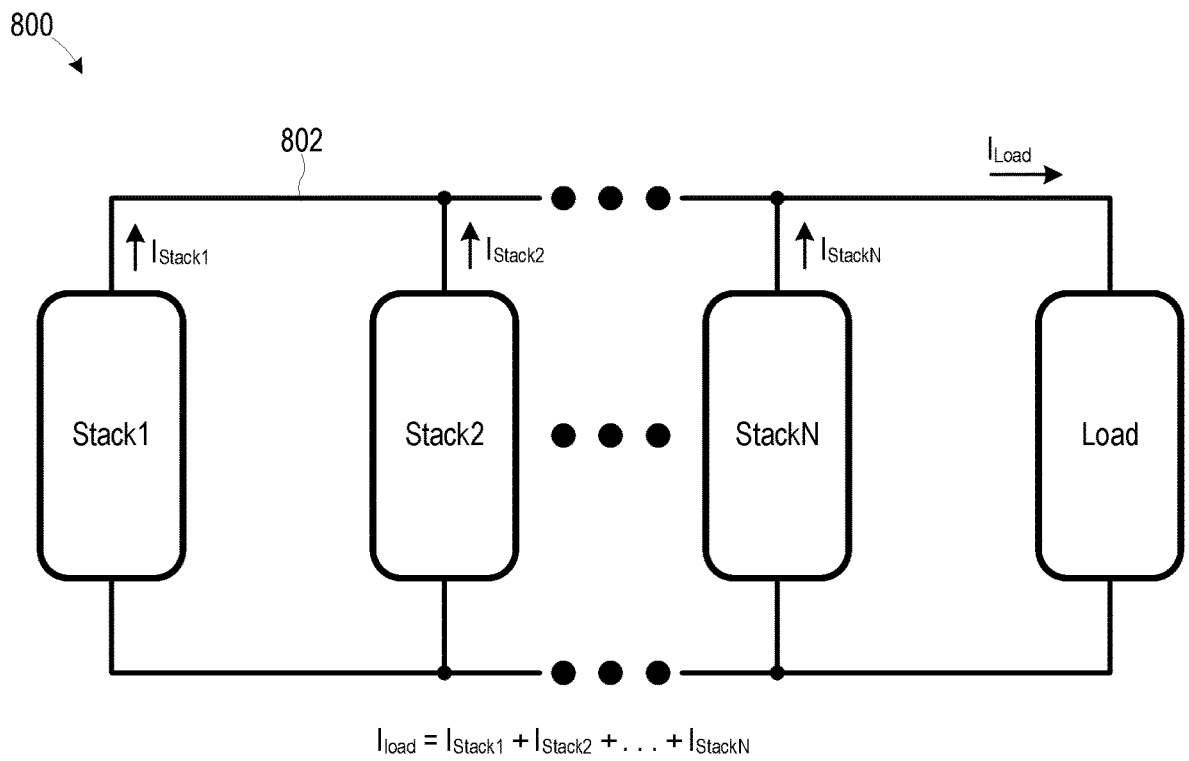
FIG. 8A is an illustrative diagram of an example energy storage system during normal operation with no arc fault occurrences.
Figure 8B:
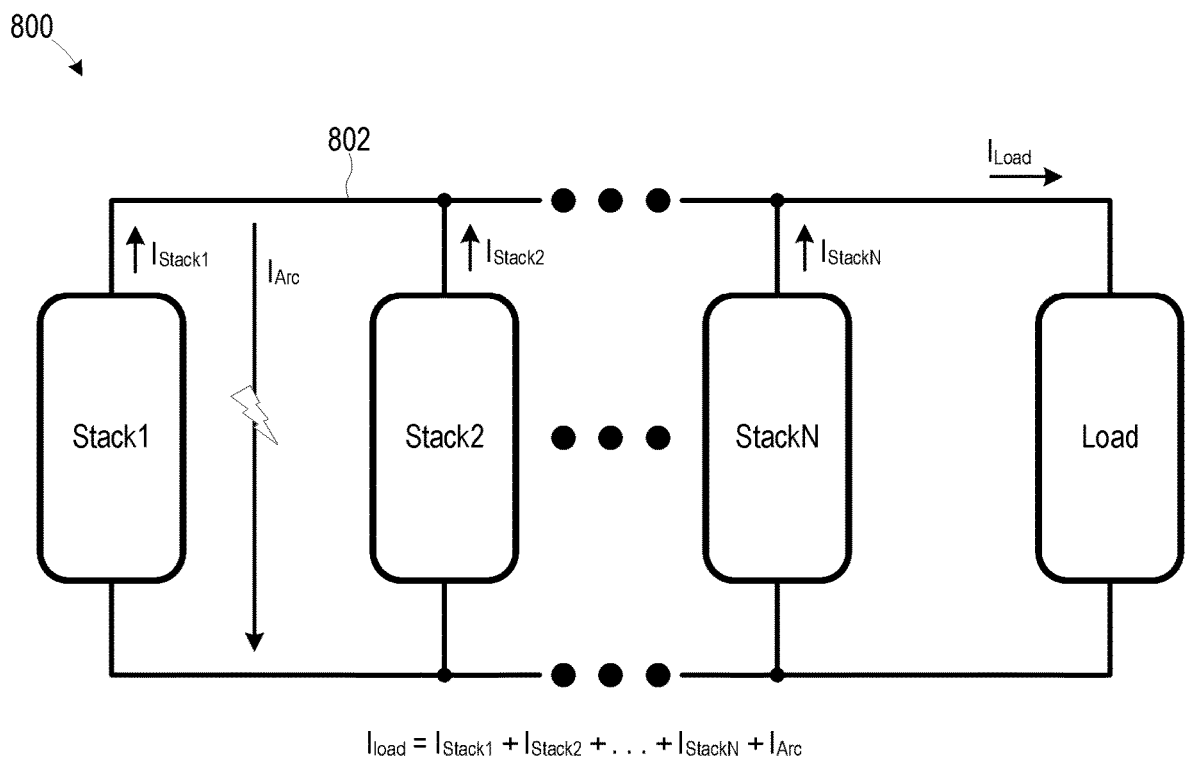
FIG. 8B is an illustrative diagram of the example energy storage system of FIG. 8A during an occurrence of a system-level parallel arc fault.

FIG. 8A is an illustrative diagram of an example energy storage system 800 during normal operation with no arc fault occurrences. FIG. 8B is an illustrative diagram of the example energy storage system 800 of FIG. 8A during an occurrence of a system-level parallel arc fault. A parallel arc fault occurs due to an unintended current path between conductors of an intended current path. As used herein, a system-level parallel arc refers to an arc from a point outside the stack to another point outside the stack, most commonly to electrical ground—sometimes referred to as a ground fault. The system 800 includes multiple BMS stacks, Stack1, Stack2, Stack3 coupled in parallel by a conductor network 802 with an electrical load 804. To avoid unnecessary complexity of presentation and to promote illustrative clarity of explanation, details of stacks are omitted. However, it will be appreciated that an example system 800 can have a topology like that of system 200 of FIG. 2, for example. During normal operation represented by FIG. 8A, when no system-level parallel arc fault occurs, the sum of the currents through individual stacks equals the current through the load:

$$I_{LOAD} = I_{STACK1} + I_{STACK2} + \ldots + I_{STACKN}$$

The individual stack current determinations can be made within stack controllers, (not shown) such as using method 350 of FIG. 3A or method 360 of FIG. 3B. Additionally, stack currents can be estimated, such as from a mean or median value of individual node currents. However, a system-level parallel arc fault adds a parallel current that causes a sum of individual stack currents to not be equal to the current through the load. For example, as represented by FIG. 8B, if a sustained parallel arc fault $I_{ARC1}$ occurs within Stack1 then, $$I_{LOAD} = [I_{STACK1} + I_{ARC1}] + I_{STACK2} + \ldots + I_{STACKN}$$

Thus, in this illustrative example, an occurrence of a system-level parallel current fault $I_{ARC}$, causes the load current $I_L$ to not match a sum of currents through the stacks.

Figure 8C:
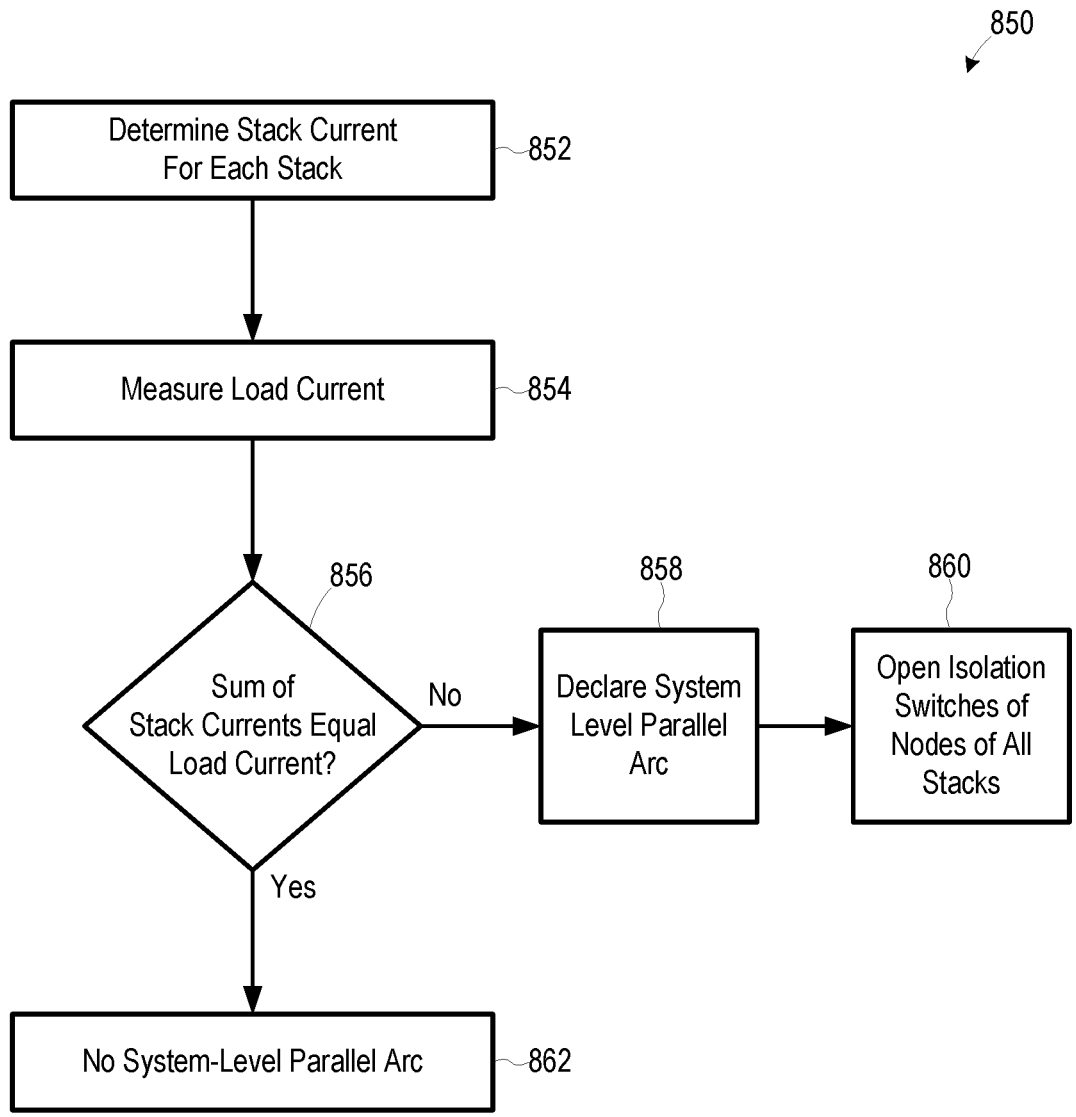
FIG. 8C is an illustrative flow diagram representing a method to detect and react to a parallel arc fault within the stack of FIG. 8B.

FIG. 8C is an illustrative flow diagram representing of a method 850 to detect and react to a system-level parallel arc fault current. Code instructions $C_{AD1}$ and $C_{AD2}$ are used to configure stack controllers (not shown) and a host controller (not shown) of the system of FIGS. 8A-8B to perform the method of FIG. 8C. At step 852, current value stack currents $I_{STACK1}, \ldots I_{STACKN}$ are determined for each stack. Each stack current is determined according to step 752 of FIG. 7B, for example. At step 854 a load current $I_L$ is measured synchronously with the stack-level current measurements.

In some embodiments, the current measurements obtained in steps 852 and 854 are filtered, such as by using one or more low-pass filters, to remove noise injected by power conversion circuitry and associated harmonics that may otherwise interfere with arc fault detection. In certain embodiments, one or more low-pass filters that are used to filter measured load current values have substantially the same bandwidth as one or more low-pass filters that are used to filter stack current measurements and/or node current measurements.

Decision step 856 determines whether a summation of the measured stack currents equals the load current. The stack currents are measured at the individual stacks and the stack current measurements are communicated to the host controller 212 for summation and comparison with the load current. In some embodiments, at least some of the currents considered in decision step 856 are filtered to achieve a desired arc fault detection profile, such as in a manner analogous to that discussed above with respect to step 754 of FIG. 7B.

Referring again to FIG. 8C, at step 858 a system-level parallel arc fault is declared in response to a determination that a summation of the stack currents does not equal the load current. In an example system 800, a determination of not matching is reached in response to a one percent (1%) or greater, a two percent (2%) or greater or even a five percent (5%) or greater difference for a duration of up to one second or more. At step 860, isolation switches (not shown) of the nodes are controlled so as to safely extinguish the arc. This can include isolating any energy storage cells that can feed power to the arc while providing the desired node output characteristic (floating, shorted, low-power or power-limited state) and with or without emergency cell discharge, as needed. At step 862 a determination of no system-level parallel arc fault is reached in response to a determination that the summation of the stack currents equals the load current. The method 850 repeats periodically. During active fault management in an example system 800, the method 850 is repeated multiple times per second, every few seconds, or every few minutes, for example. Alternatively, the method 850 can be repeated less frequently, on the order of once per day to avoid overly taxing computer resources.

In some embodiments, stack controllers 210 and/or host controller 212 perform both of methods 750 and 850, either sequentially or concurrently, to achieve hierarchical parallel arc fault detection. More specifically, stack controllers 210 and/or host controller 212 perform method 750 to realize a first level of parallel arc fault detection, i.e. stack-level parallel arc fault detection to detect a parallel arc fault within a stack. Additionally, stack controllers 210 and/or host controller 212 perform method 850 to realize a second level of parallel arc fault detection, i.e. system-level series parallel fault detection to detect a parallel arc fault outside of the stacks. Consequently, these embodiments are advantageously capable of detecting a parallel arc fault at any location in the system, i.e. both within the stacks and outside of the stacks. Additionally, methods 750 and 850 optionally share measured stack current values, which helps minimize measurement acquisition and processing requirements. Furthermore, the concept of hierarchical series arc fault detection could be extended to include additional levels, in a manner analogous to that discussed above with respect to FIG. 6C.

Operating, Bypass, Floating and Safe Modes of Operation

Figure 9A:
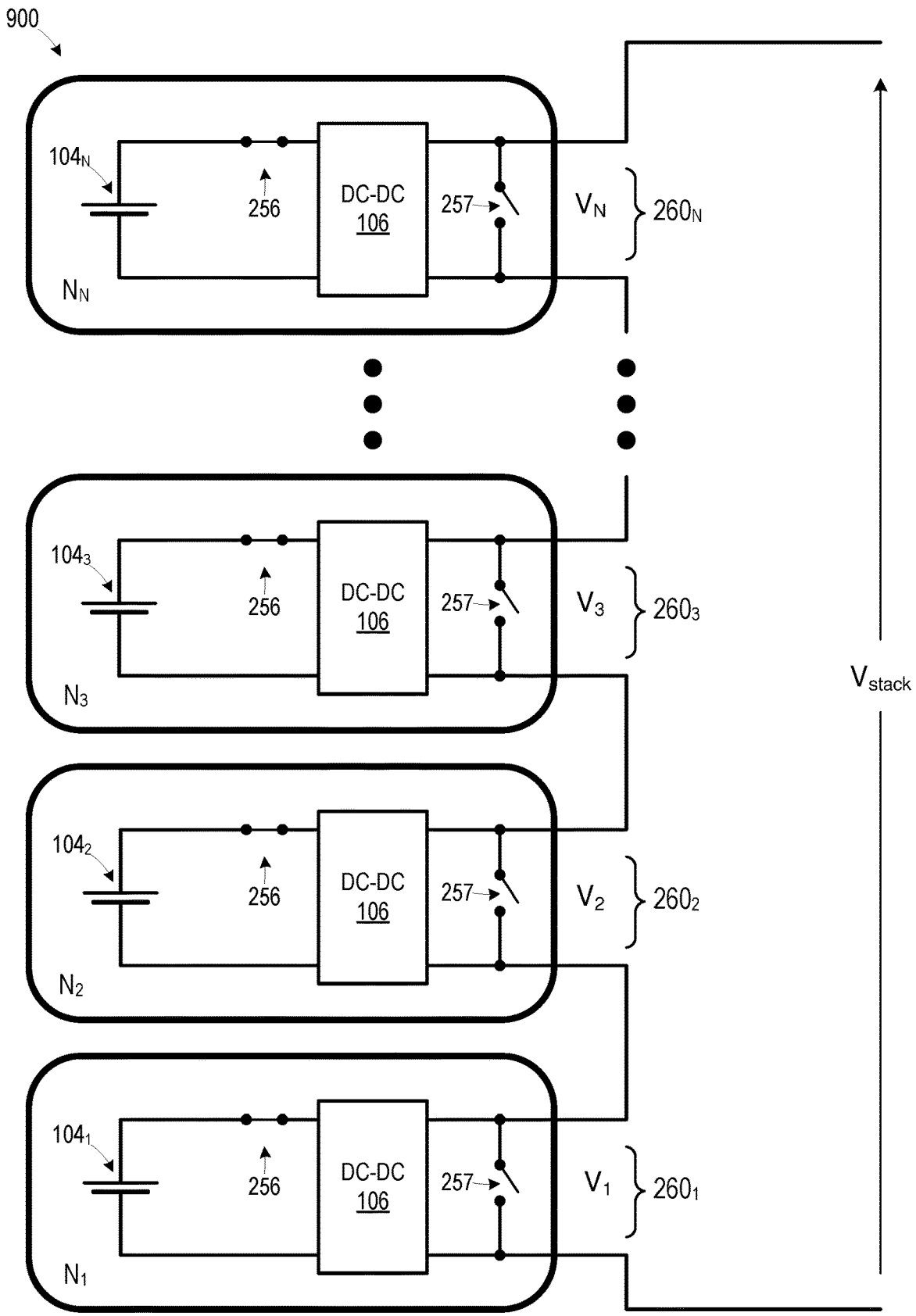
FIG. 9A is an illustrative diagram representing an example stack in an operating mode.
Figure 9B:
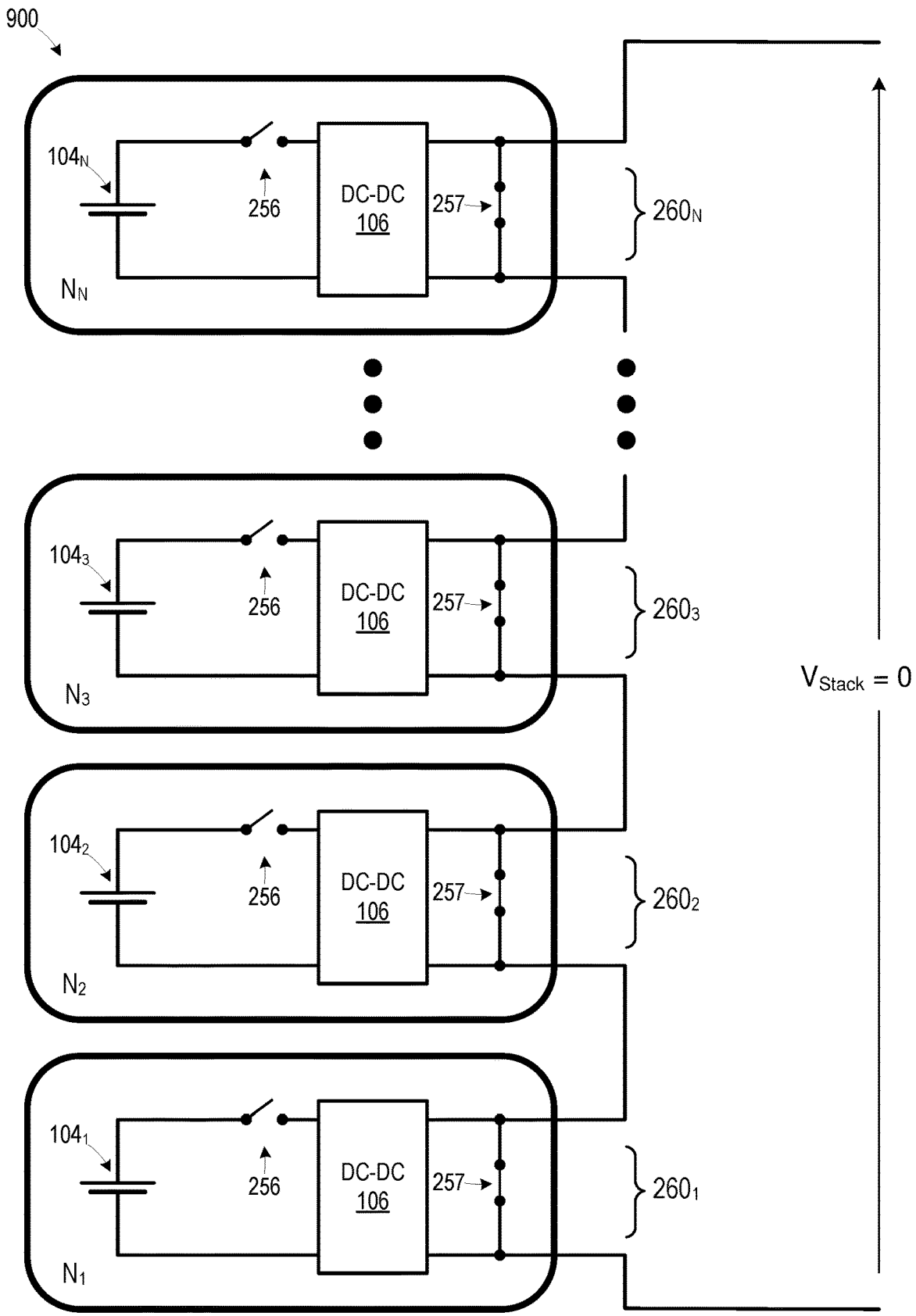
FIG. 9B is an illustrative diagram representing an example stack in a bypassed mode.
Figure 9C:
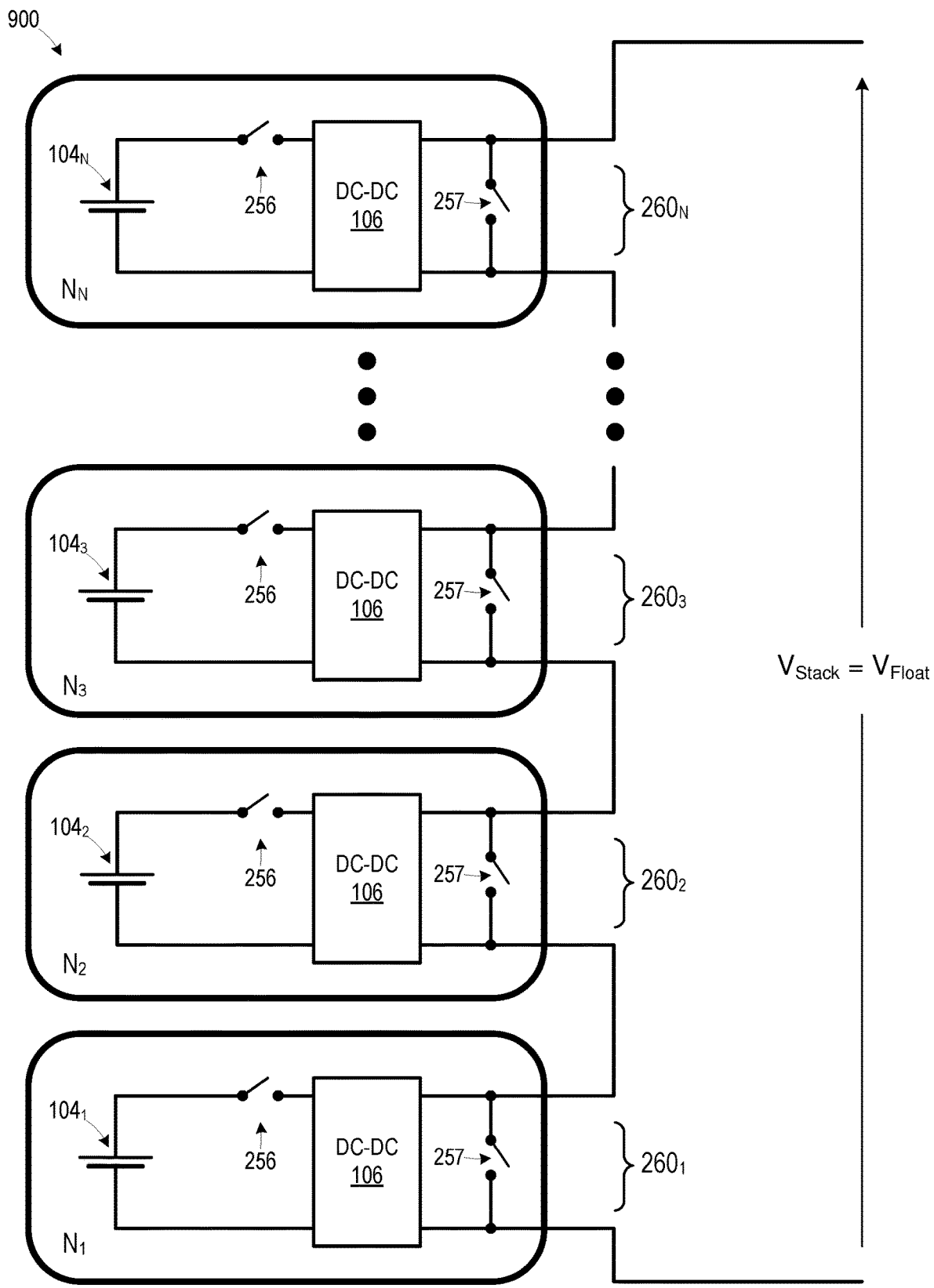
FIG. 9C is an illustrative diagram representing an example stack in a floating mode.
Figure 9D:
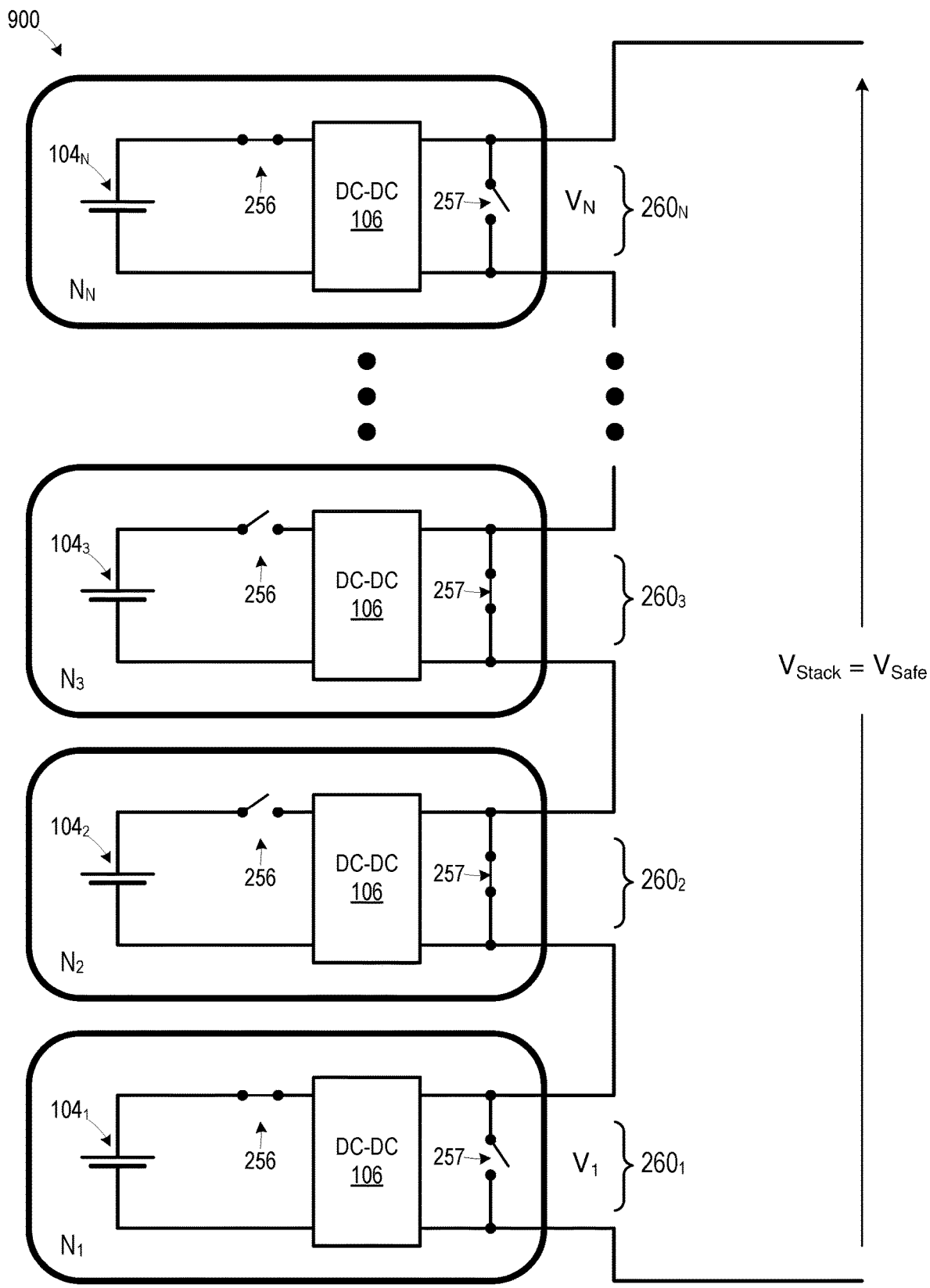
FIG. 9D is an illustrative diagram representing an example stack in a safe mode.

FIGS. 9A, 9B, 9C, 9D are illustrative drawings representing an example BMS stack 900 in an operating mode (FIG. 9A), a bypassed mode (FIG. 9B), a floating mode (FIG. 9C) and safe mode (FIG. 9D). Each node in FIGS. 9A, 9B, 9C, 9D includes a battery 104, a DC-DC converter 106, an isolation switch 256, and a node output shorting switch 257. Each node can (and typically will) include additional elements, such as those discussed above with respect to FIG. 1, but these additional elements are not shown in FIGS. 9A, 9B, 9C, and 9D for illustrative clarity. In an operational mode, shown in FIG. 9A, the isolation switches 256 of the example stack 900 are closed to connect respective batteries 104 to respective DC-DC converters 106 within nodes $N_1$ to $N_N$, which convert respective battery 104 voltages to respective node output voltages $V_1, \ldots V_N$ at respective output ports 260$_1$-260N. The serially connected output voltages of the nodes $N_1$-$N_N$ of the stack collectively provide a stack output voltage, $V_{STACK}$, that equals a summation of the node output voltages of the stack:

$$V_{STACK}=V_1+V_2+\ldots+V_N$$

In a bypassed mode, shown in FIG. 9B, the isolation switches 256 of the nodes of the example stack are open to electrically decouple and isolate each battery 104$_1$-104$_N$ from the respective DC-DC converters 106 within nodes $N_1$ to $N_N$, and node output shorting switches 257 are closed, such that each node provides a 0V node output voltage. As a result, collectively the nodes of the stack provide a stack output voltage $V_{STACK}$=0V.

In a floating mode, shown in FIG. 9C, the isolation switches 256 of the nodes of the example stack are open to electrically decouple and isolate each battery 104$_1$-104$_N$ from the respective DC-DC converters 106 within nodes $N_1$ to $N_N$, and switches 257 are opened (or absent) such that the output nodes voltages of nodes $N_1$ to $N_N$ are not coupled to ground but rather are floating. A floating mode is a preferred response to a system-level series arc fault, for example, since the floating mode eliminates a current path for an arc, but there is still a voltage drop across the stack. In the floating mode, the stack is high impedance and the voltage across the stack is determined by its load. Alternately, some embodiments further include a soft shorting switch 259 and resistor 261 (not shown in FIG. 9C) electrically coupled in series across the output port 260 of each node, as discussed above with respect to FIG. 1. In these embodiments, the soft shorting switch 259 is closed during the floating mode to provide a controlled impedance across the stack 900. The controlled impedance is determined, for example, by the sum of the resistance values of resistors 261.

In the safe mode, shown in FIG. 9D, isolation switches 256 of a first subset of nodes of the example stack are closed to couple batteries 104 to respective DC-DC converters 106, which convert battery voltage to node output voltage. In a second subset of nodes of the example stack, isolation switches 256 are open to isolate batteries 104 from respective DC-DC converters 106 and associated node output ports 260. Additionally, switches 257 of the second subset of nodes are closed, such that each node of the second subset is bypassed. The number of nodes within the first and second subsets are selected such that the nodes of the first subset collectively provide an output voltage, current, and power that are limited to safe levels, while the nodes of the second subset are bypassed. In an example energy storage system, for instance, typical safe levels are 30V, 8 A, and 240 W. In the example switch configuration shown in FIG. 9D, nodes $N_1$ and $N_N$ are in the first subset with isolation switches 256 closed to couple their associated batteries 104$_1$ and 104$_N$ to their respective DC-DC converters 106, and nodes $N_2$ and $N_3$ are in the second subset with isolation switches 256 open to isolate their associated batteries 104$_2$ and 104$_3$ from their respective DC-DC converters 106. Each node is a member of either the first subset or the second subset when stack 900 operates in its safe mode.

In an example node, DC-DC converter 106 is embodied by a boost converter circuit, described below with reference to FIG. 11, that boosts a voltage of battery 104 to produce an output node output voltage that is greater than the voltage level of the battery 104. For instance, in an example BMS stack 900, each node includes a battery 104, which provides a voltage of 4V and includes a boost converter that boosts the voltage nominally to 5V. Moreover, an example stack 900 includes two-hundred nodes, such that a total voltage across the stack is 1,000V during a normal operating mode (FIG. 9A). To achieve a safe output voltage level of 30V across the stack 900 during safe mode (FIG. 9D), the isolation switches 256 of a first subset that includes six nodes are closed and the isolation switches 256 of a second subset of nodes that includes the remaining one hundred and ninety-four are opened. While the stack 900 is in the safe mode, node membership in the first and second subsets can be changed. During a first time interval, for example, nodes $N_1$-$N_6$ (not all shown) can be selected as members of the first subset and the remaining nodes can be selected as members of the second subset. During a second time interval, for example, nodes $N_7$-$N_{12}$ (not shown) can be selected as members of the first subset and the remaining nodes can be selected as members of the second subset; during a third time interval, nodes $N_{13}$-$N_{18}$ (not shown) can be selected as members of the first subset and the remaining nodes can be selected as members of the second subset; etc. In some embodiments, node membership is changed on a periodic basis or in response to a signal to change one or more of stack voltage or stack current.

In an alternate embodiment, each DC-DC converter 106 is capable of reducing stack voltage, and stack 900 operates in its safe mode by causing each DC-DC converter 106 to reduce its output voltage, such that $V_{stack}$ is a safe voltage.

For example, if N is equal to 100 such that there are one hundred nodes, each DC-DC converter 106 could transform its respective battery voltage to a node voltage of 0.1 volts in the safe mode, such that Vstack is safe voltage of ten volts.

During normal operation mode, the stack 900 can be used to provide a prescribed voltage required to provide a normal power level to an electrical load, which for example, can be approximately 600V for a US residential battery energy storage system and approximately 1000V-1500V for a utility-scale application. In bypass mode, each node output voltage is shorted so that the entire stack is connected to electrical ground. Alternatively, in a floating or open circuit mode, all nodes can be left floating (i.e. not coupled to ground) or at predetermined impedance values. Both bypass and floating modes can be safe but since the nodes are inoperative, there is no visibility as to whether individual nodes or stacks actually are operable (i.e. ready for normal operation). The safe mode permits operation of each node to be observed to determine proper system operation and interconnection while maintaining overall safe voltage and power levels. Additionally, rotation of active nodes in the safe mode, such as by changing membership of the first and second subsets as discussed above, facilitates quick identification of a non-functioning node because stack output voltage drop during active node rotation is indicative of one or more non-functioning nodes. Accordingly, safe mode is especially useful for installation and maintenance. Safe mode also can be beneficial for firefighting by eliminating the potential for a firefighter to be exposed to dangerously high voltages and currents.

Figure 9E:
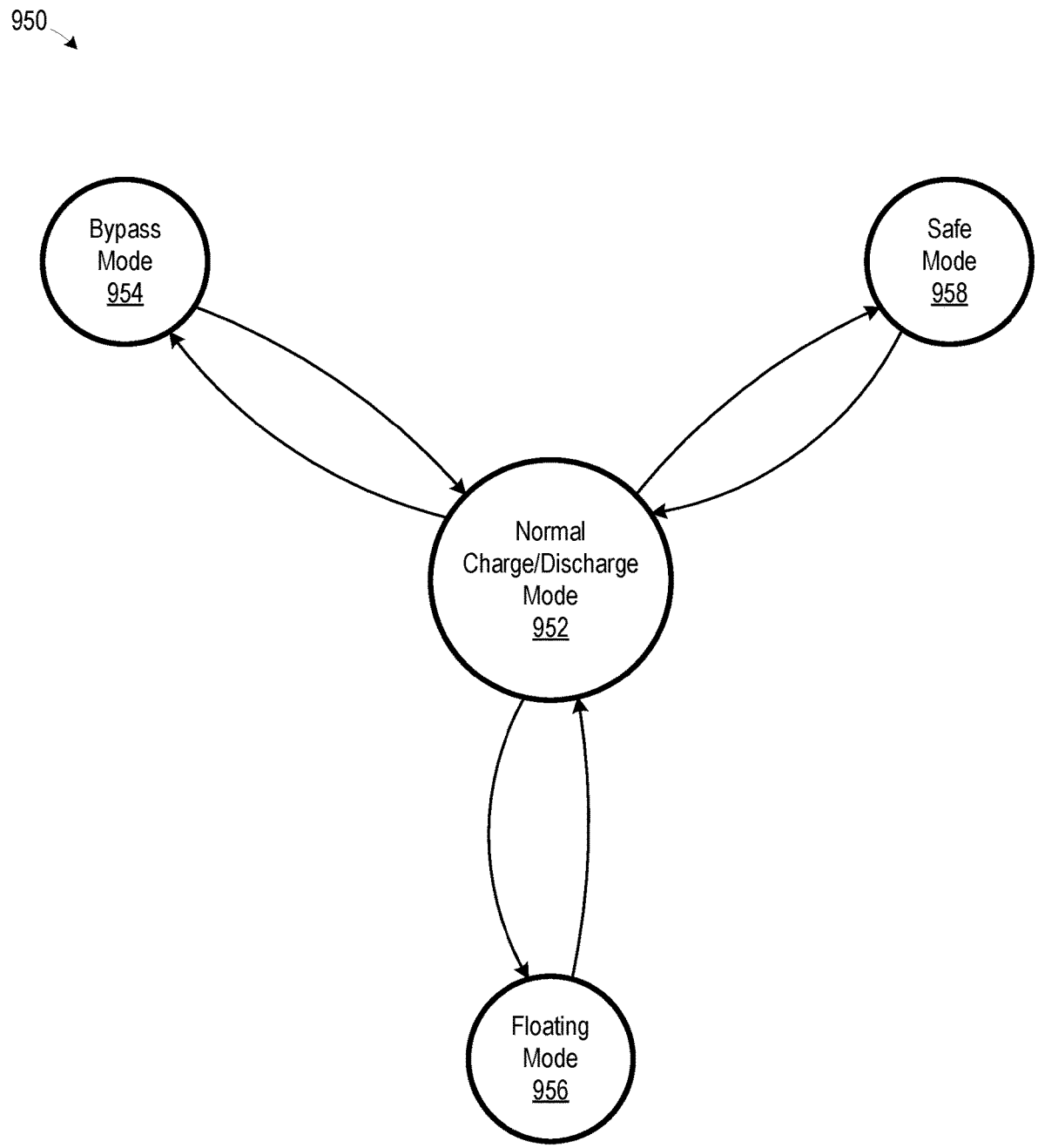
FIG. 9E is a Fault Response state diagram illustrating examples of how a stack can transition between operating modes.

FIG. 9E is a Fault Response state diagram 950 illustrating examples of how the example stack 900 of FIGS. 9A-9D could transition between the operational mode, the bypass mode, the floating node, and the safe mode. Code instructions $C_{SM1}$ and $C_{SM2}$ are used to configure a stack controller (not shown) and a host controller (not shown) to transition between modes. State 952 is a normal charge/discharge mode, which in some embodiments, is equivalent to the operational mode discussed above with respect to FIG. 9A. The stack 900 can transition from the normal charge/discharge mode 952 to any one of the bypass mode 954, the floating mode 956, and the safe mode 958, such as in response to detection of a fault. Examples of such faults include, but are not limited to, an arc fault or failure of a communication subsystem or other subsystem of energy storage system 200. For example, the stack 900 could be configured to transition a defective stack from the normal charge/discharge mode 952 to the floating mode 956 in response to detecting a series arc fault in the defective stack, such as using method 550 discussed above. Operating in the floating mode would extinguish the arc in the defective stack while allowing the remaining stacks to continue operating, thereby ensuring safety while minimizing impact of the arc fault on system operation. Additionally, the system could be configured to transition all stacks from the normal charge/discharge mode 952 to any one of the bypass mode 954, the floating mode 956, and the safe mode 958 in response to detecting a system-level series arc fault, such as using method 650 describe above. Any one of the bypass mode 954, the floating mode 956, and the safe mode 958 would extinguish the arc, although the system would be inoperable until the system defect is repaired.

Furthermore, the stack 900 could be configured to transition a defective stack from the normal charge/discharge mode 952 to the floating mode 956 in response to detecting a parallel arc fault within the defective stack, such as using method 750 discussed above. Operating in the floating mode would extinguish the arc in the defective stack while allowing remaining stacks to continue operating, thereby ensuring safety while minimizing impact of the arc fault on system operation. Additionally, the stack could identify the arc location in a manner like that discussed above with respect to FIG. 7A, to expedite repair of the defective stack. Moreover, the system could be configured to transition all stacks from the normal charge/discharge mode 952 to any one of the bypass mode 954, the floating mode 956, and the safe mode 958 in response to detecting a system-level parallel arc fault, such as using method 850 described above. Any one of the bypass mode 954, the floating mode 956, and the safe mode 958 would extinguish the arc, although the system would be inoperable until the system defect is repaired. Additionally, the stack 900 could transition from the normal charge/discharge mode 952 to any one of the bypass mode 954, the floating mode 956, and the safe mode 958 in response to a user command, such as in preparation for system maintenance or service, in response to an emergency (e.g. a fire) in the vicinity of the system, or for any other reason.

Stack 900 can also transition from any one of the bypass mode 954, the floating mode 956, and the safe mode 958 back to the normal charge/discharge mode 952, such as when the system is determined to safely free of arcs, short, or other defects, or in response to a user command. Additionally, while not illustrated in FIG. 9E, some embodiments of the stack 900 are capable of transitioning from any one of the bypass mode 954, the floating mode 956, and the safe mode 958 to any other one of these modes, without first transitioning to the normal charge/discharge mode 952.

In some embodiments, each BMS node has a plurality of operating modes, such as a normal charge/discharge mode, a bypass mode, and a floating mode. For example, consider again stack 900 of FIG. 9A. In certain embodiments, each BMS node $N_1$ to $N_N$ of stack 900 may operate in a normal charge/discharge mode, a bypass mode, or a floating mode, independent of other BMS nodes of stack 900. In a given BMS node $N_1$ to $N_N$ of stack 900, (a) the normal operating mode is characterized by isolation switch 256 being closed and node output shorting switch 257 being open, (b) the bypass mode is characterized by isolation switch 256 being open and node output shorting switch 257 being closed, and (c) the floating mode is characterized by each of isolation switch 256 and node output shorting switch 257 being open.

Accordingly, operating mode of stack 900 can be characterized by the respective operating modes of its constituent BMS nodes $N_1$ to $N_N$. For example, the bypass mode of stack 900 can be characterized by each BMS node $N_1$ to $N_N$ operating in its bypass mode, as illustrated in FIG. 9B. Additionally, the floating mode of stack 900 can be characterized by one or more of BMS nodes $N_1$ to $N_N$ operating in its floating mode, as illustrated in FIG. 9C. Furthermore, the safe mode of stack 900 can be characterized by some BMS nodes of stack 900 operating in their normal charge/discharge mode while other BMS nodes of stack 900 operate in their bypass mode, as illustrated in FIG. 9D.

It should be appreciated that the present systems and method not only promote safety, but they also achieve significant additional advantages. For example, in some embodiments, it is unnecessary to shut down an entire energy storage system in response to a fault or other abnormality. Instead, a problematic portion of the energy storage system can be disabled and/or isolated from the remainder of the energy storage system, thereby allowing the energy storage system to continue to safely operate, albeit with reduced capacity. For example, in some embodiments, a defective battery 104 can be isolated from healthy batteries 104 by opening an isolation switch 256, and the battery's respective node can be bypassed by closing a node output shorting switch 257, thereby enabling the energy storage system to safely operate with the defective battery 104 isolated from healthy batteries 104. Additionally, the defective battery 104 is optionally safely discharged, such as using the devices discussed below. As another example of isolating a defective energy storage system portion from the system remainder, a defective stack can be isolated from healthy stacks by transitioning the defective stack from its normal charge/discharge mode 952 to its floating mode 956, so that the defective stack is disabled without interfering with healthy stack operation. Accordingly, the present systems and methods help minimize energy storage system downtime, which promotes energy storage system reliability and economy by reducing, or even eliminating, the need for redundant energy storage systems.

Additionally, the present systems and methods advantageously help minimize ongoing energy storage system operations and maintenance expense, which can be as much as five to ten percent of overall lifetime cost in conventional energy storage systems. For example, safe mode 958 allows an energy storage system portion, or even an entire energy storage system, to continue to operate in a low-power state despite presence of a fault or other abnormality. Such low power operation may significantly ease locating a fault, as it is typically much easier to locate a fault in a powered system than in an unpowered system. Additionally, as discussed above, some embodiments can identify an arc fault's location in an energy storage system, which can further expedite fault diagnosis and repair. Furthermore, some embodiments are configured to automatically send a signal to a third party, e.g. to an energy storage system service company, in response to occurrence of a fault or other abnormality. The signal may, for example, identify the fault type as well as the fault's location, thereby enabling the third party to remotely assess the urgency of fault repair and need for replacement parts, which further promotes efficient and economical energy storage system operation and maintenance.

Moreover, the fact that an energy storage system may continue to safely operate despite presence of a fault reduces the need for unscheduled system maintenance and repair, which also helps minimize operations and maintenance cost. For example, a defective battery in a conventional energy storage system may require shutdown of the entire system, thereby necessitating an urgent service call to replace the defective battery and enable the energy storage system to be returned to operation. In certain embodiments of the present systems and methods, in contrast, a defective battery 104 may be isolated from healthy batteries 104 such that the energy storage system can continue to safely operate, thereby enabling battery replacement to be deferred until a regularly scheduled maintenance call.

Furthermore, the present system and methods may enable more aggressive safety measures to be taken than is practical with conventional energy storage systems, thereby further promoting safety. In particular, identification of a fault or other abnormality in a conventional energy storage system typically requires that the entire energy storage system be shut down, as discussed above. Consequently, conventional energy storage systems must conservatively identify faults, to prevent false fault identification which necessitates costly and inconvenient shut down of the entire energy storage system. The present systems and methods, in contrast, enable a fault or other abnormality to be addressed with shutdown of only a portion of an energy storage system, e.g. only a single node or only a single stack, which allows the remainder of the energy storage system to continue functioning. Consequently, the cost of a false fault identification is lower in the present energy storage systems than in conventional energy storage systems, which allows for more aggressive fault detection than is practical with conventional energy storage systems.

Identifying an Unsafe Battery

A battery may, itself, become unsafe. For example, lithium plating, dendrite growth and mechanical shorting may all lead to intermittent cell-level arcs or shorts. Continued operation of an unsafe battery is hazardous and can result in dangerous current levels, thermal runaway and fire. As used herein, an unsafe battery is one whose electrical behavior suggests an unsafe risk of failure even if the battery device has not yet exceeded absolute limits, and therefore, has not yet failed. Early identification of an unsafe node permits preventive action such as disconnecting the battery from the node, discharging the battery to a safe state of charge or voltage, shutting down the entire system, and replacement of the unsafe battery before occurrence of potentially catastrophic battery failure. The electrical signatures of an unsafe risk can be identified by unexpected electrical response of the battery to external stimuli such as host controller commands and load changes. Battery models, such as thermal, electrochemical and equivalent electric circuit models, such as State-of-Charge (SOC) models, are used to describe the expected electrical response. Electrical signatures of unsafe cells can also be determined experimentally, by observing electrical signals as known failure modes are induced in similar cells. Machine learning algorithms can be trained on experimentally-gathered data or fleetwide field data to improve the sensitivity and accuracy of the unsafe risk detection algorithm or to reduce the nuisance flagging of false failures.

Figure 10:
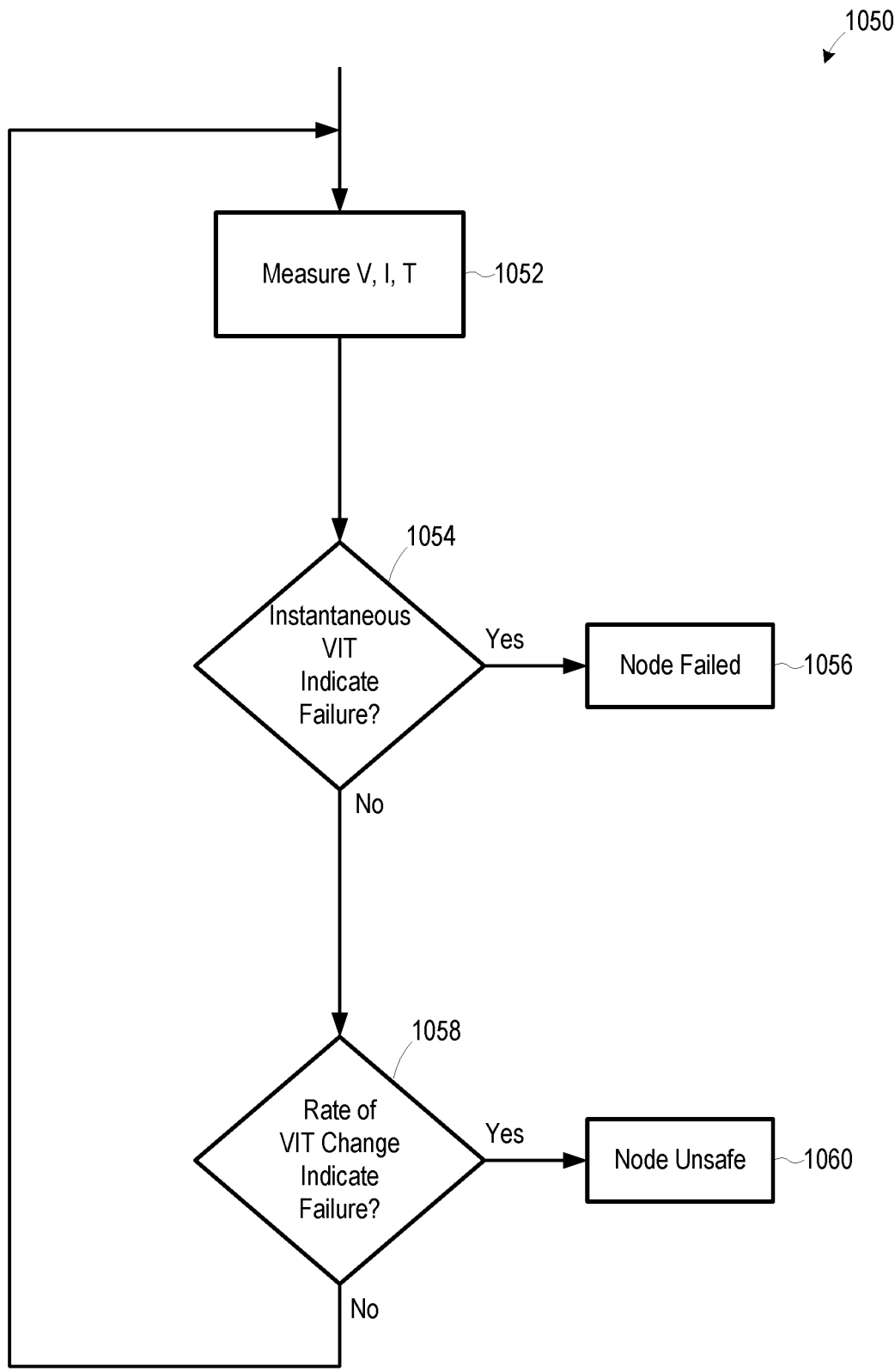
FIG. 10 is an illustrative drawing representing a method for detecting an unsafe battery before it enters thermal runaway.

FIG. 10 is an illustrative drawing representing a method 1050 for detecting an unsafe battery before it enters thermal runaway. Method 1050 is performed, for example, by the processor circuit 217-2 of a node 100, a stack controller 210 of a stack, and/or the host controller 212. In step 1052, the cell voltage (V), current (I) and temperature (T) are measured, such as using the techniques discussed above with respect to FIG. 1. Step 1054 compares the instantaneous VIT measurements against their expected values from a battery model and flags an unsafe battery if any of the instantaneous values are outside the expected range. For example, a lower than expected voltage reading and/or a higher than expected current reading and/or a higher than expected temperature reading all might indicate an intermittent short or arc (state 1056), prompting a fault response which decouples the unsafe battery from the system, and/or depending on the severity of the fault response, an emergency cell discharge (described below).

If the instantaneous VIT readings are not indicative of an unsafe battery, the rates of change of V, I and T are compared to their expected values from battery models, or other thresholds, to identify an unsafe battery. For example, rapid change in V, I and/or T that is not explained by commands from the host controller 212 or changes in the load 204 are flagged as an unsafe battery, prompting a fault response.

The order of Steps 1054 and 1058 can be interchanged, or the two steps can be performed concurrently. Step 1058 can also be performed in the frequency domain, with Fast Fourier Transforms of V, I, T sequences compared to expected values.

Expected values considered in steps 1054 and 1058 are determined, for example, from models of batteries 104. Each battery may have its own respective model or "digital twin." In some embodiments, the battery 104 models are at least partially derived from VIT measurements from BMS nodes of energy storage system 200. Examples of battery 104 models include, but are not limited to, equivalent circuit models of batteries 104, state of charge models of the batteries 104, and thermal models of batteries 104. In some embodiments, one or more of the models are refined with use, such as by using a Kalman filtering or analogous procedure where battery 104 model parameters are estimated and subsequently updated in response to measurement values.

Figure 15:
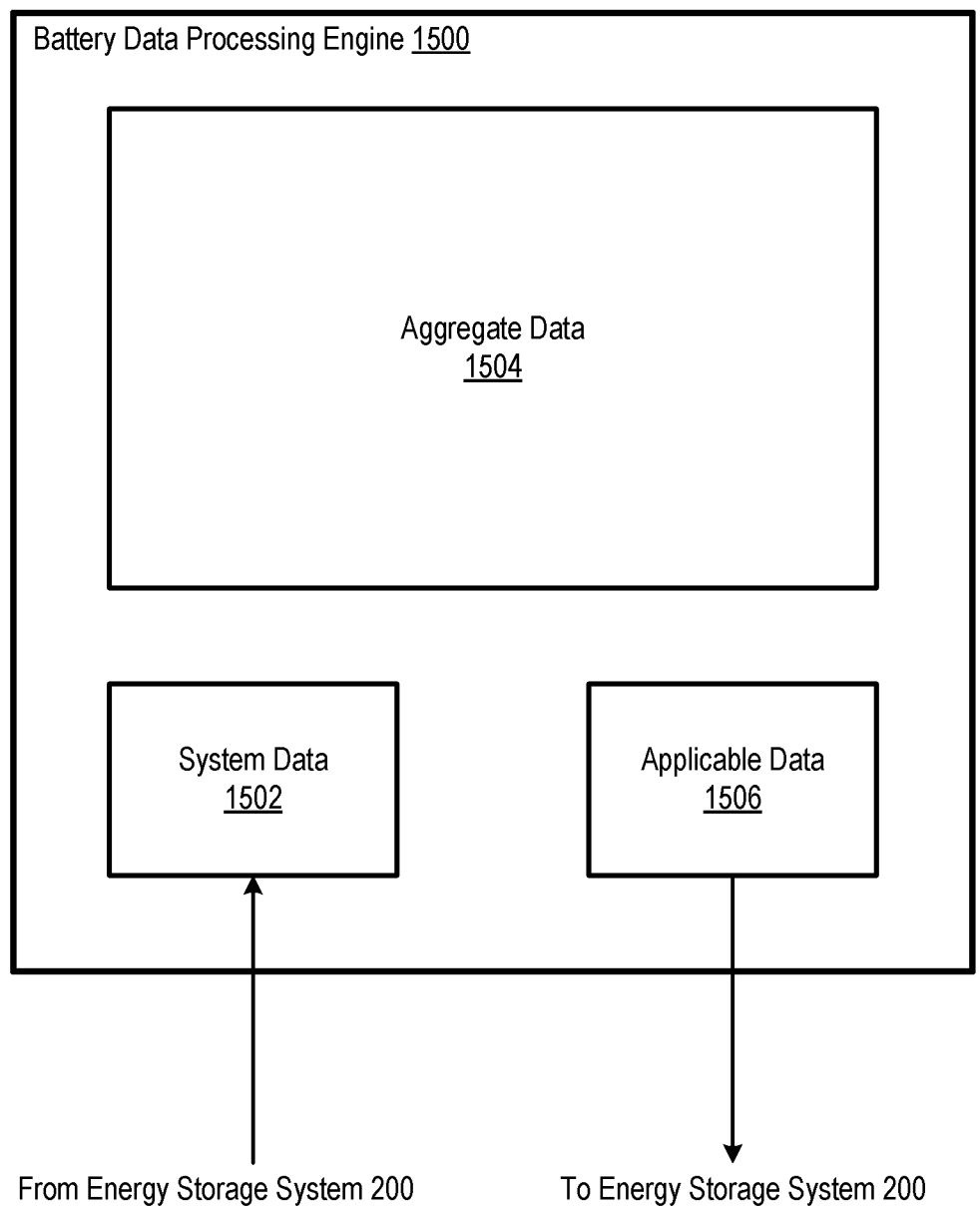
FIG. 15 is an illustrative diagram representing an example of a battery data processing engine.

Moreover, some embodiments of energy storage system 200 use data from other energy storage systems to perform one or more functions, such as to generate battery models, detect an unsafe battery, to detect an arc fault, or to determine fault responses. For example, in certain embodiments, a stack controller 210 instance and/or the host controller 212 send system data 1502 to a battery data processing engine 1500, illustrated in FIG. 15. In some embodiments, the battery data processing engine 1500 is external to the energy storage system 200. For example, the battery data processing engine 1500 may be implemented by a computer server, or by a distributed computing system, that is external to the energy storage system 200. In some other embodiments, the battery data processing engine 1500 is part of energy storage system 200. For example, in a particular embodiment, the battery data processing engine 150 is implemented by host controller 212.

The system data 1502 sent to the battery data processing engine 1500 represents one or more characteristics of the energy storage system 200. For example, the system data 1502 may include node VIT data, fault status, and/or information about the energy storage system 200, such as the type of batteries 104 in the energy storage system 200, the configuration of the batteries 104 in the energy storage system 200, manufacturing information for the batteries 104 in the energy storage system 200, operating history of the batteries 104 in the energy storage system 200, maintenance history of the batteries 104 in the energy storage system, etc. The system data 1502 is optionally encrypted, compressed, and/or preprocessed (e.g., identifying various degradation mechanisms) before being sent from the energy storage system 200 to the battery data processing engine 1500.

The battery data processing engine 1500 compares the system data 1502 to aggregate data 1504 to find common traits between the two data sets. Aggregate data 1504 includes data from multiple energy storage systems, e.g. from tens, hundreds, or even thousands of energy storage systems. The battery data processing engine 1500 optionally adds information it receives from energy storage systems to the aggregate data 1504, such that the aggregate data 1504 grows over time. Examples of common traits between the system data 1502 and the aggregate data 1504 include, but are not limited to, batteries operating under the same or similar conditions, batteries with the same or similar operation duration, batteries with the same or similar energy throughput, batteries from a common manufacturing lot, batteries with the same or similar installation, batteries stored under the same or similar conditions, batteries with the same or similar maintenance history, and batteries with similar arc fault signatures. In some embodiments, the battery data processing engine 1500 uses self-learning methodologies (e.g., machine-learning, deep-learning, or even multi-modal machine learning) to identify common traits between the system data 1502 and the aggregate data 1504.

The battery data processing engine 1500 subsequently identifies data that is applicable to energy storage system 200 (applicable data 1506) from the common traits between the system data 1502 and the aggregate data 1504. More specifically, the battery data processing engine 1500 identifies data in aggregate data 1502 that is associated with energy storage systems having common traits with energy storage system 200, as being applicable data 1506. For example, the battery data processing engine 1500 may identify data from an energy storage system having the same type of batteries as energy storage system 200 as being applicable data 1506. As another example, the battery data processing engine 1500 may identify data from an energy storage system operating under similar conditions to energy storage system 200 as being applicable data 1506. The applicable data 1506 may be either indirectly related or directly related to data associated with energy storage systems having coming traits with energy storage system 200. In some embodiments, the battery data processing engine 1500 uses self-learning methodologies (e.g., machine-learning, deep-learning, or even multi-modal machine learning) to identify the applicable data 1506 from aggregate data 1504.

The battery data analysis engine 1500 sends the applicable data 1506 to energy storage system 200, such as to the host controller 212 and/or to one or more stack controllers 210. The energy storage system 200 optionally uses the applicable data 1506 to manage one or more aspects of energy storage system 200. For example, in particular embodiments, the host controller 212 and/or a stack controller 210 use the applicable data 1506 to build or refine models of batteries 104, such as to control battery charging/discharging or for use in unsafe battery identification and associated fault response. As another example, in certain embodiments, the host controller 212 and/or a stack controller 210 use the applicable data 1506 to detect and respond to arc faults. For instance, the applicable data 1506 could include arc fault signatures and associated fault responses for energy storage systems similar to energy storage system 200, and such signatures could be used in decision steps 556, 656, 754, and/or 856 and mitigation steps 560, 662, 664, 758, and/or 860 in the arc fault detection methods 550, 650, 750, and 850, respectively. For example, low-pass filter values used in decision steps 556, 656, 754, and/or 856 could be determined at least partially based on arc fault signatures in the applicable data 1506, to achieve an arc fault detection profile that is optimized for detecting the arc fault signatures in the applicable data 1506. As another example, a decision to transition from the normal charge/discharge mode 952 to one of the bypass mode 954, the floating mode 956, and the safe mode 958 (FIG. 9) may be based at least in part on prior experience with similar fault scenarios, as determined by the battery data analysis engine 1500 and conveyed to the energy storage system 200 via the applicable data 1506.

Discharging an Unsafe Node

A battery that is deemed unsafe can remain a hazard so long as it is charged. For example, highly charged batteries increase risk of short circuits and arc faults, and highly charged batteries are more likely to experience thermal runaway than lightly charged batteries. Therefore, it is desirable to discharge an unsafe battery or a battery that is subject to being charged or discharged in an uncontrolled manner by a faulty system. The following discharge circuits enable a node to safely discharge a battery within the node itself. The example discharge circuits are configured to discharge a battery 104 in response to determination that the battery or system is unsafe as described above, or in response to a command to discharge the battery, such as in preparation for performing system maintenance or service.

Figure 11:
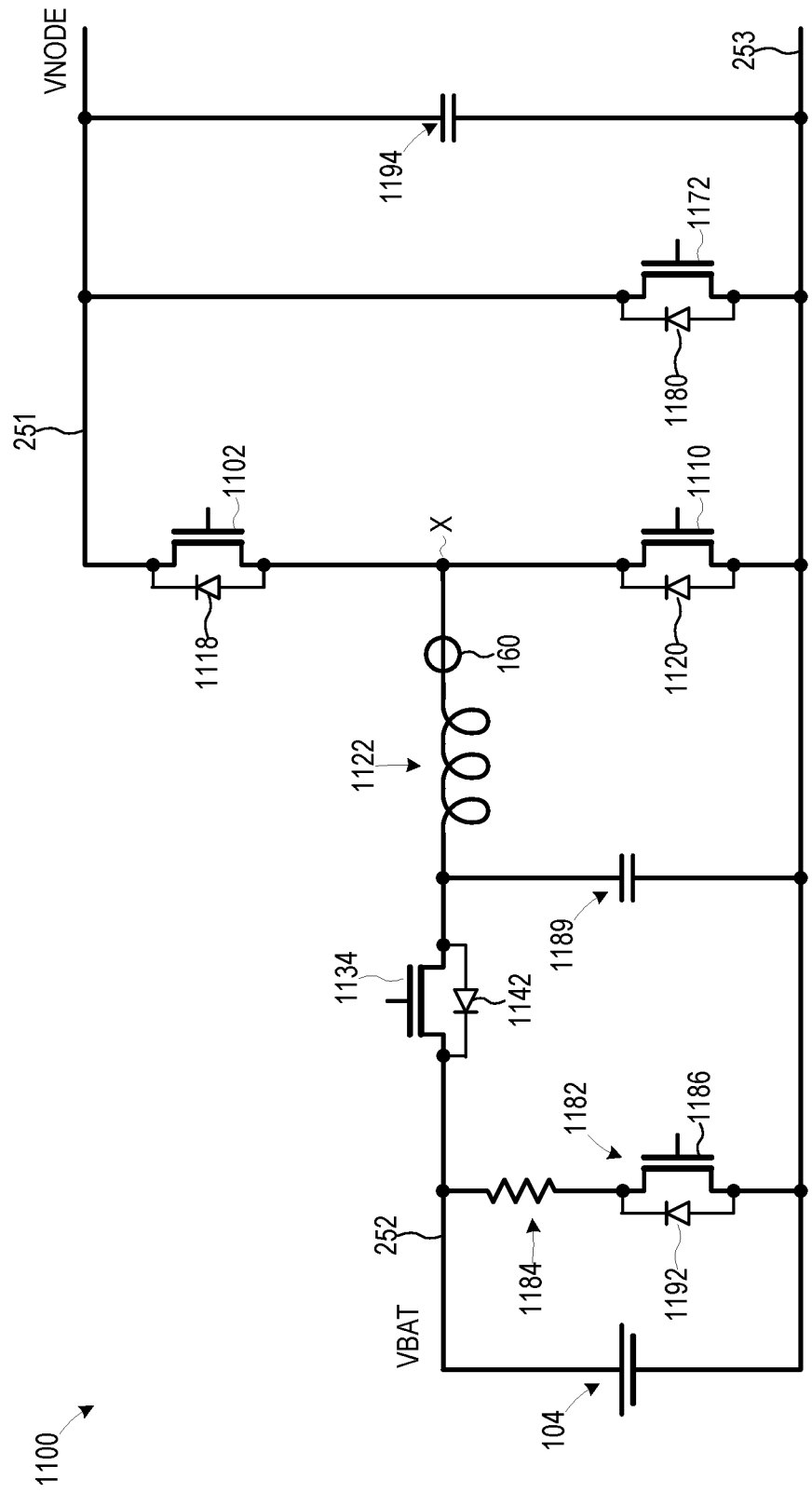
FIG. 11 is an illustrative circuit diagram of a first example bi-directional DC-DC converter circuit for use in an example node of FIG. 1.

FIG. 11 is an illustrative circuit diagram of a first example bi-directional DC-DC converter circuit 1100 for use in an example node 100 as DC-DC converter 106. DC-DC converter circuit 1100 acts as a boost converter during discharge and as a buck converter during charge. The first converter 1100 includes a first transistor switch 1102 that includes a first parasitic body diode 1118. The first switch 1102 is coupled between the positive power bus terminal 251 and a circuit node X. The source and drain terminals of the first transistor switch 1102 are chosen so that the first body diode 1118 conducts current from circuit node X toward the positive power bus terminal 251. In other words, the first parasitic diode 1118 has forward bias diode current flow direction from circuit node X toward the positive power bus terminal 251. The DC-DC converter 1100 includes a second switch 1110 that includes a second parasitic body diode 1120. The second switch 1110 is coupled between the circuit node X and the negative power battery device terminal 253. The second parasitic diode 1120 has forward bias diode current flow direction from the negative battery device/bus terminal 253 toward the circuit node X. First and second switches 1102 and 1110, along with an inductor 1122, collectively form a DC-DC converter core which operates as a boost converter when discharging battery 104 and as a buck converter when charging battery 104.

A third transistor switch 1134 that includes a third parasitic body diode 1142 and is coupled in series between the positive battery device terminal 252 and circuit node X, in series with inductor 1122. The third parasitic diode 1142 has forward bias diode current flow direction from circuit node X toward battery 104. The third switch 1134 acts as a battery isolation (or disconnect) switch, and third switch 1134 is therefore an embodiment of battery isolation switch 256 of FIG. 1. The inductor 1122 is electrically connected between the third circuit switch 1134 and the circuit node X. A capacitor 1189 is coupled between the inductor 1122's second terminal and the negative power battery device terminal 253. A capacitor 1194 is coupled between positive terminal 251 and negative terminal 253.

An optional fourth transistor switch 1172 that includes a fourth parasitic body diode 1180 is coupled between the positive power bus terminal 251 and the negative power battery device/bus terminal 253. The fourth body diode 1180 has forward bias diode current flow direction from the negative power battery device/bus terminal 253 toward the positive power bus terminal 251. The fourth switch 1172 acts as a node output shorting switch to provide continuity of series-connected nodes when the battery is disconnected. The function of switch 1172 can be replaced by turning on switches 1102 and 1110 after $I_L$ has been ramped to zero, as long as third switch 1134 is open. Accordingly, fourth switch 1172 is an embodiment of switch 257 of FIGS. 9A-9D. DC-DC converter optionally further includes soft shorting switch 259 and resistor 261 of FIG. 1 (not shown in FIG. 11).

The DC-DC converter 1100 further includes an auxiliary discharge circuit 1182 that provides a current-limited auxiliary circuit to safely discharge battery 104. The auxiliary discharge circuit includes a fifth transistor switch 1186 including a body diode 1192 and electrically coupled in series with resistor 1184, whose value is chosen to limit discharge current to an acceptable value. During auxiliary discharge operation, the third switch 1134 is turned off (open) to isolate the battery 104 from the inductor 1122. The fifth switch 1186 is turned on (closed) so that current can flow from the battery 104 through the positive battery device terminal 252 through the resistor 1184 and to the negative power battery device terminal 253, to safely discharge the battery 104 via resistor 1184. Third switch 1134 can be implemented by one or more different transistors, or by another type of switching device, such as a relay or contactor, without departing from the scope hereof.

Figure 12:
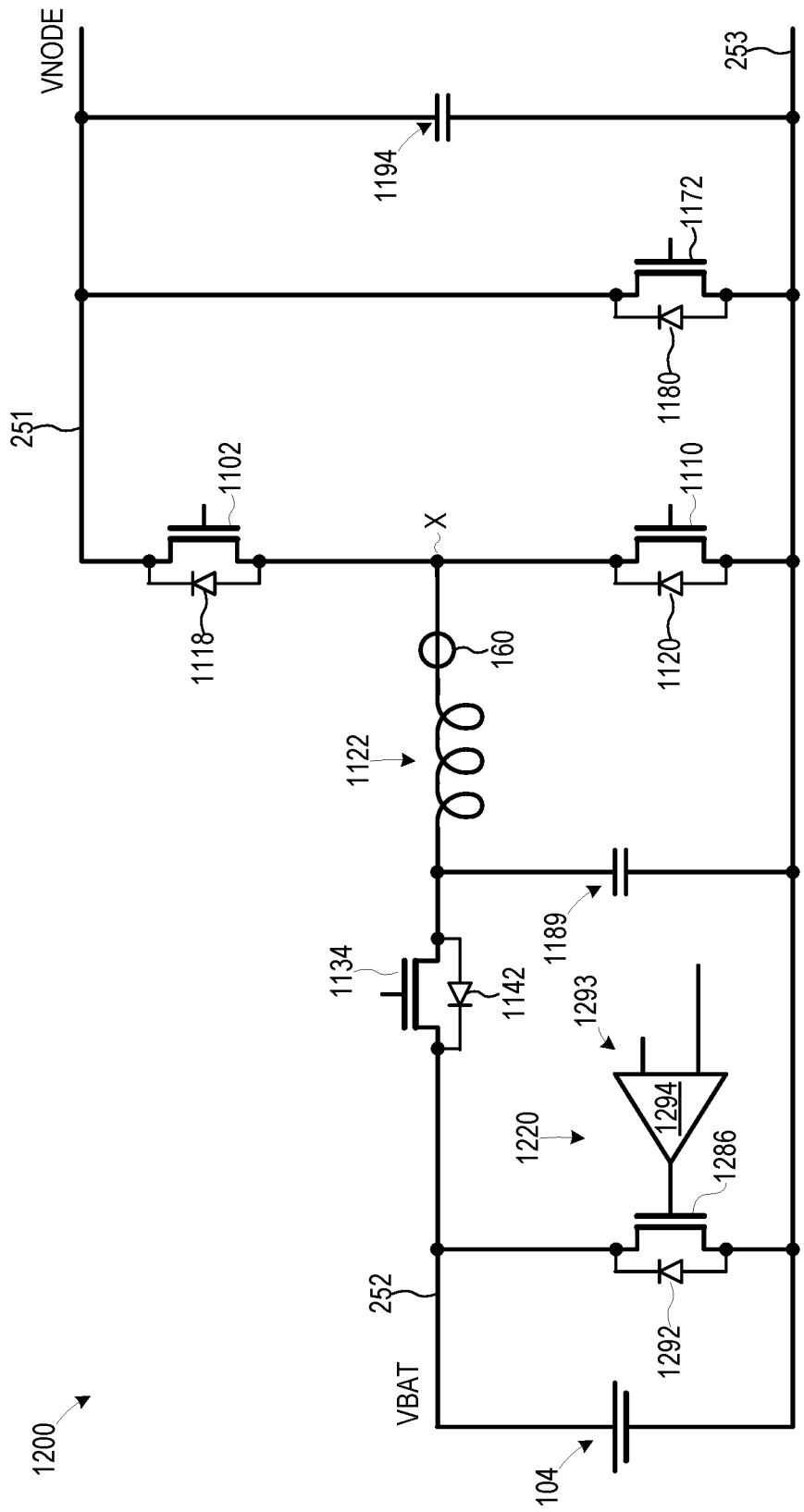
FIG. 12 is an illustrative circuit diagram of a second example bi-directional DC-DC converter circuit for use in an example node of FIG. 1.

FIG. 12 is an illustrative circuit diagram of a second example bi-directional DC-DC converter circuit 1200 for use in an example node 100 as DC-DC converter 106. For efficiency of description, components of the second converter circuit 1200 that correspond to components of the first converter circuit 1000 of FIG. 12 will not be described again. A battery discharge circuit 1220 includes (a) a fifth switch 1286 with a parasitic diode 1292 and (b) a current control circuit 1293, which includes an amplifier circuit 1294 coupled to control first switch 1286 and thereby discharge the battery 104 at a selectable current. In one embodiment, the current is fixed to discharge a fully-charged cell in a pre-determined period of time, such as one hour (a 1 C discharge) to 15 minutes (a 4 C discharge). In another embodiment, the current is controlled to regulate battery or circuit temperature to promote rapid, yet safe, discharge. During auxiliary discharge mode operation, the third switch 1134 is turned off (open) and amplifier 1294 controls fifth switch 1286 to act as a current source and thereby safely discharge battery 104, as discussed above.

Alternatively, processor 117-2, stack controller 210, and/or host controller 212 can utilize the existing load and take a battery offline at the most opportunistic time to achieve a safe discharge while still delivering energy to the load 204. In this embodiment, no additional discharge circuitry is required. Once an unsafe battery is identified, it is never charged. Rather, it is taken offline until one or more regular discharge cycles discharge it to a safe SOC or voltage, such as below about 20% state of charge. The discharges are optionally controlled to be at a different rate than those of the healthy cells. For example, a higher discharge rate could be deemed necessary for a battery at greater risk of failure from storage at SOC. A lower discharge rate could be deemed necessary for a battery with abnormally high series resistance to avoid self-heating. Once safely discharged, the battery can remain bypassed in its low SOC state until inspection and possible repair or replacement. Battery 104 discharge rate is controlled, for example, by controlling the battery 104's respective DC-DC converter 106 to vary node output voltage, i.e. voltage across output port 260. For example, battery 104's discharge rate could be increased by controlling the DC-DC converter 106 such that node output voltage is greater than that of other nodes in the stack, and battery 104's discharge rate could be decreased by controlling the DC-DC converter 106 such that node output voltage is less than that of other nodes in the stack.

FIG. 13A is an illustrative circuit diagram of a simplified example bi-directional DC-DC converter circuit 1300 for use in an example node 100. Details of the converter circuit will be understood from the description of FIG. 11. FIGS. 13B-13C are illustrative signal diagrams representing a process to discharge an unsafe battery device. During normal operation, the battery 104 is charged and discharged by the load, as illustrated in FIG. 13B. During a discharging operating mode, in contrast, DC-DC converter 1300 operates to discharge the unsafe battery 104 into load 204 as quickly as possible while avoiding catastrophic failure. During charging operations, the unsafe battery 104 is bypassed by DC-DC converter 1300, such as by turning off switch 1134 and turning on switch 1172 so that battery 104 is not recharged when other battery devices are recharged, as shown in FIG. 13C. The battery 104 continues discharging in subsequent discharge cycles until the desired safe voltage or state of charge is achieved. This unidirectional operation of DC-DC converter 1300, i.e. causing battery 104 to participate in only discharge cycles, may be particularly useful in situations where it is desired to minimize cost of addressing a defective battery, such in situations where battery 104 is only possibly defective or is only mildly defective.

Referring again to FIGS. 1 and 2, in some embodiments, processor circuit 217-2, stack controller 210, and/or host controller 212 are configured to send commands to load 204, and load 204 is configured to perform one or more actions in response to these commands. For example, in particular embodiments, one or more of processor circuit 217-2, stack controller 210, and host controller 212 are configured to send a command to load 204 to increase its power consumption, and load 204 is configured to respond accordingly, to expedite safe discharge of one or more batteries 104, in response to determining that the batteries are unsafe and/or in response to a signal to perform a controlled discharge of batteries 104. Further in some embodiments, processor circuit 217-2, stack controller 210, and/or host controller 212 are configured to send commands to load 204 to set magnitude of voltage $V_L$ and/or current $I_L$, thereby enabling the energy storage system 200 to further control discharge of one or more batteries 104. In certain embodiments, one or more of processor circuit 217-2, stack controller 210, and host controller 212 are configured to dynamically control magnitude of voltage $V_L$ and/or current $I_L$ via commands to load 204, such as according to one or more battery or node parameters. Examples of these parameters include, but are not limited to, battery 104 temperature, battery 104 state of charge, battery 104 state of degradation, battery 104 state of health, and battery 104 safety characteristics. Additionally, processor circuit 217-2, stack controller 210, and/or host controller 212 may be configured to command load 204 to decrease power consumption, adjust voltage $V_L$ and/or current $I_L$, in response to one or more batteries 104 being in a safe condition, such as in response to battery voltage or battery state of charge crossing a threshold value.

Moreover, in some embodiments where load 204 is a photovoltaic device or photovoltaic system, processor circuit 217-2, stack controller 210, and/or host controller 212 are configured to command nodes in one or more stacks to set voltage $V_L$ to a value that is sufficiently high to transfer power from one or more batteries 104 to the photovoltaic device or system 104, to facilitate safe discharge of the batteries 104. Furthermore, in these embodiments, processor circuit 217-2, stack controller 210, and/or host controller 212 are optionally configured to command nodes in one or more stacks to set magnitude of current $I_L$ to a desired value during safe battery 104 discharge, such as to expedite battery 104 discharge while not overloading the photovoltaic device or system.

Node Isolation

Figure 14A:
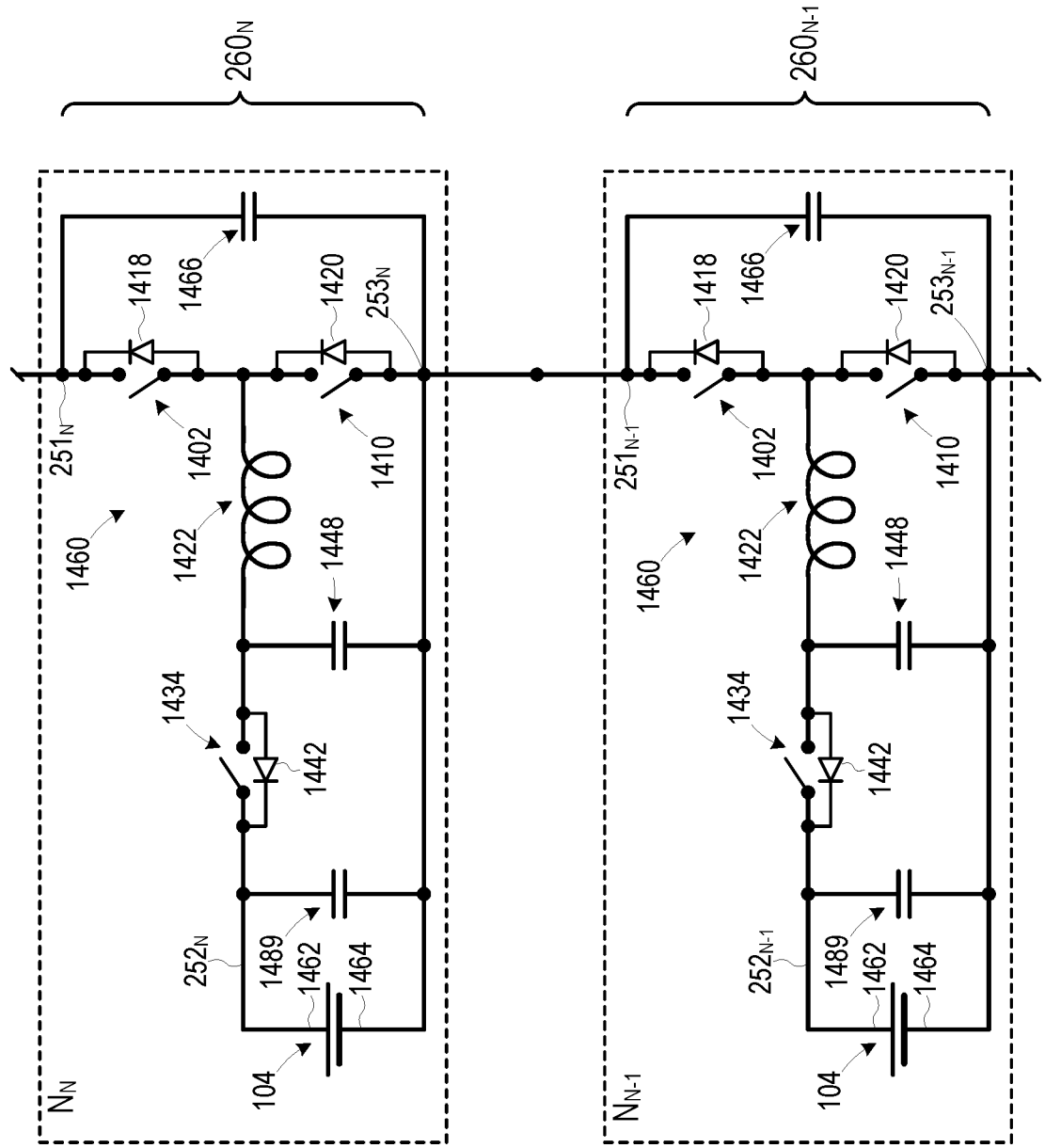
FIG. 14A is an illustrative circuit diagram showing portions of two series-connected example nodes of a stack that lacks failure mode protection from reverse voltage in a disconnect state.
Figure 14B:
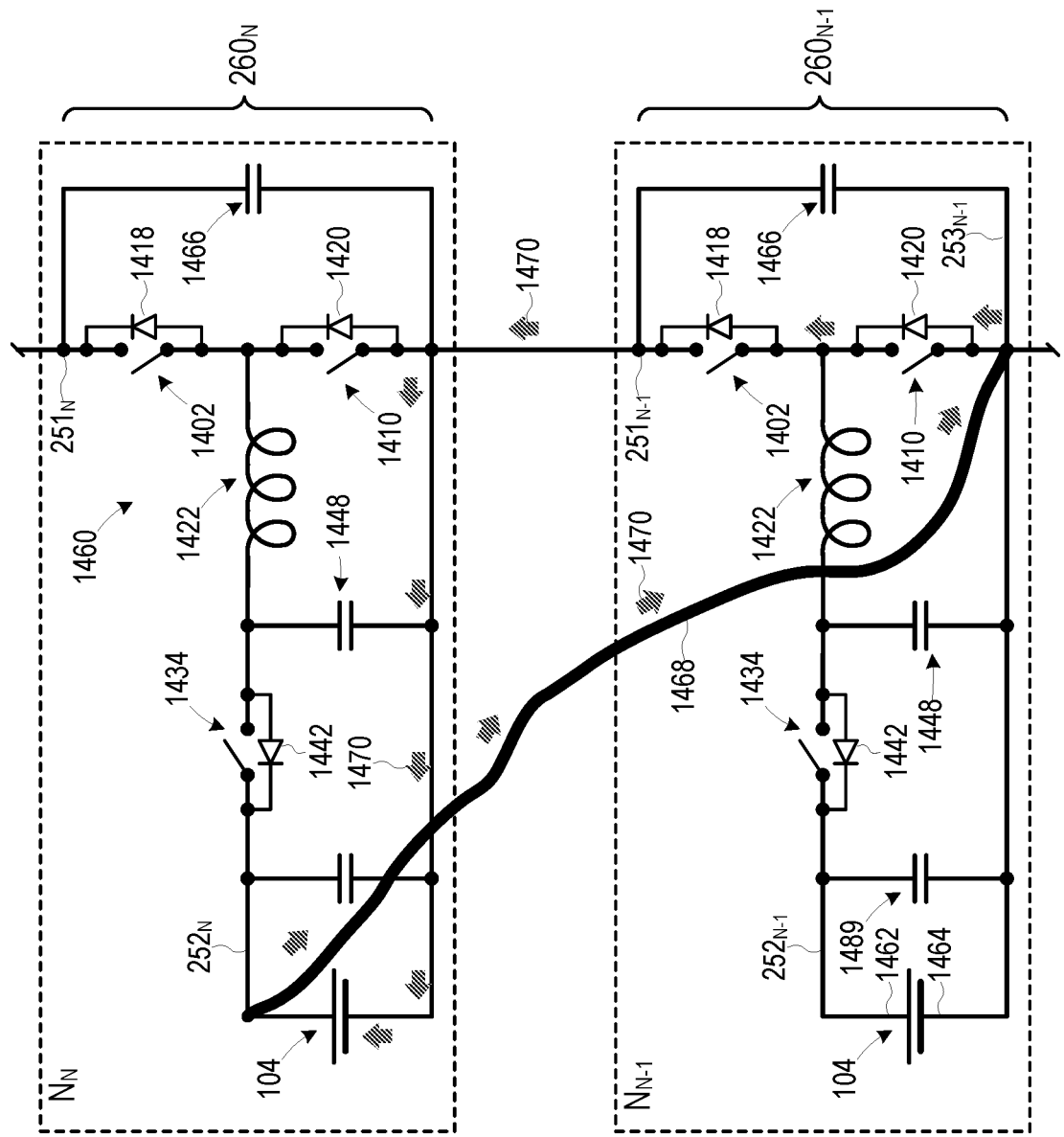
FIG. 14B is an illustrative circuit diagram showing short circuit current flow between the nodes of the stack of FIG. 14A during a short circuit failure from reverse voltage in a disconnect state.

FIG. 14A is an illustrative circuit diagram showing portions of an example series-connected nodes $N_N$ and $N_{N-1}$ of a stack that lacks reverse voltage failure mode protection in a disconnect state. In a floating disconnect state, all switches are turned off (open). FIG. 14B is an illustrative circuit diagram showing short circuit current flow between the nodes $N_N$ and $N_{N-1}$ of the stack of FIG. 14A during a reverse voltage short circuit failure in a floating disconnect state. In other words, FIG. 14B illustrates that a reverse voltage (a short from the positive terminal of one battery to the negative terminal of the node below) is unprotected, despite isolation switch 1434 being open. The unprotected reverse voltage causes a cell short through the body diodes 1420 and 1418 of switches 1410 and 1402 with large current which is likely to cause thermal runaway and lead to fire.

Each node N includes a battery 104 with a positive terminal 1462 and a negative terminal 1464, a capacitor 1489, a capacitor 1448, a capacitor 1466, an inductor 1422, a first switch 1402 including a body diode 1418, a second switch 1410 including a body diode 1420, and a third switch 1434 including a body diode 1434. Some instances of these elements are not labeled for illustrative clarity. First switch 1402, second switch 1410, and inductor 1422 form a core of a DC-DC converter 1460 including an output port 260 configured for electrically coupling in series with additional nodes N. The third switch 1434 is electrically coupled between the positive terminal 1462 of the battery 104 and the DC-DC converter 1460, and it is configured to selectably connect and disconnect the battery 1434 from the DC-DC converter 1460. In some alternate embodiments, the third switch 1434 is instead electrically coupled between the negative terminal 1464 of the battery 104 and the DC-DC converter 1460. In some embodiments, the processor circuitry 217-2 controls the switches of each node, optionally with assistance of the stack controller 210 and/or the host controller 212.

Referring to FIG. 14A, during normal operation, each battery 104 provides a voltage, for example, of VBAT=~3.6V. When in a disconnect state, each of the first switch 1402, the second switch 1410, and the third switch 1434 are turned off (open). In an example stack, node $N_{N-1}$ can fail if a negative voltage in a range −1V is applied across the node's output, between the respective nodes positive and negative output terminals $251_{N-1}$ and $253_{N-1}$. The critical node voltage is given by the sum of the two body diodes 1418, 1420 forward voltages (2×~0.5V). If the critical node voltage is reached at node $N_{N-1}$, then a large current can flow through the two body diodes 1418 and 1420 and eventually cause permanent damage to example node $N_{N-1}$ and/or node $N_N$. For example, the battery 104 of node $N_N$ discharges quickly, which can result in thermal run away.

Referring to FIG. 14B, during an example failure mode, the positive battery device terminal $252_N$ of node $N_N$ is shorted to the negative power terminal $253_{N-1}$ of node $N_{N-1}$. A negative voltage across diodes 1418, 1420 becomes equivalent to voltage of the battery 104, e.g. about 3.6V. The first and second body diodes 1418, 1420 are forward biased and an uncontrolled current can flow through them. An aberrant electrical connection 1468 results in a short circuit current 1470 that flows from the positive battery device terminal $252_N$ of node $N_N$ to the negative power terminal $253_{N-1}$ of node $N_{N-1}$, through diodes 1418 and 1420. The aberrant electrical connection 1468 can be caused by a short circuit, such as a loose wire fragment that shorts the two, for example. The battery 104 of node $N_N$ feeds current and power to the short. If the short is applied for a long enough time, on the order of seconds, then it can cause catastrophic failure such as fire. In alternate embodiments where the third switch 1434 is electrically coupled between the negative terminal 1464 of the battery 104 and the DC-DC converter 1460, a short circuit current can flow between nodes $N_N$ and $N_{N-1}$ if the positive battery device terminal $252_N$ is shorted to the negative terminal 1464 of the battery of node NN−1, even if each of the first switch 1402, the second switch 1410, and the third switch 1434 are turned off (open).

Figure 14C:
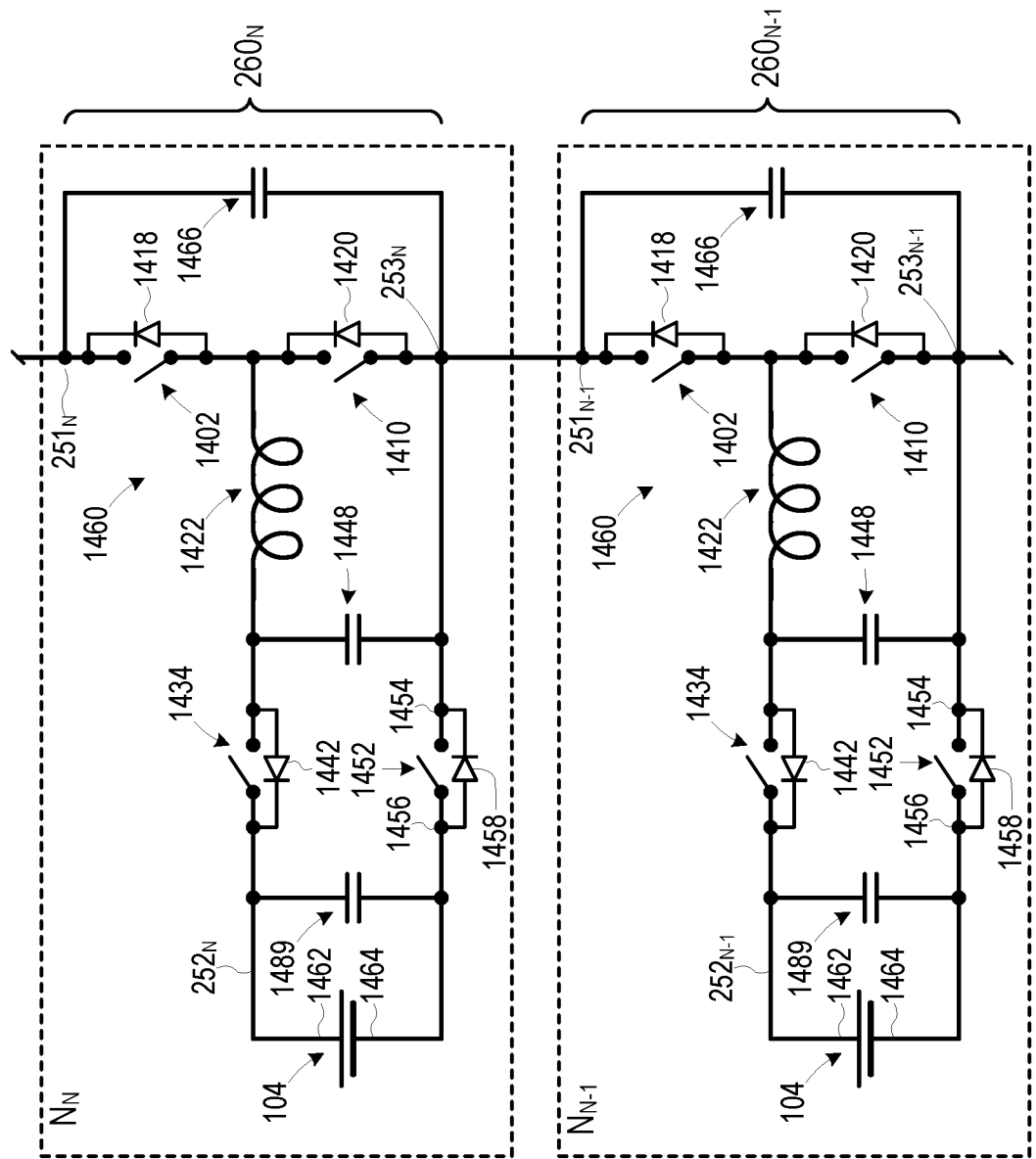
FIG. 14C is an illustrative circuit diagram showing portions of two series-connected example nodes of a stack, which include first example reverse voltage failure mode protection circuitry in a disconnect state during failure mode operation.
Figure 14D:
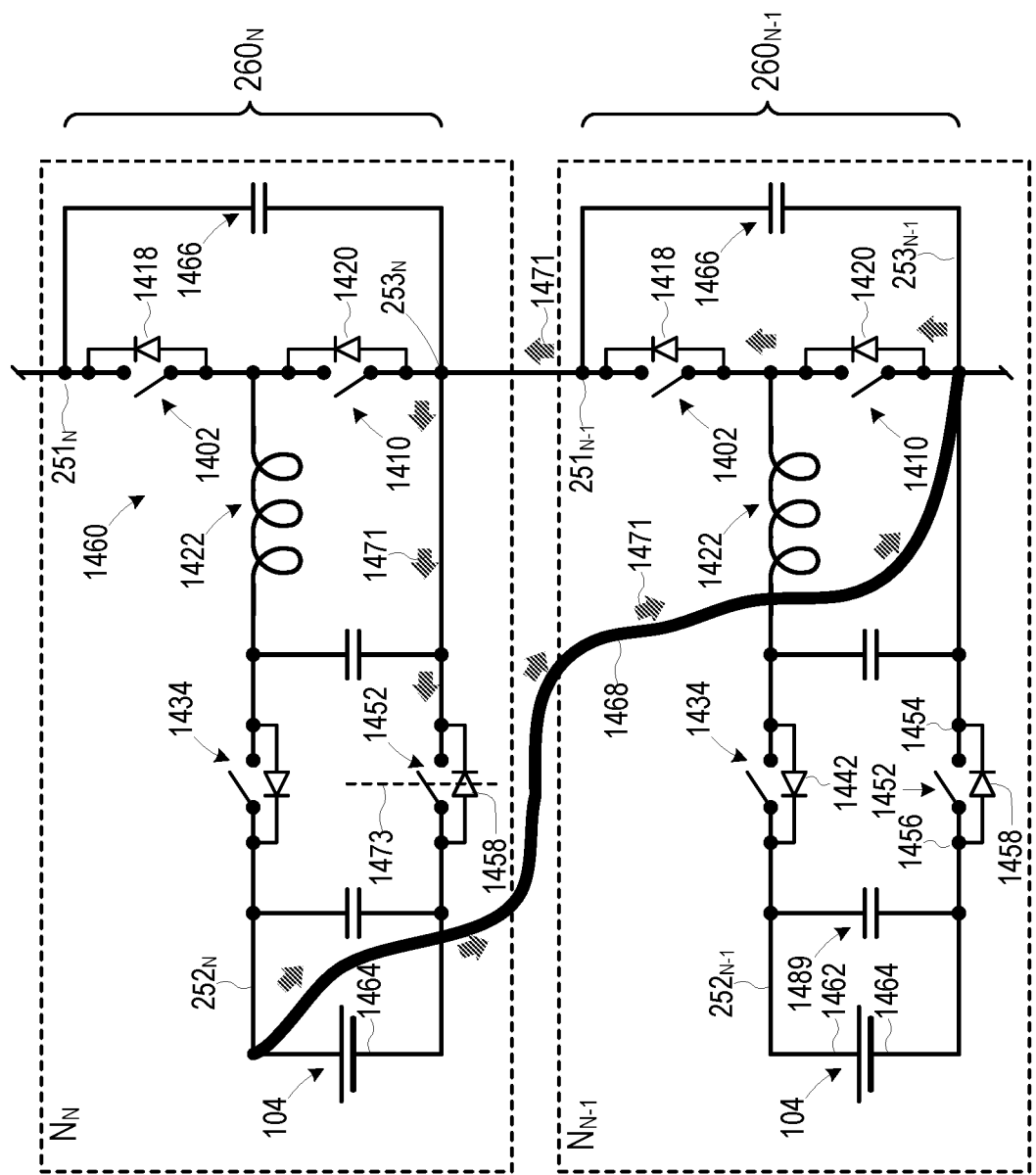
FIG. 14D is an illustrative circuit diagram showing blocked short circuit flow between the nodes of the stack of FIG. 14C during a short circuit failure from reverse voltage in a disconnect state.

FIG. 14C is an illustrative circuit diagram showing portions of an example series-connected nodes $N_N$ and $N_{N-1}$ of a BMS stack, which include first example reverse voltage failure mode protection circuitry in the form of an isolation switch 1452 including a body diode 1458, in a disconnect state during failure mode operation. FIG. 14D is an illustrative circuit diagram showing blocked short circuit flow between the nodes of the stack of FIG. 14C during a short circuit failure from reverse voltage in a disconnect state. For efficiency of description, circuit components shown in FIGS. 14C-14D that correspond to circuit components described in FIGS. 14A-14B will not be explained again.

Referring to FIG. 14C, example node $N_{N-1}$ includes an isolation switch 1452 that includes a first terminal 1454 and a second terminal 1456. The first terminal 1454 of the isolation switch 1452 is coupled to the second switch 1410. The second terminal 1456 of the isolation switch 1452 is coupled to the negative power terminal 1464 of battery 104 of node $N_{N-1}$. Thus, the isolation switch 1452 is coupled in series with the negative power terminal 1464 of battery 104 of node $N_{N-1}$. An advantage of this series arrangement is that a ground-referenced gate drive yields ease of implementation for an n-channel type switch; the switch can also be low voltage with a voltage rating a small margin above the voltage of the battery. The isolation switch 1452 is oriented such that its body diode 1458 does not provide a path for short circuit current 1471. Specifically, the anode of the body diode 1458 is connected to the negative terminal 1464 of the battery 104, and the cathode of the body diode 1458 is connected to the DC-DC converter 1460. Alternately, the isolation switch 1452 could be replaced with a switching device that does not include a body diode. Similarly, example node $N_N$ (and each of the other nodes of the BMS stack) includes an isolation switch 1452 and an associated body diode 1458 that are similarly coupled.

Referring to FIG. 14D, during an example failure mode, the positive power bus terminal $252_N$ of example node $N_N$ has an aberrant electrical connection 1468 with the negative power terminal $253_{N-1}$ of node $N_{N-1}$. The aberrant connection 1468 creates a risk of aberrant current flow 1471 from the positive battery device terminal $252_N$ of node $N_N$ through diodes 1418 and 1420 to the negative power terminal $253_{N-1}$ of node $N_{N-1}$. However, as represented by dashed line 1473, the open isolation switch 1452 prevents a short circuit current from flowing from the positive power terminal $252_N$ of battery 104 of node $N_N$ to the negative power terminal $253_{N-1}$ of node $N_{N-1}$. Thus, battery 104 of node $N_N$ cannot feed the short circuit and the stack is protected. Isolation switches 1452 are closed during normal charging/discharging operation.

Figure 14E:
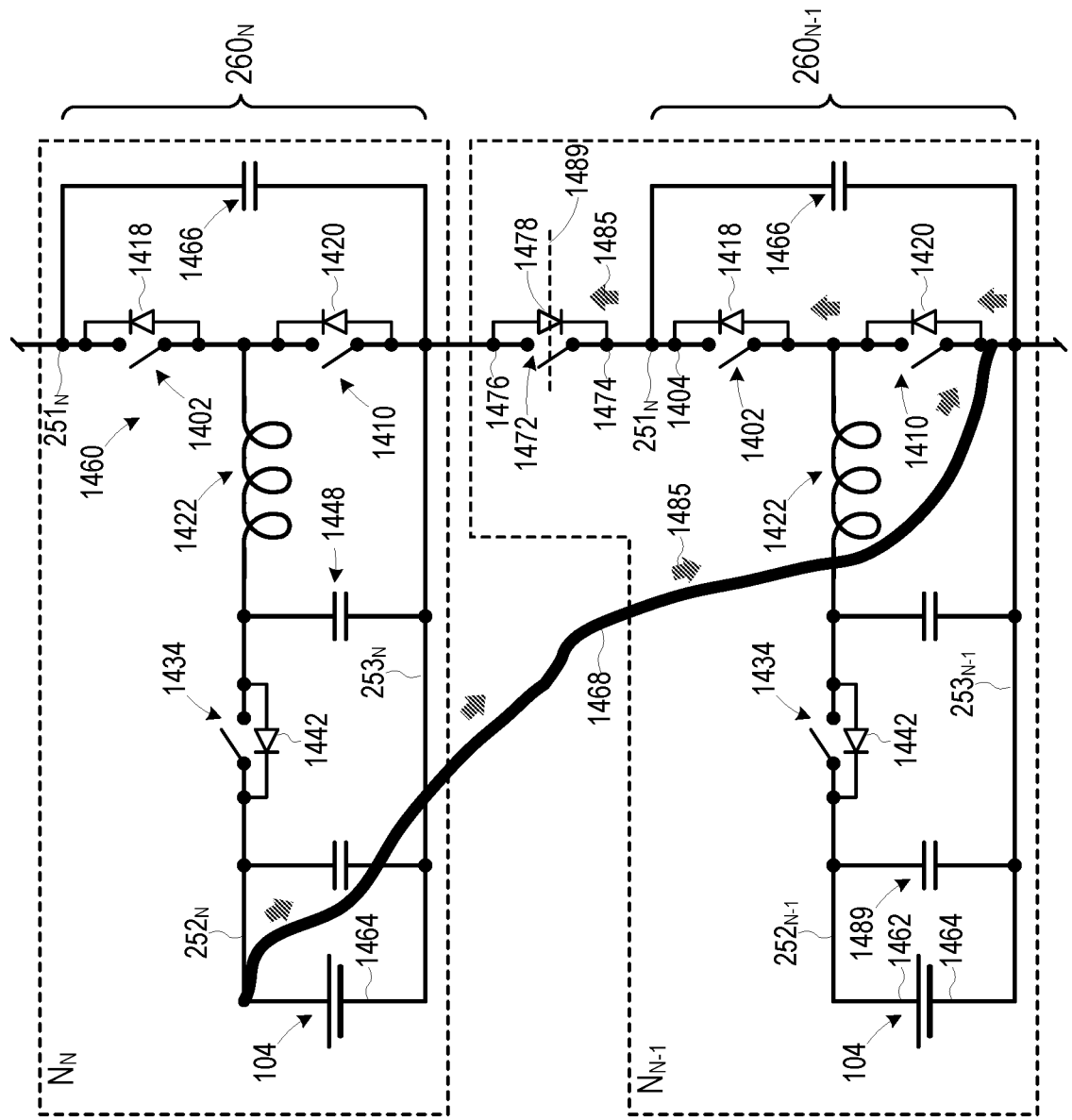
FIG. 14E is an illustrative circuit diagram showing portions of two series-connected example nodes of an example stack, which include second example reverse voltage failure mode protection circuitry in a disconnect state during failure mode operation.

Isolation switch 1452 can be replaced with one or more alternative isolation switches which also prevent the flow of electric current through the battery 104 of node $N_N$ in event of a short circuit with node $N_{N-1}$. For example, FIG. 14E is an illustrative circuit diagram showing portions of an example series-connected nodes $N_N$ and $N_{N-1}$ of a BMS stack, which include second example reverse voltage failure mode protection circuitry in the form of an isolation switch 1472 including a body diode 1478, in a disconnect state during failure mode operation. For efficiency of description, circuit components shown in FIG. 14E that correspond to circuit components described in FIGS. 14A-14D will not be explained again. Example node $N_{N-1}$ includes the isolation switch 1472 with a first terminal 1474 and a second terminal 1476. The first terminal 1474 of the isolation switch 1472 is coupled to a first terminal 1404 of a first switch 1402 of node $N_{N-1}$. The second terminal 1476 of the isolation switch 1472 is coupled to the negative power terminal $253_N$ of node $N_N$. The isolation switch 1472 is oriented such that its body diode 1478 does not provide a path for short circuit current 1485. Specifically, the cathode of the body diode 1478 is connected to the positive terminal $251_{N-1}$ of the output port $260_{N-1}$. Alternately, the isolation switch 1472 could be replaced with a switching device that does not include a body diode.

During normal node operation, battery 104 current does not continuously flow through the isolation switch 1472; instead current flows through the isolation switch 1472 only when switch 1410 is in its off or non-conductive state. Consequently, the root mean square (RMS) value of current flowing though the isolation switch 1472 will be less than the RMS value of current flowing through the isolation switch 1452 of FIG. 14D, assuming equivalent operating conditions. Therefore, the isolation switch 1472 of FIG. 14E can have a larger on-resistance than the isolation switch 1452 of FIG. 14D for the same switch conduction losses. In some embodiments, the isolation switch 1472 is either a n-channel field effect transistor or a p-channel field effect transistor, depending on gate driver circuitry design.

Still referring to FIG. 14E, in an example failure mode, the positive bus terminal 252N of example node $N_N$ has an aberrant electrical contact 1468 with the negative power terminal $253_{N-1}$ of node $N_{N-1}$. The aberrant connection 1468 creates a risk of aberrant current flow 1485 from the positive battery device terminal $252_N$ of node $N_N$ through diodes 1418 and 1420 to the negative power terminal $253_{N-1}$ of node $N_{N-1}$. However, as represented by dashed line 1489, the open switch 1472 prevents potential 1485 current from flowing from the positive battery terminal $252_N$ of battery 104 of node $N_N$ to the negative power terminal $253_{N-1}$ of node $N_{N-1}$. Thus, battery 104 of node $N_N$ cannot feed the short circuit. Node $N_N$ optionally further includes an isolation switch 1472 (not shown) analogous to that of node $N_{N-1}$.

Figure 14F:
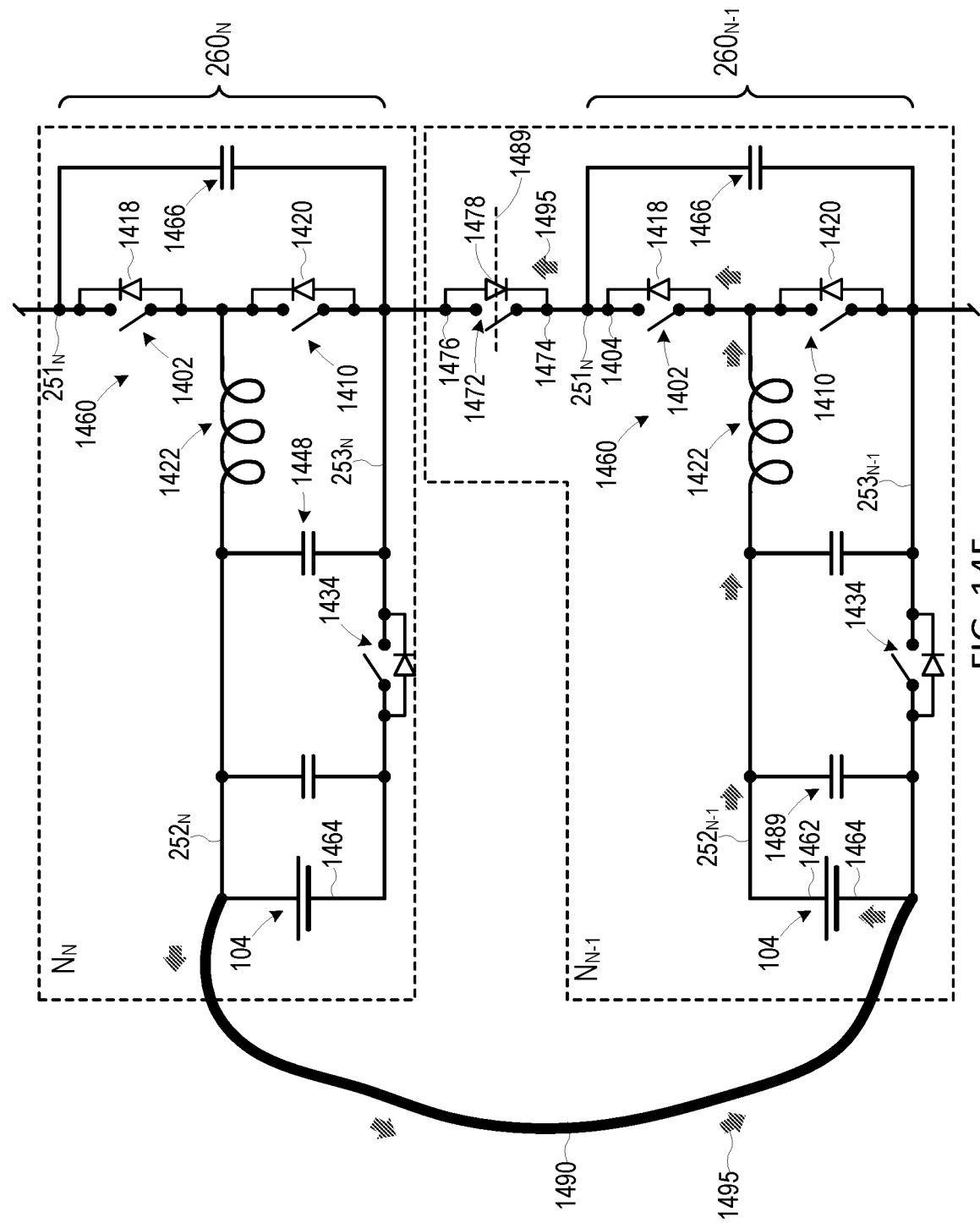
FIG. 14F is an illustrative circuit diagram showing portions of two series-connected example nodes of another example stack, which include second example reverse voltage failure mode protection circuitry in a disconnect state during failure mode operation.

The isolation switch 1472 also prevents short circuit current flow in embodiments where the third switch 1434 is electrically coupled between the negative terminal 1464 of the battery 104 and the DC-DC converter 1460, instead of between the positive terminal 1462 of the battery 104 and the DC-DC converter 1460. For example, FIG. 14F is an illustrative circuit diagram showing portions of an example series-connected nodes $N_N$ and $N_{N-1}$ of a BMS stack, which include second example reverse voltage failure mode protection circuitry in the form of the isolation switch 1472, in a disconnect state during failure mode operation. For efficiency of description, circuit components shown in FIG. 14F that correspond to circuit components described in FIGS. 14A-14E will not be explained again. The third switch 1434 is electrically coupled between the negative terminal 1464 of the battery 104 and the DC-DC converter 1460 in this example.

In an example failure mode, the positive bus terminal $252_N$ of example node $N_N$ has an aberrant electrical contact 1490 with the negative terminal 1464 of the battery 104 of node $N_{N-1}$. The aberrant connection 1490 creates a risk of aberrant current flow 1495 from the positive battery device terminal $252_N$ of node $N_N$ through the diode 1418 of node $N_{N-1}$ and the diode 1420 of node $N_N$. However, as represented by dashed line 1489, the open switch 1472 prevents potential current 1495 from flowing.

It will be appreciated by those skilled in the art that variations can be made to the exemplary energy storage systems, battery management system nodes, and associated methods, without departing from the spirit and scope of the present disclosure. For example, based on principles of duality of electrical circuits, variations of the exemplary DC-DC converters can be made by appropriate substitution of inductors for capacitors (and vice versa), currents for voltages, and series for parallel configurations while still achieving the desired functionality, and such variations are considered to be within the scope of the present disclosure in light of the teachings presented herein. For example, DC-DC converter 1100 of FIG. 11 could be modified such that the DC-DC converter operates as a boost converter during charging of battery 104 and the DC-DC converter acts a buck converter during discharging of battery 104. As another example, DC-DC converter 1100 could be replaced with a buck-boost converter to enable both step-up and step-down transformation of battery voltage to node voltage.

Additional Examples

The aforementioned methods are further applicable to energy management systems with BMS nodes that do not regulate node voltage or stack voltage. For example, the methods may be applied to energy management systems with BMS nodes that do not include power converters. As another example, the methods may be applied to energy management systems with BMS nodes including DC-DC converters configured to handle differential power, i.e., a difference in power between BMS nodes or a difference in power between respective batteries of BMS nodes, instead of full BMS node power or full power of a respective battery. For instance, the DC-DC converters could be configured to transfer differential power between adjacent BMS nodes, the DC-DC converters could be configured to transfer differential power between a BMS node and a bus, or the DC-DC converters could be configured to transfer differential power between a BMS node and a load or a power source.

Taking a BMS node offline, such as by causing the BMS node to operate in a bypass mode, may change stack voltage in embodiments where BMS nodes do not regulate node voltage or stack voltage. However, such change in stack voltage may be acceptable if it is a relatively small percentage of stack voltage prior to taking the BMS node offline. For example, a change in stack voltage from taking a BMS node offline that is less than ten percent, or is less than five percent, of stack voltage prior to taking the BMS node offline may be acceptable. Additionally, change in stack voltage caused by taking a BMS node offline may be acceptable in energy management systems including one or more alternative means for regulating voltage, such as a stack-level power converter (e.g., internal or external to an inverter or other load electrically coupled to the stack) that enables connection of parallel stacks or interfaces the stack to a load with a regulated voltage.

Discussed below with respect to FIGS. 16-35 are several examples of how the aforementioned methods could be applied to battery energy management systems with BMS nodes that do not regulate node or stack voltage. It is understood, however, that the aforementioned methods are not limited to these example applications.

Figure 16:
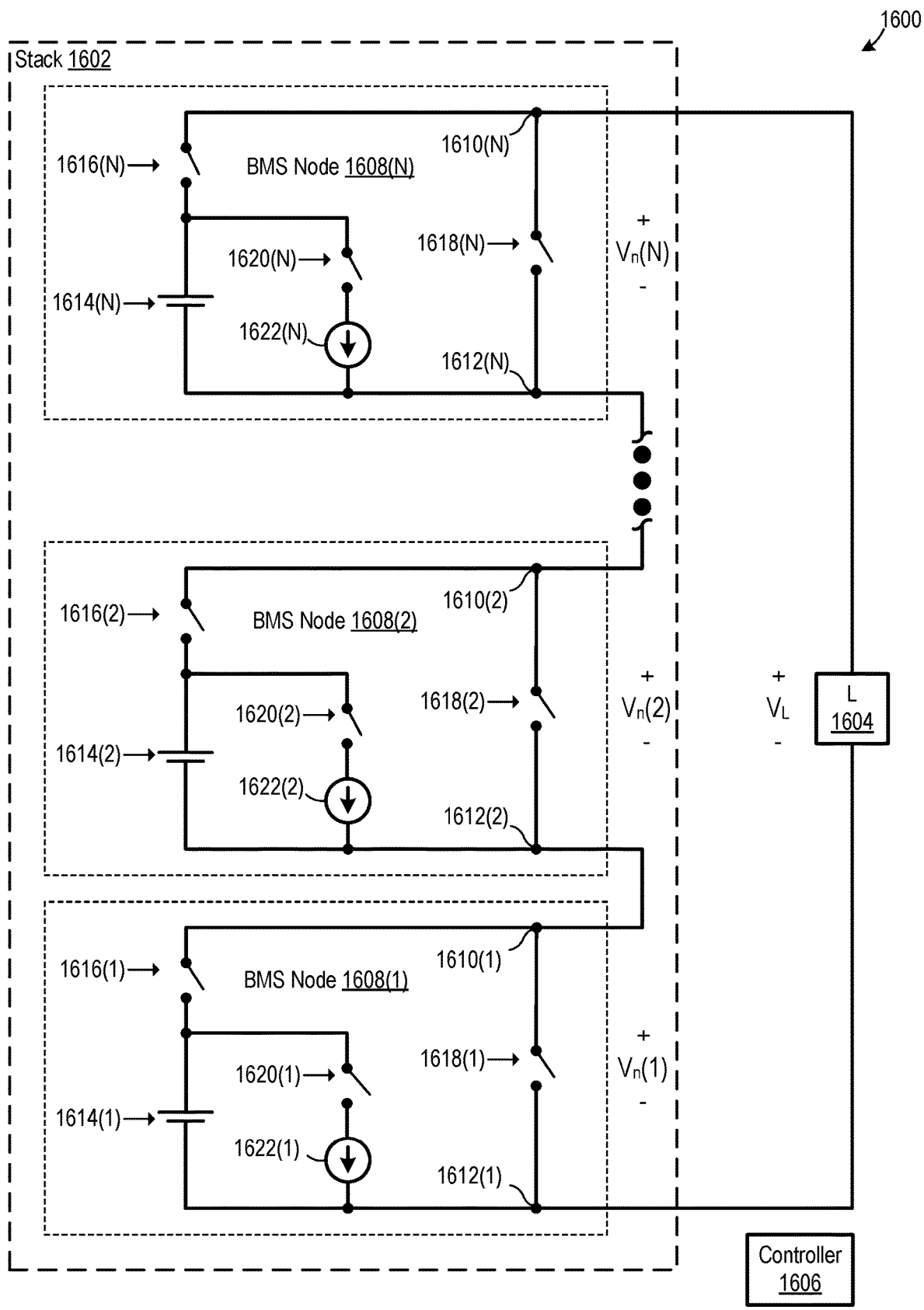
FIG. 16 is an illustrative block diagram of an example energy storage system that includes multiple BMS nodes without DC-DC converters.

FIG. 16 is an illustrative block diagram of an example energy storage system 1600 including a stack 1602, an electrical load 1604, and a controller 1606. Energy storage system 1600 could include additional stacks 1602 without departing from the scope hereof, and each stack 1602 need not have the same configuration. Electrical load 1604 is electrically coupled to stack 1602, and electrical load 1604 is analogous to electrical load 204 of FIG. 2. Accordingly, electrical load 1604 can both receive power from energy storage system 1600 as well as provide power to energy storage system 1600 for charging batteries. Controller 1606 is configured to control energy storage system 1600, and connections between controller 1606 and other elements of energy storage system 1600 are not shown for illustrative clarity. Although controller 1606 is depicted as being a single element, some embodiments of controller 1606 are embodied by two or more sub-elements that need not be disposed at a common location. For example, some embodiments of controller 1606 are at least partially embodied by a distributed computing system. Although controller 1606 is depicted as being separate from stack 1602, controller 1606 could be at least partially integrated with stack 1602. In particular embodiments, controller 1606 is analogous to stack controller 210 of FIG. 2 and/or host controller 212 of FIG. 2. In some embodiments, controller 1606 is at least partially embodied by a respective node controller (not shown) of each BMS node 1608, where the node controllers of all BMS nodes 1608 collectively perform at least some of the functions of controller 1606.

Stack 1602 includes N BMS nodes 1608, where N is an integer greater than one. In this document, specific instances of an item may be referred to by use of a numeral in parentheses (e.g., BMS node 1608(1)) while numerals without parentheses refer to any such item (e.g., BMS nodes 1608). Each BMS node 1608 includes a positive output node 1610 and a negative output node 1612, and BMS nodes 1608 are electrically coupled in series in stack 1602 such that a positive output node 1610 of one BMS node 1608 is electrically coupled to a negative output node 1612 of an adjacent BMS node 1608. For example, positive output node 1610(1) of BMS node 1608(1) is electrically coupled to negative output node 1612(2) of adjacent BMS node 1608(2). Each BMS node 1608 has a respective node voltage $V_n$ across its output nodes 1610 and 1612.

Each BMS node 1608 further includes a battery 1614, an isolation switch 1616, and a bypass switch 1618. Within each BMS node 1608, battery 1614 and isolation switch 1616 are electrically coupled in series between positive output node 1610 and negative output node 1612, and bypass switch 1618 is electrically coupled between positive output node 1610 and negative output node 1612. Each BMS node 1608 optionally further includes a discharge switch 1620 and a current source 1622 electrically coupled in parallel with battery 1614 of the node. Controller 1606 is configured to control each switch 1616, 1618, and 1620, such as to cause the switches to open or close, although connections between controller 1606 and the switches are not shown for illustrative clarity.

BMS nodes 1608 do not include DC-DC converters, and BMS nodes 1608 are therefore incapable of regulating their respective node voltages $V_n$. In some embodiments, each BMS node 1608 may operate in a plurality of possible operating modes, under the control of controller 1606. For example, in certain embodiments, each BMS node 1608 is capable of operating in a normal charge/discharge mode, a bypass mode, and a floating mode. The normal charge/discharge mode of a given BMS node 1608 is characterized by (a) isolation switch 1616 being closed, (b) bypass switch 1618 being open, and (c) discharge switch 1620 being open. The bypass mode of a given BMS node 1608 is characterized by (a) isolation switch 1616 being open and (b) bypass switch 1618 being closed. While not required, discharge switch 1620 may be open in the bypass node. The floating mode of a given BMS node 1608 is characterized by each of isolation switch 1616, bypass switch 1618, and discharge switch 1620 being open.

All BMS nodes 1608 need not operate in the same operating mode at a given time. For example, assume that all BMS nodes 1608 are operating in their respective normal charge/discharge modes, and a fault occurs in BMS node 1608(2) at a time $t_a$. Controller 1606 may cause BMS mode 160(2) to transition to either its bypass mode or its floating mode in response to the fault, while remaining BMS nodes 1608 continue to operate in their normal charge/discharge modes. Detecting a fault and responding to a fault at a BMS node level may be significantly quicker than detecting and responding to the fault at a stack level or at a system level.

Stack 1602 may also operate in one or more of several operating modes under the control of controller 1606. For example, stack 1602 may operate in a normal charge/discharge mode and one or more of a floating mode, a bypass mode, and a safe mode, under control of controller 1606. Certain embodiments of controller 1606 are configured to cause stack 1602 to transition between operating modes as discussed above with respect to fault response state diagram 950 of FIG. 9E. The normal charge/discharge mode of stack 1602 is characterized by each BMS node 1608 operating in its normal charge/discharge mode, such that batteries 1614 are electrically coupled in series in stack 1602. The floating mode of stack 1602 is characterized by one or more BMS nodes 1608 operating in its floating mode, such that one or more batteries 1614 are isolated and stack 1602 has a high impedance as seen from electrical load 1604. The bypass mode is characterized by each BMS node 1608 operating in its bypass mode, such that batteries 1614 are isolated and stack 1602 has a low impedance as seen from electrical load 1604. The safe mode is characterized by (a) a first subset of BMS nodes 1608 operating in their normal charge/discharge mode and (b) a second subset of BMS nodes 1608 operating in their bypass mode, where all BMS nodes 1608 are part of either the first subset or the second subset, in a manner similar to that discussed above with respect to FIG. 9D.

Additionally, certain embodiments of energy storage system 1600 are configured to safely discharge a battery 1614 under control of controller 1606, such in response to a determination that the battery or energy storage system is unsafe, such as described above, or in response to a command to discharge the battery, such as in preparation for performing system maintenance or service. For example, certain embodiments of energy storage system 1600 are configured to safely discharge battery 1614 of a given BMS node 1608 by opening isolation switch 1616 of the BMS node and by closing discharge switch 1620 of the BMS node, so that current source 1622 of the BMS node safely discharges the battery. BMS nodes 1608 could be modified to include alternative circuitry for safely discharging their respective batteries 1614. For example, current sources 1622 could be replaced with respective resistors so that each BMS node 1608 includes a discharge circuit similar to the FIG. 11 discharge circuit. As another example, discharge switches 1620 and current sources 1622 could be replaced with respective transistors driven by respective amplifiers so that each BMS node 1608 includes a discharge circuit similar to the FIG. 12 discharge circuit.

Energy storage system 1600 could also be configured to safely discharge a battery 1614 via electrical load 1604 in a manner similar to that discussed above with respect to FIGS. 13A-13C. For example, battery 1614(2) could be safely discharged by (a) operating BMS node 1608(2) in its bypass mode during a charging mode of energy storage system 1600 and (b) operating BMS node 1608(2) in its normal charge/discharge node during a discharging mode of energy storage system 1600, such that battery 1614(2) is safely discharged into electrical load 1604 over one or charge/discharge cycles of energy storage system 1600.

The arc fault detection and mitigation methods discussed above could also be applied to energy storage system 1600 or variations thereof. For example, stack 500 of FIG. 5A, the stacks of FIGS. 6A and 6B, and the stacks of FIGS. 8A and 8B could be embodied by instances of stack 1602 of FIG. 16. Additionally, nodes $N_1$-$N_N$ of FIG. 7A could be embodied by instances of BMS nodes 1608. Additionally, the methods of FIGS. 5B and 7B could be applied to energy storage system 1600, and the methods of FIGS. 6C and 8C could be applied to embodiments of energy storage system 1600 including a plurality of stacks 1602.

Furthermore, the measurement synchronization methods discussed above could be applied to energy storage system 1600 or variations thereof. For example, the method of FIG. 3A and the method of FIG. 3B could be applied to alternate embodiments of energy storage system 1600 where BMS nodes 1608 further include circuitry for obtaining measurements, such as voltage measurements, current measurements, and/or temperature measurements, as well as telemetry circuitry for sending and/or receiving measurement information. As another example, the concepts of FIGS. 4A, 4B, and 4C could be applied to alternate embodiments of energy storage system 1600 where BMS nodes 1608 further include measurement circuitry and telemetry circuitry.

Referring again to FIG. 16, some embodiments of energy storage system 1600 are further configured to selectably isolate individual BMS nodes 1608, i.e., selectably transition individual BMS nodes 1608 between their normal charge/discharge mode and bypass mode. Controller 1606 is optionally configured to selectably isolate individual BMS nodes 1608, for example, to ensure that all batteries 1614 reach a given state of charge (e.g., a minimum state of charge or a maximum state of charge) at approximately the same time. For example, assume that battery 1614(2) is at a higher state of charge than other batteries 1614 of stack 1602 during a charge cycle of energy storage system 1600. Controller 1606 may cause BMS node 1608(2) to operate in its bypass mode during a portion of the charge cycle, which enables charging of other batteries 1614 in stack 1602 to catch up to battery 1614(2), thereby potentially enabling all batteries 1614 of stack 1602 to reach a maximum state of charge at approximately the same time. As another example, assume that battery 1614(1) is discharging more quickly than other batteries 1614 of stack 1602 during a discharge cycle of energy storage system 1600. Controller 1606 may cause BMS node 1608(1) to operate in its bypass mode for a portion of the discharge cycle, which reduces rate of discharge of battery 1614(1) and thereby potentially enables all batteries 1614 to reach minimum state of charge at approximately the same time.

Discussed below with respect to FIGS. 17-35 are example energy storage systems where BMS nodes include respective DC-DC converters for transferring differential power, such as directly between BMS nodes, between a BMS node and a bus, or between a BMS node and a load or a power source. However, it is understood that other topologies capable of differential power transfer are within the scope of this disclosure.

The example energy storage systems of FIGS. 17-35 include switching devices and current sources analogous to the switching devices and current sources of BMS nodes 1608. Accordingly, certain embodiments of the stacks of the energy storage systems of FIGS. 17-35 are capable of operating in a normal charge/discharge mode and in one or more of a floating mode, a bypass mode, and a safe mode, in a manner like that discussed above with respect to FIG. 16. Certain embodiments of the BMS nodes of energy storage systems of FIGS. 17-35 are also capable of operating in a normal charge/discharge mode and in one or more of a floating mode and a bypass mode, in a manner like that discussed above with respect to FIG. 16. Additionally, some embodiments of the energy storage systems of FIGS. 17-35 are capable of safely discharging a battery, and/or detecting and mitigating an arc fault, in a manner similar to that discussed above with respect to FIG. 16. Furthermore, the measurement synchronization methods discussed above could be applied to the example energy storage systems of FIGS. 17-35 in a manner similar to how the synchronization methods could be applied to energy storage system 1600 of FIG. 16.

Figure 17:
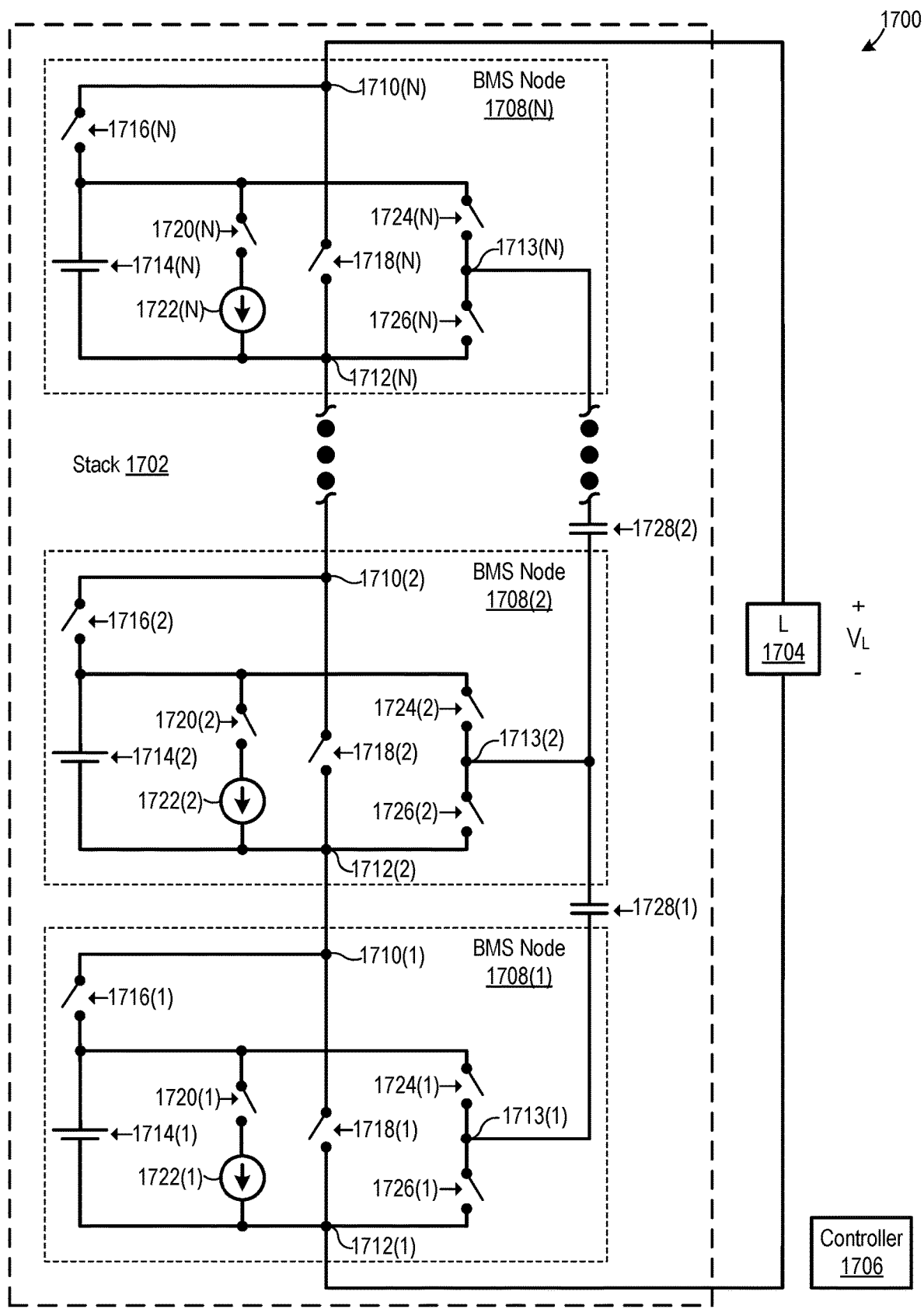
FIG. 17 is an illustrative block diagram of an example energy storage system that includes multiple BMS nodes capable of transferring charge between batteries of adjacent BMS nodes via capacitors between adjacent BMS nodes.

FIG. 17 is an illustrative block diagram of an example energy storage system 1700 including a stack 1702, an electrical load 1704, and a controller 1706. Energy storage system 1700 could include additional stacks 1702 without departing from the scope hereof, and each stack 1702 need not have the same configuration. Electrical load 1704 is electrically coupled to stack 1702, and electrical load 1704 is analogous to electrical load 204 of FIG. 2. Accordingly, electrical load 1704 can both receive power from energy storage system 1700 as well as provide power to energy storage system 1700 for charging batteries. Controller 1706 is configured to control energy storage system 1700, and connections between controller 1706 and other elements of energy storage system 1700 are not shown for illustrative clarity. Although controller 1706 is depicted as being a single element, some embodiments of controller 1706 are embodied by two or more sub-elements that need not be disposed at a common location. For example, some embodiments of controller 1706 are at least partially embodied by a distributed computing system. Although controller 1706 is depicted as being separate from stack 1702, controller 1706 could be at least partially integrated with stack 1702. In particular embodiments, controller 1706 is analogous to stack controller 210 of FIG. 2 and/or host controller 212 of FIG. 2. In some embodiments, controller 1706 is at least partially embodied by a respective node controller (not shown) of each BMS node 1708, where the node controllers of all BMS nodes 1708 collectively perform at least some of the functions of controller 1706.

Stack 1702 includes N BMS nodes 1708, where N is an integer greater than one. Each BMS node 1708 includes a positive output node 1710, a negative output node 1712, and a transfer node 1713. BMS nodes 1708 are electrically coupled in series in stack 1702 such that a positive output node 1710 of one BMS node 1708 is electrically coupled to a negative output node 1712 of an adjacent BMS node 1708. For example, positive output node 1710(1) of BMS node 1708(1) is electrically coupled to negative output node 1712(2) of adjacent BMS node 1708(2).

Each BMS node 1708 further includes a battery 1714, an isolation switch 1716, a bypass switch 1718, an upper transfer switch 1724, and a lower transfer switch 1726. Within each BMS node 1708, battery 1714 and isolation switch 1716 are electrically coupled in series between positive output node 1710 and negative output node 1712, and bypass switch 1718 is electrically coupled between positive output node 1710 and negative output node 1712. Additionally, within each BMS node 1708, upper transfer switch 1724 is electrically coupled between positive output node 1710 and transfer node 1713, and lower transfer switch 1726 is electrically coupled between transfer node 1713 and negative output node 1712. Each BMS node 1708 optionally further includes a discharge switch 1720 and a current source 1722 electrically coupled in parallel with battery 1714 of the node.

Energy storage system 1700 further includes N−1 transfer capacitors 1728, where a respective transfer capacitor 1728 is electrically coupled between transfer nodes 1713 of adjacent BMS nodes 1708. For example, transfer capacitor 1728(1) is electrically coupled between transfer node 1713(1) of BMS node 1708(1) and transfer node 1713(2) of adjacent BMS nodes 1708(2). Transfer capacitors 1728 are used, for example, to transfer charge between batteries 1714 of adjacent BMS nodes 1708, as discussed below.

Controller 1706 is configured to control each switch 1716, 1718, 1720, 1724, and 1726, such as to cause the switches to open or close, although connections between controller 1706 and the switches are not shown for illustrative clarity. Isolation switches 1716 and bypass switches 1718 are analogous to isolation switches 1616 and bypass switches 1618 of FIG. 16. Accordingly, controller 1706 is configured to control isolation switches 1716 and bypass switches 1718 to cause stack 1702 and/or BMS nodes 1708 to transition between operating modes, such as a normal charge/discharge mode, a floating mode, a bypass mode, and a safe mode, in the same manner discussed above with respect to energy storage system 1600. Additionally, discharge switches 1720 and current sources 1722 are analogous to discharge switches 1620 and current sources 1622 of FIG. 16. Accordingly, controller 1706 is configured to control discharge switches 1720 to safely discharge batteries 1714 in the same manner discussed above with respect to FIG. 16. Furthermore, some embodiments of energy storage system 1700, such as embodiments omitting discharge switches 1720 and current sources 1722, are configured to safely discharge a battery 1714 via electrical load 1704 in a manner similar to that discussed above with respect to FIGS. 13A-13C.

Moreover, controller 1706 is further configured to control upper and lower transfer switches 1724 and 1726 of BMS nodes 1708 to transfer charge between batteries 1714 of adjacent BMS nodes 1708 via transfer capacitors 1728. For example, FIGS. 18 and 19 collectively illustrate a two-step process where charge is transferred from battery 1714(2) to battery 1714(1) via transfer capacitor 1728(1). Dashed-lines delineating BMS nodes 1708(1) and 1708(2) are omitted in FIGS. 18 and 19 for illustrative clarity. Energy storage system 1700 operates in a normal charge/discharge mode during the charge transfer process of FIGS. 18 and 19. Consequently, isolation switches 1716 are closed, bypass switches 1718 are open, and discharge switches 1720 are open, in FIGS. 18 and 19.

Figure 18:
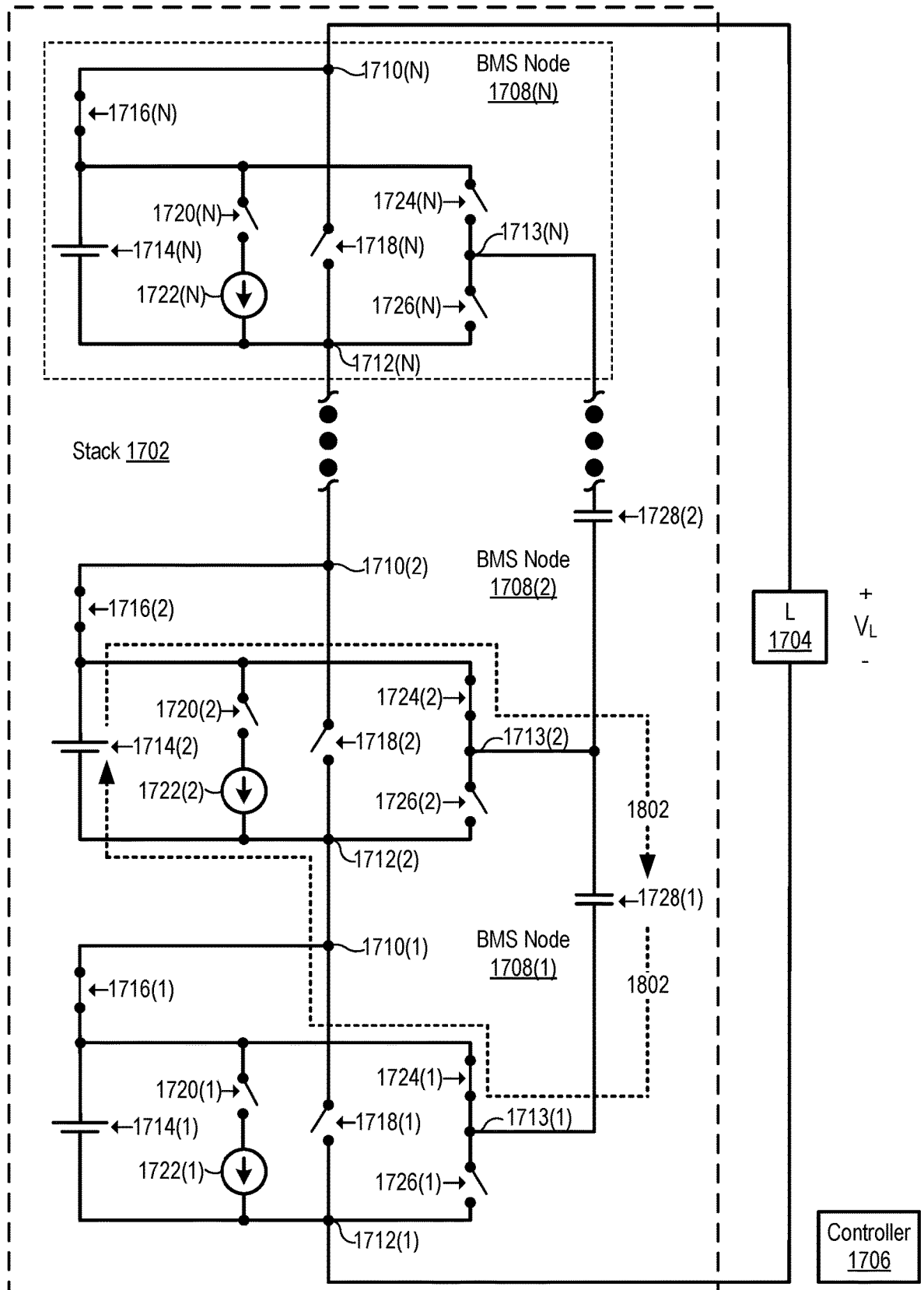
FIG. 18 illustrates a first step of a method for transferring charge between two batteries of the FIG. 17 energy storage system.
Figure 19:
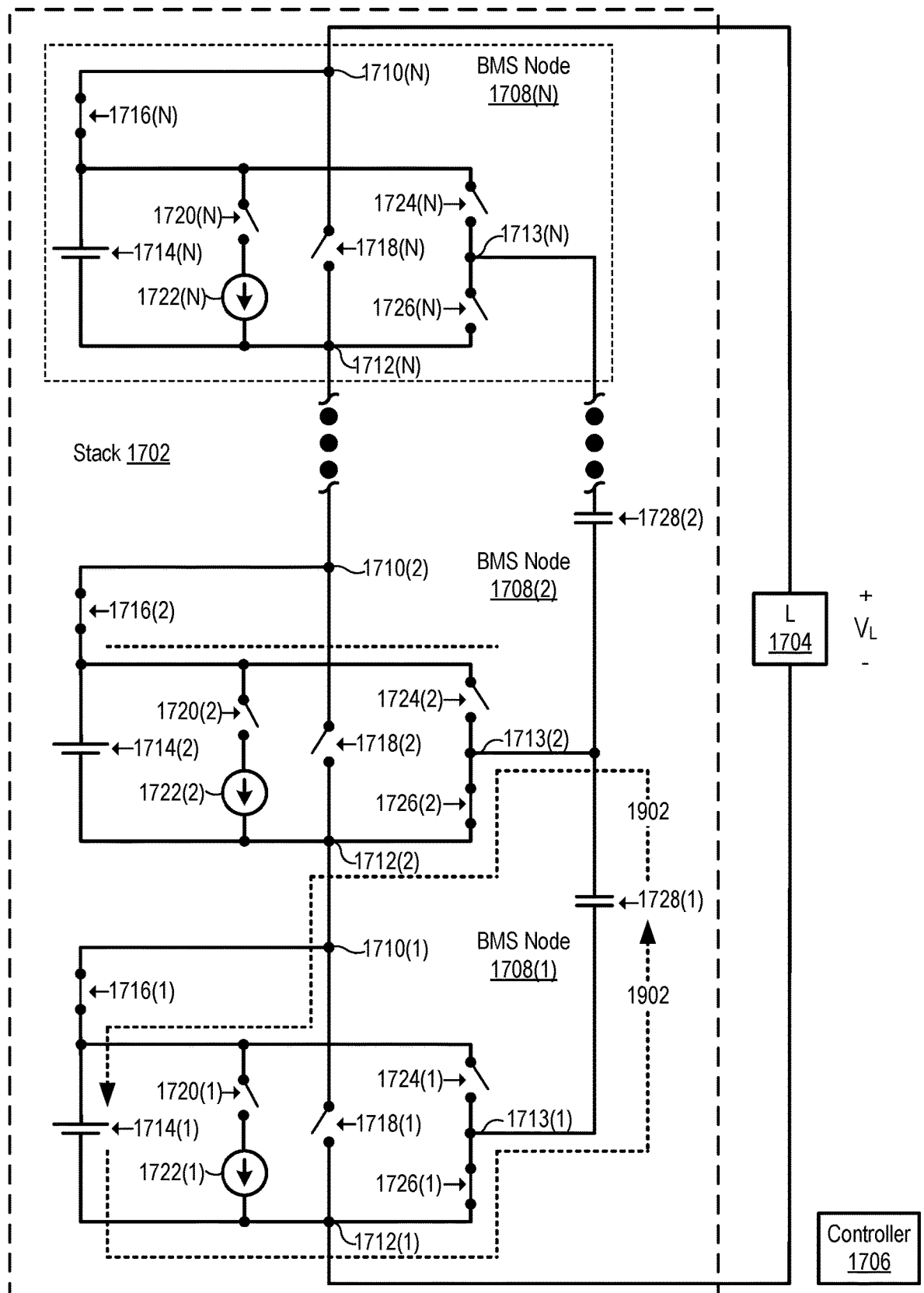
FIG. 19 illustrates a second step of the method for transferring charge between two batteries of the FIG. 17 energy storage system.

FIG. 18 illustrates energy storage system 1700 during the first step where upper transfer switches 1724(1) and 1724(2) are closed, and lower transfer switches 1726(1) and 1726(2) are open. Consequently, transfer capacitor 1728(1) is charged from battery 1714(2), as illustrated by dotted lines 1802 illustrating current flow between battery 1714(2) and transfer capacitor 1728(1). FIG. 19 illustrates energy storage system 1700 during the second step where upper transfer switches 1724(1) and 1724(2) are open, and lower transfer switches 1726(1) and 1726(2) are closed. Consequently, transfer capacitor 1728(1) is discharged to battery 1714(1), as illustrated by dotted lines 1902 illustrating current flow between transfer capacitor 1728(1) and battery 1714(1). Thus, the two steps illustrated in FIGS. 18 and 19 collectively transfer charge from battery 1714(2) to battery 1714(1) via transfer capacitor 1728(1). Similar steps could be performed to transfer charge between batteries 1714 of other adjacent BMS nodes 1708 of stack 1702.

Additionally, some embodiments of energy storage system 1700 are configured to safely discharge a battery 1714, such as in response to the battery being identified as unsafe, by transferring the battery 1714's charge to one or more other batteries 1714 of stack 1702. For example, assume that battery 1714(2) is identified as being unsafe. Certain embodiments of energy storage system 1700 are configured to safely discharge battery 1714(2) by transferring its charge to battery 1714(1), such as by using the procedure discussed above with respect to FIGS. 18 and 19.

Figure 20:
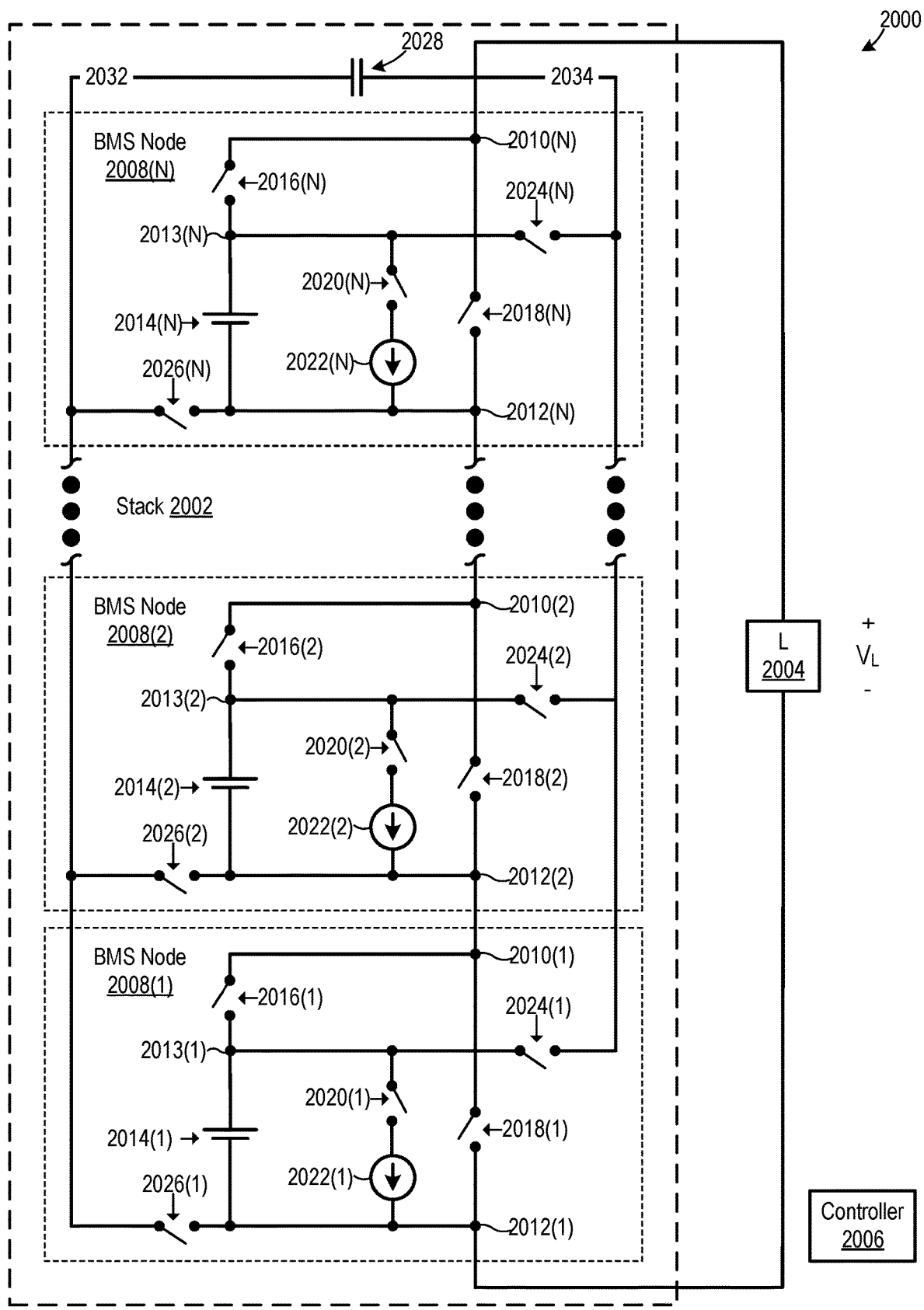
FIG. 20 is an illustrative block diagram of an example energy storage system that includes multiple BMS nodes capable of transferring charge between batteries of the BMS nodes via a stack-level capacitor.

Energy storage system 1700 is configured to transfer charge between batteries 1714 of adjacent BMS nodes 1708 via transfer capacitors 1728, as discussed above. Energy storage system 1700 could be modified to transfer charge between batteries via a stack-level transfer capacitor accessible to all BMS nodes of the stack via an energy transfer bus of the stack. For example, FIG. 20 is an illustrative block diagram of an example energy storage system 2000 including a stack 2002, an electrical load 2004, and a controller 2006. Energy storage system 2000 could include additional stacks 2002 without departing from the scope hereof, and each stack 2002 need not have the same configuration. Electrical load 2004 is electrically coupled to stack 2002, and electrical load 2004 is analogous to electrical load 204 of FIG. 2. Accordingly, electrical load 2004 can both receive power from energy storage system 2000 as well as provide power to energy storage system 2000 for charging batteries. Controller 2006 is configured to control energy storage system 2000, and connections between controller 2006 and other elements of energy storage system 2000 are not shown for illustrative clarity. Although controller 2006 is depicted as being a single element, some embodiments of controller 2006 are embodied by two or more sub-elements that need not be disposed at a common location. For example, some embodiments of controller 2006 are at least partially embodied by a distributed computing system. Although controller 2006 is depicted as being separate from stack 2002, controller 2006 could be at least partially integrated with stack 2002. In particular embodiments, controller 2006 is analogous to stack controller 210 of FIG. 2 and/or host controller 212 of FIG. 2. In some embodiments, controller 2006 is at least partially embodied by a respective node controller (not shown) of each BMS node 2008, where the node controllers of all BMS nodes 2008 collectively perform at least some of the functions of controller 2006.

Stack 2002 includes N BMS nodes 2008 and a transfer capacitor 2028, where N is an integer greater than one. Each BMS node 2008 includes a positive output node 2010, a negative output node 2012, and a battery node 2013. BMS nodes 2008 are electrically coupled in series in stack 2002 such that a positive output node 2010 of one BMS node 2008 is electrically coupled to a negative output node 2012 of an adjacent BMS node 2008. For example, positive output node 2010(1) of BMS node 2008(1) is electrically coupled to negative output node 2012(2) of adjacent BMS node 2008(2). Transfer capacitor 2028 is electrically coupled between a first transfer node 2032 and a second transfer node 2034, and transfer nodes 2032 and 2034 collectively form an energy transfer bus accessible to each BMS node 2008. Transfer capacitor 2028 is used to temporarily store charge while transferring charge between batteries 2014 of BMS nodes 2008, as discussed below.

Each BMS node 2008 further includes a battery 2014, an isolation switch 2016, a bypass switch 2018, an upper transfer switch 2024, and a lower transfer switch 2026. Within each BMS node 2008, battery 2014 and isolation switch 2016 are electrically coupled in series between positive output node 2010 and negative output node 2012 such that battery 2014 and isolation switch 2016 are joined at battery node 2013, and bypass switch 2018 is electrically coupled between positive output node 2010 and negative output node 2012. Additionally, within each BMS node 2008, upper transfer switch 2024 is electrically coupled between battery node 2013 and second transfer node 2034, and lower transfer switch 2026 is electrically coupled between negative output node 2012 and first transfer node 2032. Each BMS node 2008 optionally further includes a discharge switch 2020 and a current source 2022 electrically coupled in parallel with battery 2014 of the node.

Controller 2006 is configured to control each switch 2016, 2018, 2020, 2024, and 2026, such as to cause the switches to open or close, although connections between controller 2006 and the switches are not shown for illustrative clarity. Isolation switches 2016 and bypass switches 2018 are analogous to isolation switches 1616 and bypass switches 1618 of FIG. 16. Accordingly, controller 2006 is configured to control isolation switches 2016 and bypass switches 2018 to cause stack 2002 and/or BMS nodes 2008 to transition between operating modes, such as a normal charge/discharge mode, a floating mode, a bypass mode, and a safe mode, in the same manner discussed above with respect to energy storage system 1600. Additionally, isolation switches 2020 and current sources 2022 are analogous to isolation switches 1620 and current sources 1622 of FIG. 16. Accordingly, controller 2006 is configured to control isolation switches 2020 to safely discharge batteries 2014 in the same manner discussed above with respect to FIG. 16. Furthermore, some embodiments of energy storage system 2000, such as embodiments omitting discharge switches 2020 and current sources 2022, are configured to safely discharge a battery 2014 via electrical load 2004 in a manner similar to that discussed above with respect to FIGS. 13A-13C.

Moreover, controller 2006 is further configured to control upper and lower transfer switches 2024 and 2026 of BMS nodes 2008 to transfer charge between batteries 2014 of BMS nodes 2008 via transfer capacitor 2028. In contrast to energy storage system 1700 of FIG. 17, energy storage system 2000 is capable of transferring charge between batteries of any BMS nodes 2008, including BMS nodes 2008 that are non-adjacent, in two steps. For example, FIGS. 21 and 22 collectively illustrate a two-step process where charge is transferred from battery 2014(1) to battery 2014(N). Dashed-lines delineating BMS nodes 2008 are omitted in FIGS. 21 and 22 for illustrative clarity. Energy storage system 2000 operates in a normal charge/discharge mode during the charge transfer process of FIGS. 21 and 22. Consequently, isolation switches 2016 are closed, bypass switches 2018 are open, and discharge switches 2020 are open, in FIGS. 21 and 22.

Figure 21:
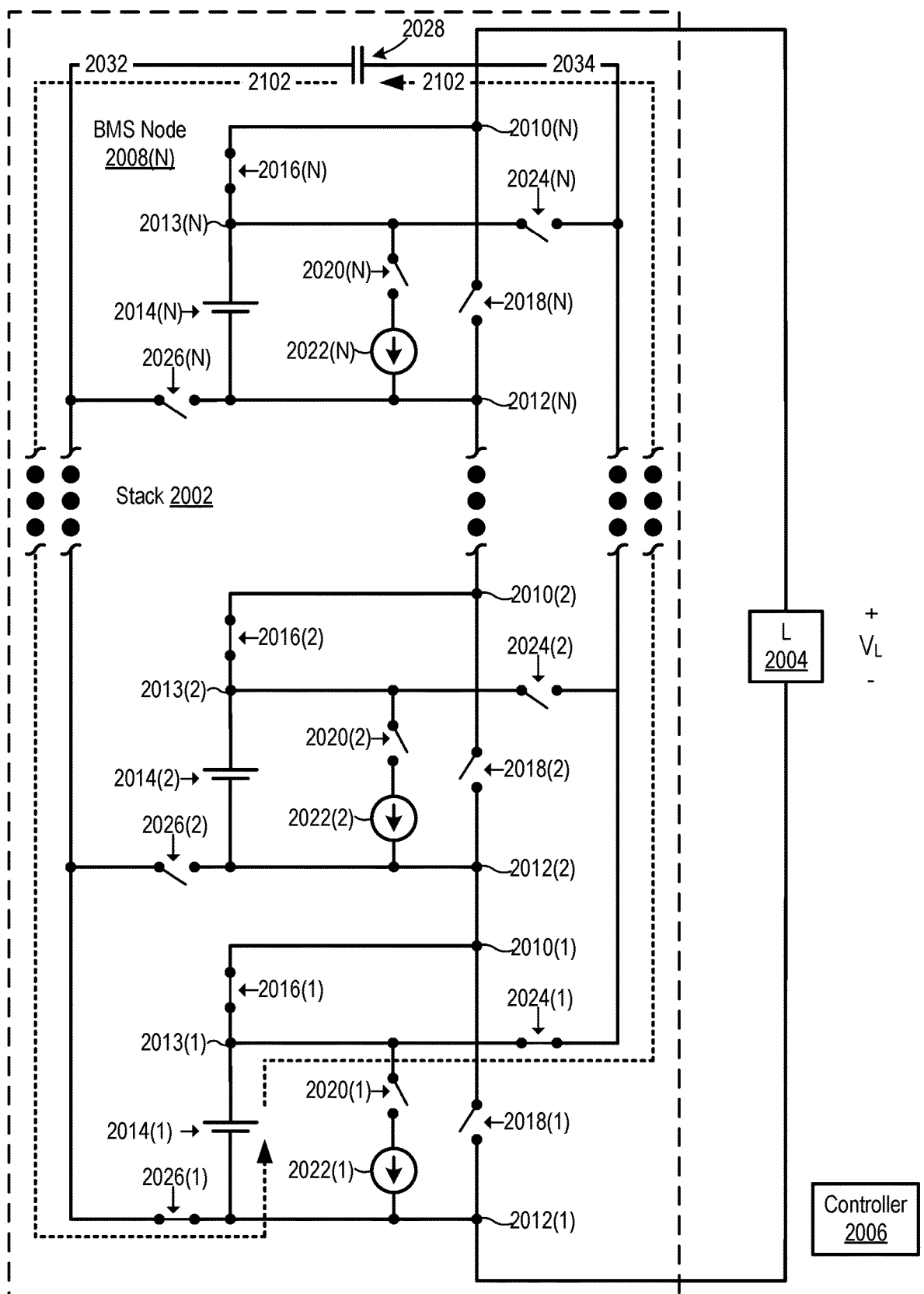
FIG. 21 illustrates a first step of a method for transferring charge between two batteries of the FIG. 20 energy storage system.
Figure 22:
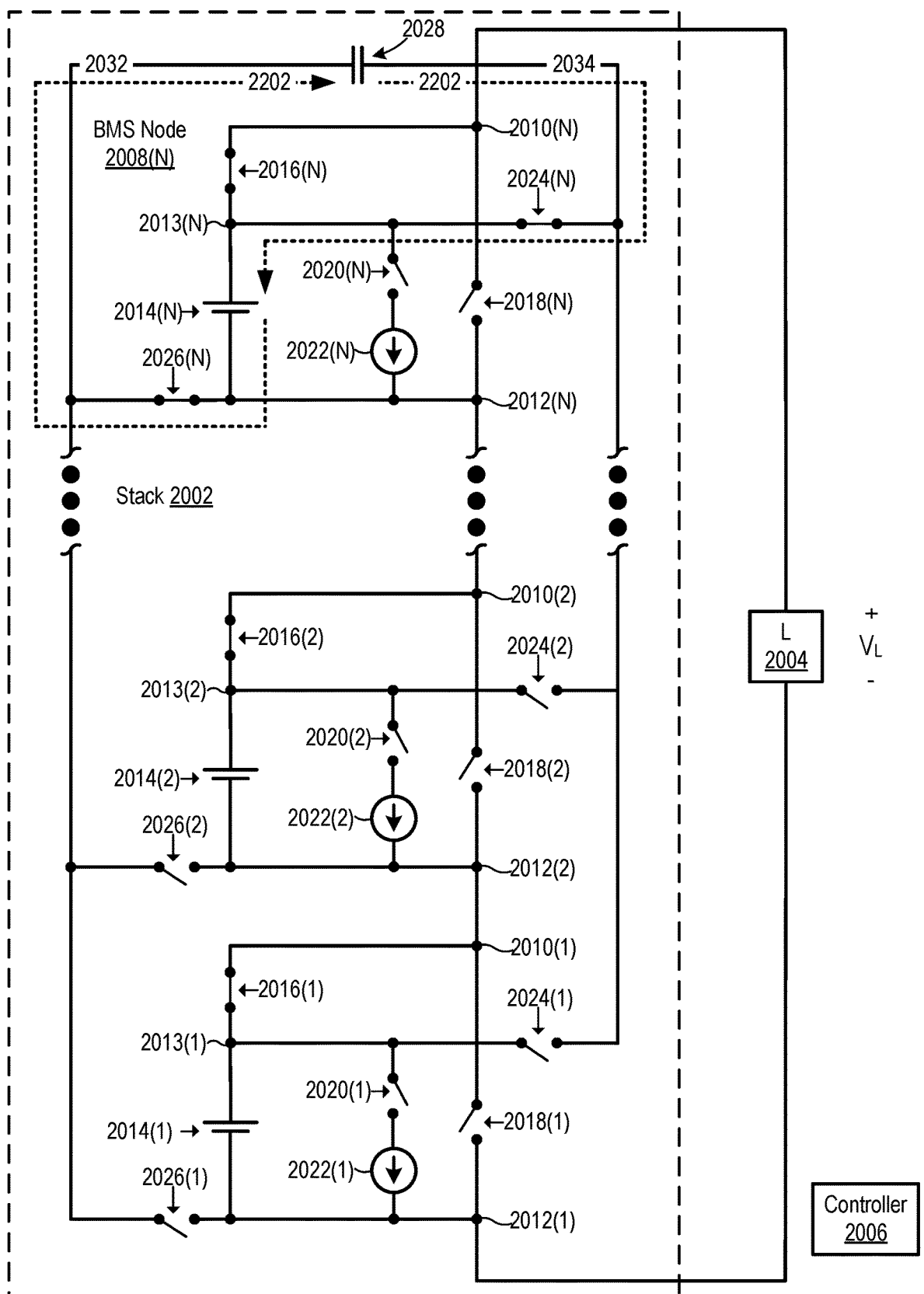
FIG. 22 illustrates a second step of the method for transferring charge between two batteries of the FIG. 20 energy storage system.

FIG. 21 illustrates energy storage system 2000 during the first step where transfer switches 2024(1) and 2026(1) are closed, and all other transfer switches 2024 and 2026 are open. Consequently, transfer capacitor 2028 is charged from battery 2014(1), as illustrated by dotted lines 2102 illustrating current flow between battery 2014(1) and transfer capacitor 2028. FIG. 22 illustrates energy storage system 2000 during the second step where transfer switches 2024(N) and 2026(N) are closed, and all other transfer switches 2024 and 2026 are open. Consequently, transfer capacitor 2028 is discharged to battery 2014(N), as illustrated by dotted lines 2202 illustrating current flow between transfer capacitor 2028 and battery 2014(N). Thus, the two steps illustrated in FIGS. 21 and 22 collectively transfer charge from battery 2014(1) to battery 2014(N) via transfer capacitor 2028. Similar steps could be performed to transfer charge between batteries 2014 of other BMS nodes 2008 of stack 2002.

Additionally, some embodiments of energy storage system 2000 are configured to safely discharge a battery 2014, such as in response to the battery being identified as unsafe, by transferring the battery 2014's charge to one or more other batteries 2014 of stack 2002. For example, assume that battery 2014(1) is identified as being unsafe. Certain embodiments of energy storage system 2000 are configured to safely discharge battery 2014(1) by transferring its charge to battery 2014(N), and/or to one or more other batteries 2014, such as by using the procedure discussed above with respect to FIGS. 21 and 22 or a similar procedure.

Figure 23:
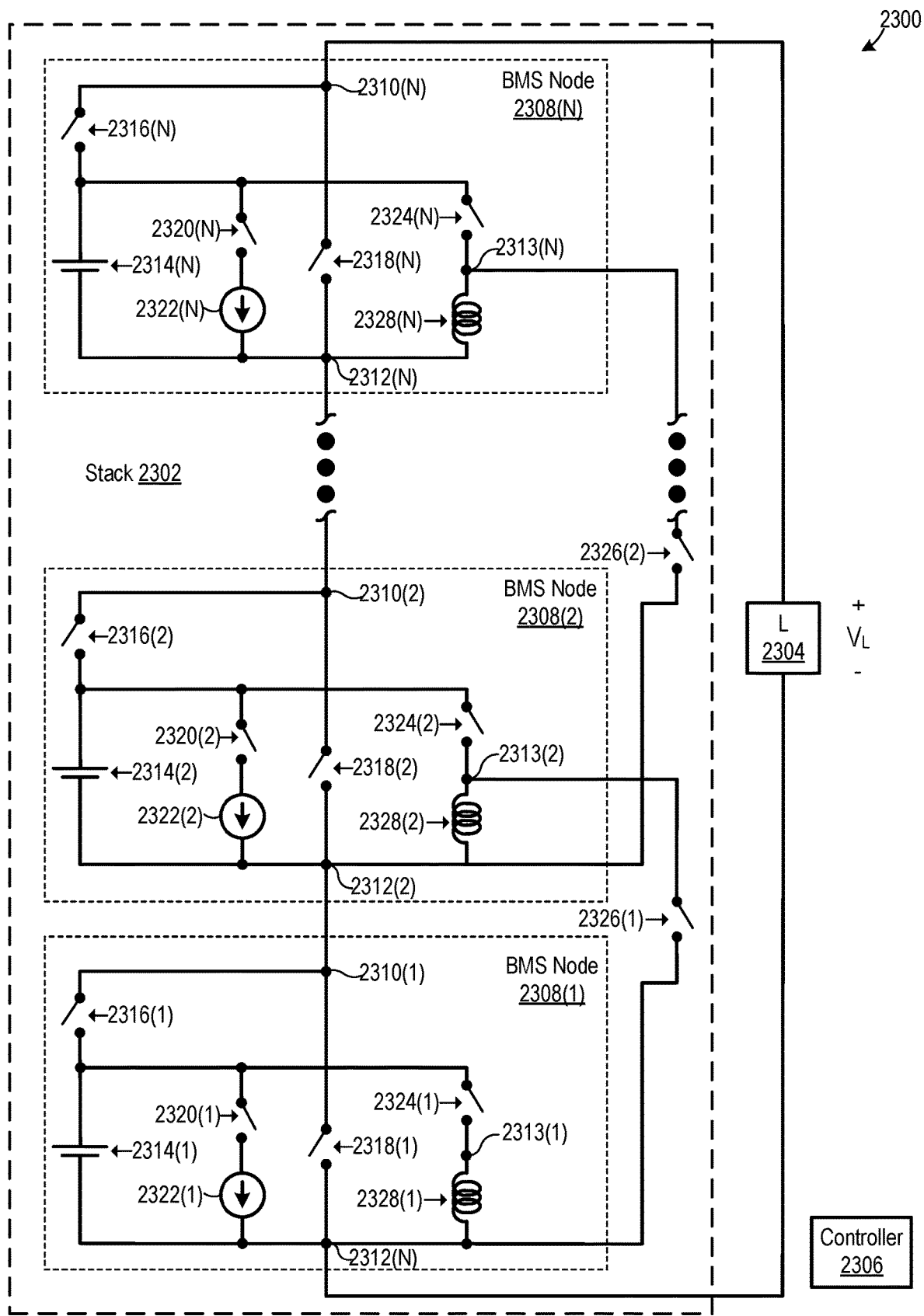
FIG. 23 is an illustrative block diagram of an example energy storage system that includes multiple BMS nodes capable of transferring charge between batteries of adjacent BMS nodes via inductors.

Charge can be transferred between BMS node batteries using energy storage devices other than, or in addition to, capacitors. For example, FIG. 23 is an illustrative block diagram of an example energy storage system 2300 including a stack 2302, an electrical load 2304, and a controller 2306. Energy storage system 2300 could include additional stacks 2302 without departing from the scope hereof, and each stack 2302 need not have the same configuration. Electrical load 2304 is electrically coupled to stack 2302, and electrical load 2304 is analogous to electrical load 204 of FIG. 2. Accordingly, electrical load 2304 can both receive power from energy storage system 2300 as well as provide power to energy storage system 2300 for charging batteries. Controller 2306 is configured to control energy storage system 2300, and connections between controller 2306 and other elements of energy storage system 2300 are not shown for illustrative clarity. Although controller 2306 is depicted as being a single element, some embodiments of controller 2306 are embodied by two or more sub-elements that need not be disposed at a common location. For example, some embodiments of controller 2306 are at least partially embodied by a distributed computing system. Although controller 2306 is depicted as being separate from stack 2302, controller 2306 could be at least partially integrated with stack 2302. In particular embodiments, controller 2306 is analogous to stack controller 210 of FIG. 2 and/or host controller 212 of FIG. 2. In some embodiments, controller 2306 is at least partially embodied by a respective node controller (not shown) of each BMS node 2308, where the node controllers of all BMS nodes 2308 collectively perform at least some of the functions of controller 2306.

Stack 2302 includes N BMS nodes 2308, where N is an integer greater than one. Each BMS node 2308 includes a positive output node 2310, a negative output node 2312, and a transfer node 2313. BMS nodes 2308 are electrically coupled in series in stack 2302 such that a positive output node 2310 of one BMS node 2308 is electrically coupled to a negative output node 2312 of an adjacent BMS node 2308. For example, positive output node 2310(1) of BMS node 2308(1) is electrically coupled to negative output node 2312(2) of adjacent BMS node 2308(2).

Each BMS node 2308 further includes a battery 2314, an isolation switch 2316, a bypass switch 2318, a first transfer switch 2324, and an inductor 2328. Although inductors 2328 are illustrated as being discrete elements, inductors 2328 may be partially or fully embodied of parasitic inductance of a circuit including the inductors. Within each BMS node 2308, battery 2314 and isolation switch 2316 are electrically coupled in series between positive output node 2310 and negative output node 2312, and bypass switch 2318 is electrically coupled between positive output node 2310 and negative output node 2312. Additionally, within each BMS node 2308, first transfer switch 2324 is electrically coupled between positive output node 2310 and transfer node 2313, and inductor 2328 is electrically coupled between transfer node 2313 and negative output node 2312. Each BMS node 2308 optionally further includes a discharge switch 2320 and a current source 2322 electrically coupled in parallel with battery 2314 of the node.

Energy storage system 2300 further includes N−1 second transfer switches 2326, where a respective second transfer switch 2326 is electrically coupled between a transfer node 2313 of one BMS node 2308 and a negative output node 2312 of an adjacent BMS node 2308. For example, second transfer switch 2326(1) is electrically coupled between transfer node 2313(2) of BMS node 2308(2) and negative output node 2312(1) of adjacent BMS node 2308(1). Second transfer switches 2326 are used, for example, to transfer charge between batteries 2314 of adjacent BMS nodes 2308, as discussed below. Although second transfer switches 2326 are depicted as being external to BMS nodes 2308, second transfer switches 2326 could alternately be within BMS nodes 2308. For example, in an alternate embodiment (not shown), each BMS node 2308, except for BMS node 2308 (N), includes a respective second transfer switch 2326 electrically coupled between negative output node 2312 of the BMS node 2308 and transfer node 2313 of an adjacent BMS node 2308. As another example, in another alternate embodiment (not shown), each BMS node 2308, except for BMS node 2308(1), includes a respective second transfer switch 2326 electrically coupled between transfer node 2313 of the BMS node and negative output node 2312 of an adjacent BMS node 2308.

Controller 2306 is configured to control each switch 2316, 2318, 2320, 2324, and 2326, such as to cause the switches to open or close, although connections between controller 2306 and the switches are not shown for illustrative clarity. Isolation switches 2316 and bypass switches 2318 are analogous to isolation switches 1616 and bypass switches 1618 of FIG. 16. Accordingly, controller 2306 is configured to control isolation switches 2316 and bypass switches 2318 to cause stack 2302 and/or BMS nodes 2308 to transition between operating modes, such as a normal charge/discharge mode, a bypass mode, and a safe mode, in the same manner discussed above with respect to energy storage system 1600. Additionally, discharge switches 2320 and current sources 2322 are analogous to discharge switches 1620 and current sources 1622 of FIG. 16. Accordingly, controller 2306 is configured to control discharge switches 2320 to safely discharge batteries 2314 in the same manner discussed above with respect to FIG. 16. Furthermore, some embodiments of energy storage system 2300, such as embodiments omitting discharge switches 2320 and current sources 2322, are configured to safely discharge a battery 2314 via electrical load 2304 in a manner similar to that discussed above with respect to FIGS. 13A-13C.

Moreover, controller 2306 is further configured to control first and second transfer switches 2324 and 2326 to transfer charge between batteries 2314 of adjacent BMS nodes 2308 via inductors 2328. For example, FIGS. 24 and 25 collectively illustrate a two-step process where charge is transferred from battery 2314(2) to battery 2314(1) via inductor 2328(2). Dashed-lines delineating BMS nodes 2308(1) and 2308(2), as well as several reference numbers, are omitted in FIGS. 24 and 25 for illustrative clarity. Energy storage system 2300 operates in a normal charge/discharge mode during the charge transfer process of FIGS. 24 and 25.

Figure 24:
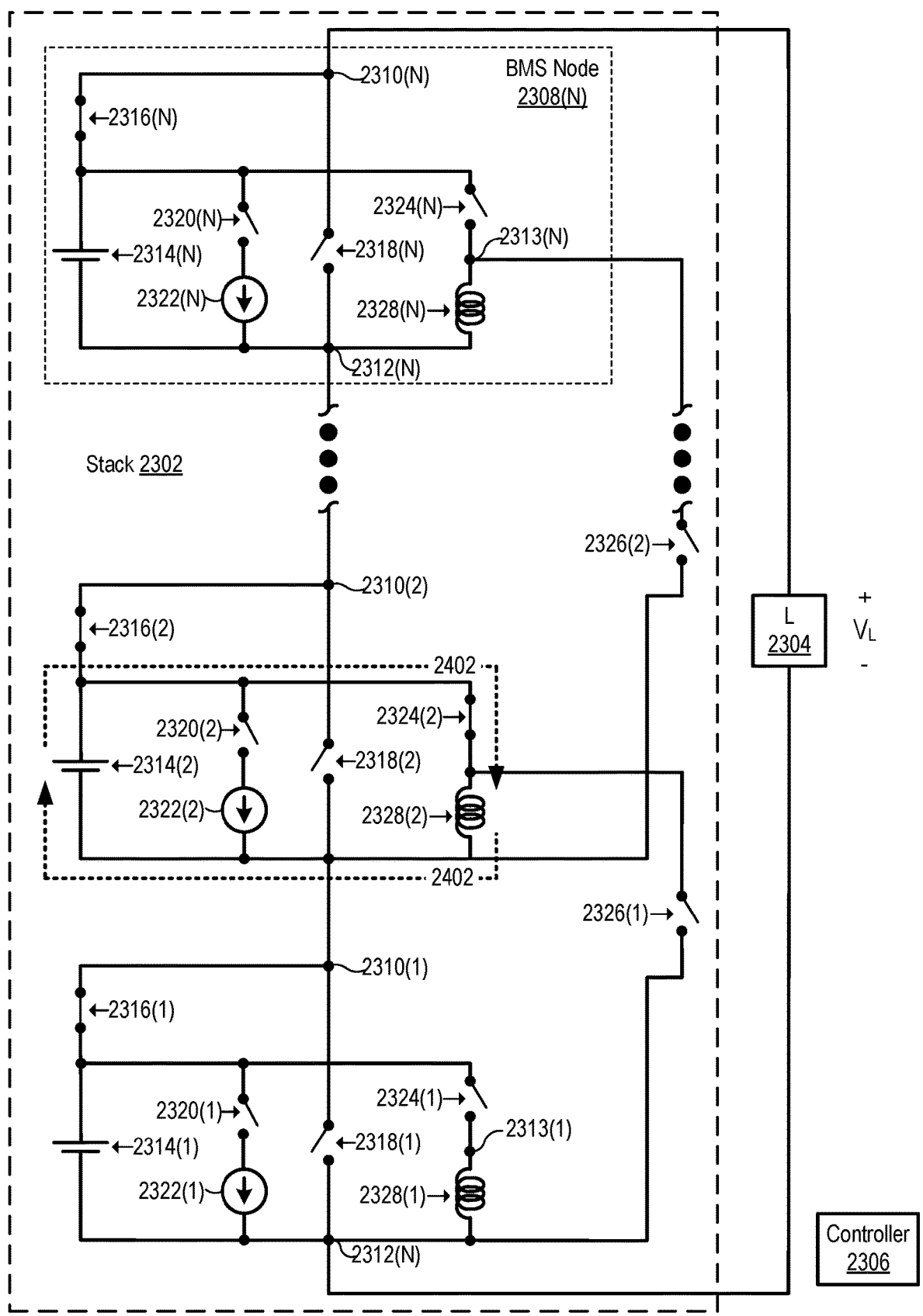
FIG. 24 illustrates a first step of a method for transferring charge between two batteries of the FIG. 23 energy storage system.
Figure 25:
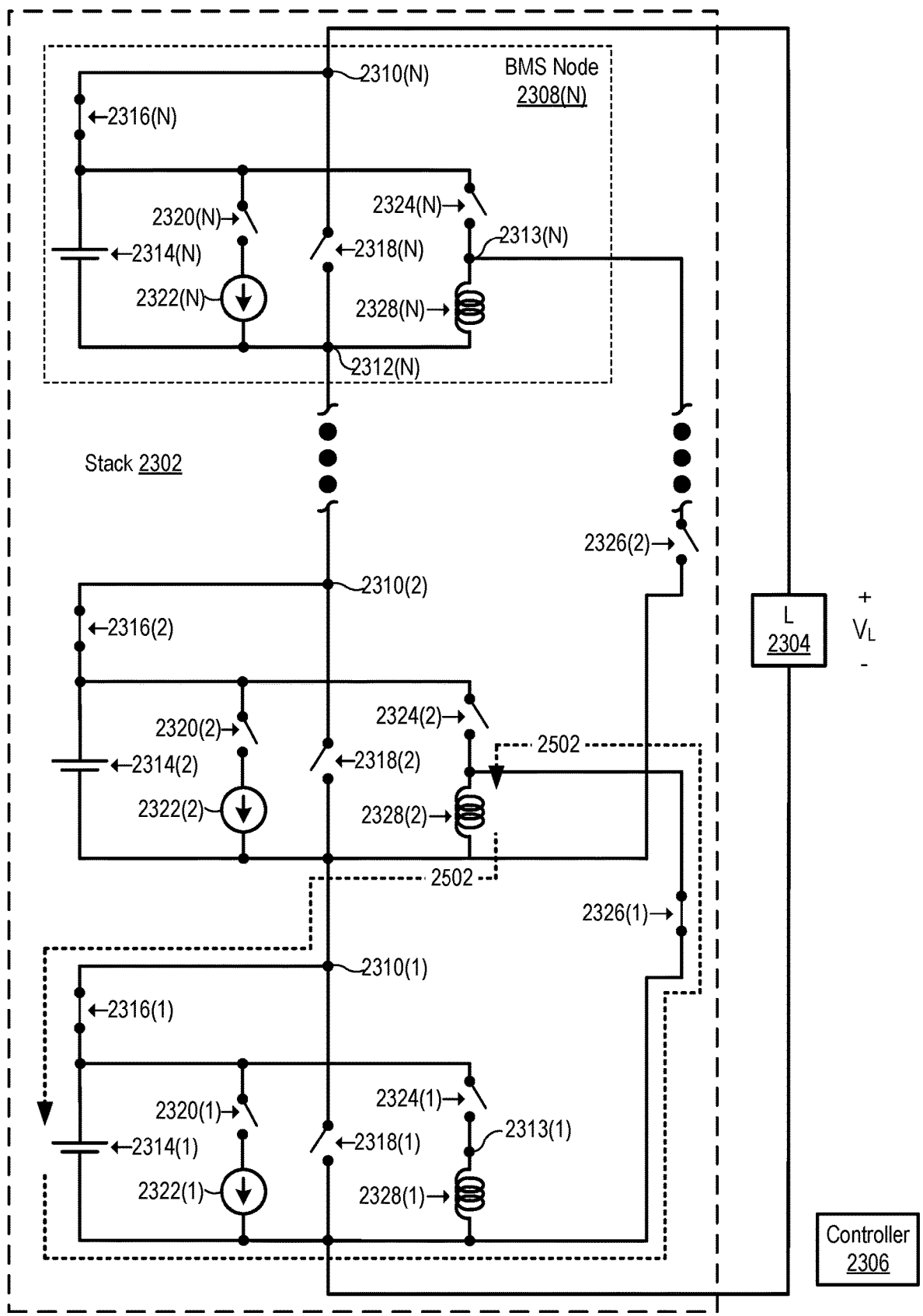
FIG. 25 illustrates a second step of the method for transferring charge between two batteries of the FIG. 23 energy storage system.

Consequently, isolation switches 2316 are closed, bypass switches 2318 are open, and discharge switches 2320 are open, in FIGS. 24 and 25.

FIG. 24 illustrates energy storage system 2300 during the first step where first transfer switch 2324(2) is closed and all other transfer switches are open. Consequently, inductor 2328(2) is charged from battery 2314(2), as illustrated by dotted lines 2402 illustrating current flow between battery 2314(2) and inductor 2328(2). FIG. 25 illustrates energy storage system 2300 during the second step where external second switch 2326(1) is closed, and all other transfer switches are open. Consequently, inductor 2328(2) is discharged to battery 2314(1), as illustrated by dotted lines 2502 illustrating current flow between inductor 2328(2) and battery 2314(1). Thus, the two steps illustrated in FIGS. 24 and 25 collectively transfer charge from battery 2314(2) to battery 2314(1) via inductor 2328(2). Similar steps could be performed to transfer charge between batteries 2314 of other adjacent BMS nodes 2308 of stack 2302.

Additionally, some embodiments of energy storage system 2300 are configured to safely discharge a battery 2314, such as in response to the battery being identified as unsafe, by transferring the battery 2314's charge to one or more other batteries 2314 of stack 2302. For example, assume that battery 2314(2) is identified as being unsafe. Certain embodiments of energy storage system 2300 are configured to safely discharge battery 2314(2) by transferring its charge to battery 2314(1), such as by using the procedure discussed above with respect to FIGS. 24 and 25.

Figure 26:
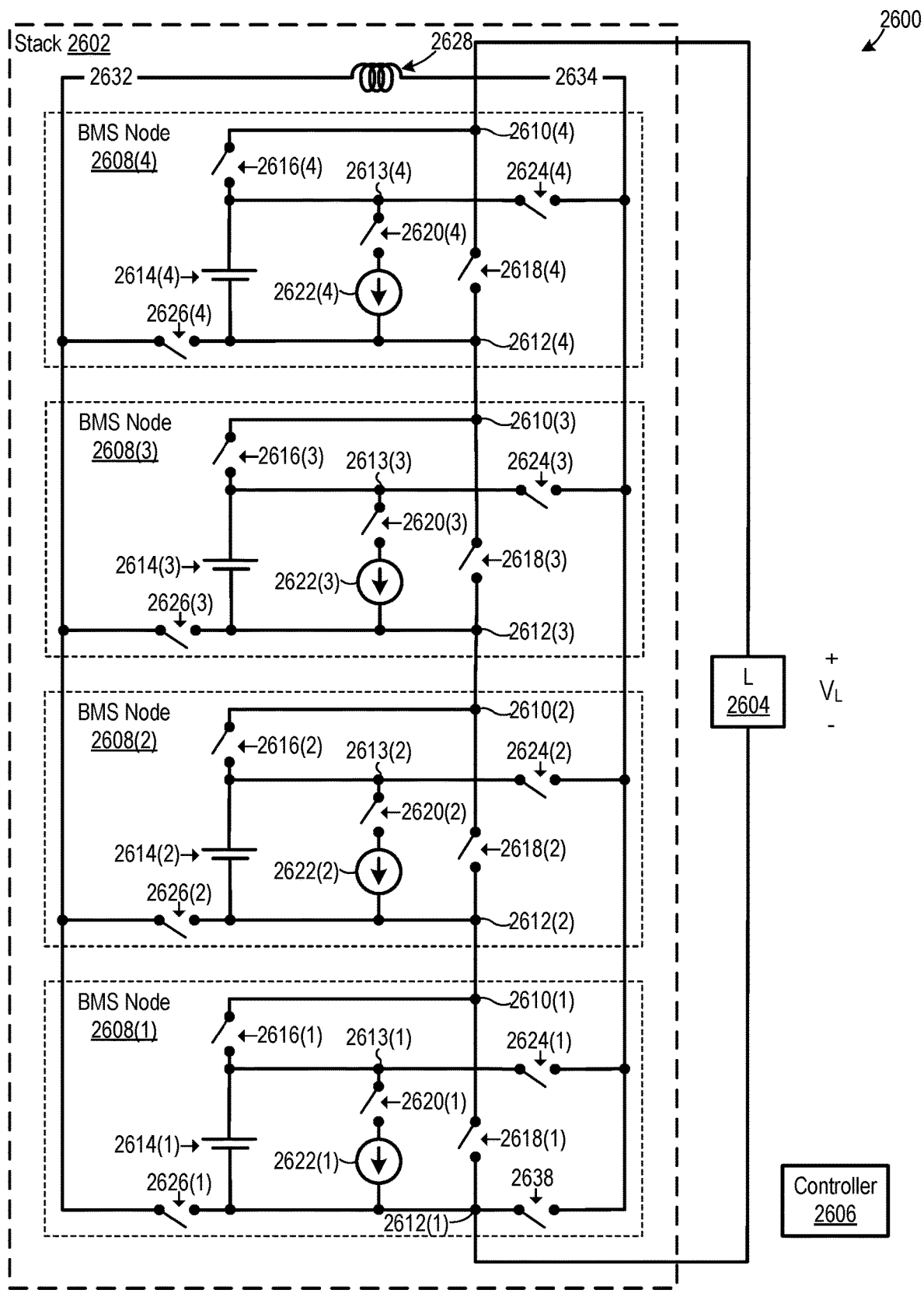
FIG. 26 is an illustrative block diagram of an example energy storage system that includes multiple BMS nodes capable of transferring charge between batteries of the BMS nodes via a stack-level inductor.

As another example of an energy storage system configured to transfer charge using an inductor, FIG. 26 is an illustrative block diagram of an example energy storage system 2600 including a stack 2602, an electrical load 2604, and a controller 2606. Energy storage system 2600 could include additional stacks 2602 without departing from the scope hereof, and each stack 2602 need not have the same configuration. Electrical load 2604 is electrically coupled to stack 2602, and electrical load 2604 is analogous to electrical load 204 of FIG. 2. Accordingly, electrical load 2604 can both receive power from energy storage system 2600 as well as provide power to energy storage system 2600 for charging batteries. Controller 2606 is configured to control energy storage system 2600, and connections between controller 2606 and other elements of energy storage system 2600 are not shown for illustrative clarity. Although controller 2606 is depicted as being a single element, some embodiments of controller 2606 are embodied by two or more sub-elements that need not be disposed at a common location. For example, some embodiments of controller 2606 are at least partially embodied by a distributed computing system. Although controller 2606 is depicted as being separate from stack 2602, controller 2606 could be at least partially integrated with stack 2602. In particular embodiments, controller 2606 is analogous to stack controller 210 of FIG. 2 and/or host controller 212 of FIG. 2. In some embodiments, controller 2606 is at least partially embodied by a respective node controller (not shown) of each BMS node 2608, where the node controllers of all BMS nodes 2608 collectively perform at least some of the functions of controller 2606.

Stack 2602 includes a plurality of BMS nodes 2608 and a transfer inductor 2628. Although stack 2602 is illustrated as including four BMS nodes 2608, stack 2602 can include any number of BMS nodes as long as stack 2602 includes at least two BMS nodes 2608. Each BMS node 2608 includes a positive output node 2610, a negative output node 2612, and a battery node 2613. BMS nodes 2608 are electrically coupled in series in stack 2602 such that a positive output node 2610 of one BMS node 2608 is electrically coupled to a negative output node 2612 of an adjacent BMS node 2608. For example, positive output node 2610(1) of BMS node 2608(1) is electrically coupled to negative output node 2612(2) of adjacent BMS node 2608(2). Transfer inductor 2628 is electrically coupled between a first transfer node 2632 and a second transfer node 2634, and transfer nodes 2632 and 2634 collectively form an energy transfer bus accessible to each BMS node 2608. Transfer inductor 2628 is used to temporarily store energy while transferring charge between batteries 2614 of BMS nodes 2608, as discussed below.

Each BMS node 2608 further includes a battery 2614, an isolation switch 2616, a bypass switch 2618, an upper transfer switch 2624, and a lower transfer switch 2626. Within each BMS node 2608, battery 2614 and isolation switch 2616 are electrically coupled in series between positive output node 2610 and negative output node 2612 such that battery 2614 and isolation switch 2616 are joined at battery node 2613, and bypass switch 2618 is electrically coupled between positive output node 2610 and negative output node 2612. Additionally, within each BMS node 2608, upper transfer switch 2624 is electrically coupled between battery node 2613 and second transfer node 2634, and lower transfer switch 2626 is electrically coupled between negative output node 2612 and first transfer node 2632. Each BMS node 2608 optionally further includes a discharge switch 2620 and a current source 2622 electrically coupled in parallel with battery 2614 of the node. The first BMS node 2608 in stack 2602, i.e., BMS node 2608(1) in the FIG. 26 example, further includes an additional transfer switch 2638 electrically coupled between negative output node 2612(1) and second transfer node 2634.

Controller 2606 is configured to control each switch 2616, 2618, 2620, 2624, 2626, and 2638 such as to cause the switches to open or close, although connections between controller 2606 are the switches are not shown for illustrative clarity. Isolation switches 2616 and bypass switches 2618 are analogous to isolation switches 1616 and bypass switches 1618 of FIG. 16. Accordingly, controller 2606 is configured to control isolation switches 2616 and bypass switches 2618 to cause stack 2602 and/or BMS nodes 2608 to transition between operating modes, such as a normal charge/discharge mode, a bypass mode, and a safe mode, in the same manner discussed above with respect to energy storage system 1600. Additionally, discharge switches 2620 and current sources 2622 are analogous to discharge switches 1620 and current sources 1622 of FIG. 16. Accordingly, controller 2606 is configured to control discharge switches 2620 to safely discharge batteries 2614 in the same manner discussed above with respect to FIG. 16. Furthermore, some embodiments of energy storage system 2600, such as embodiments omitting discharge switches 2620 and current sources 2622, are configured to safely discharge a battery 2614 via electrical load 2604 in a manner similar to that discussed above with respect to FIGS. 13A-13C.

Moreover, controller 2606 is further configured to control transfer switches 2624, 2626, and 2638 of BMS nodes 2608 to transfer charge between batteries 2614 of BMS nodes 2608 via transfer inductor 2628. In contrast to energy storage system 2300 of FIG. 23, energy storage system 2600 is capable of transferring charge between batteries of any BMS nodes 2608, including BMS nodes 2608 that are non-adjacent, in two steps. For example, FIGS. 27 and 28 collectively illustrate a two-step process where charge is transferred from battery 2614(4) to battery 2614(1). Dashed-lines delineating BMS nodes 2608, as well as some reference numbers, are omitted in FIGS. 27 and 28 for illustrative clarity. Energy storage system 2600 operates in a normal charge/discharge mode during the charge transfer process of FIGS. 27 and 28. Consequently, isolation switches 2616 are closed, bypass switches 2618 are open, and discharge switches 2620 are open, in FIGS. 27 and 28.

Figure 27:
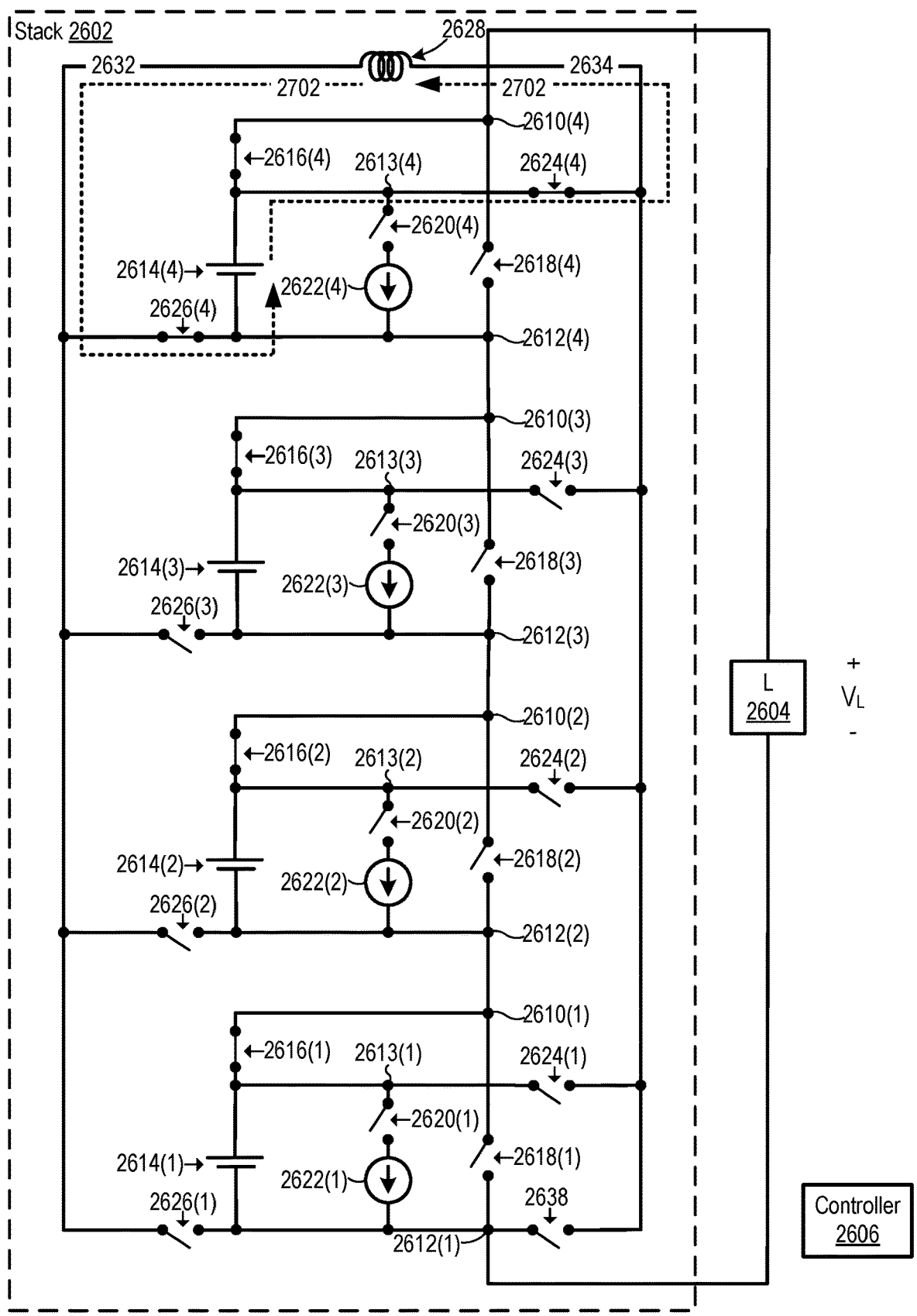
FIG. 27 illustrates a first step of a method for transferring charge between two batteries of the FIG. 26 energy storage system.
Figure 28:
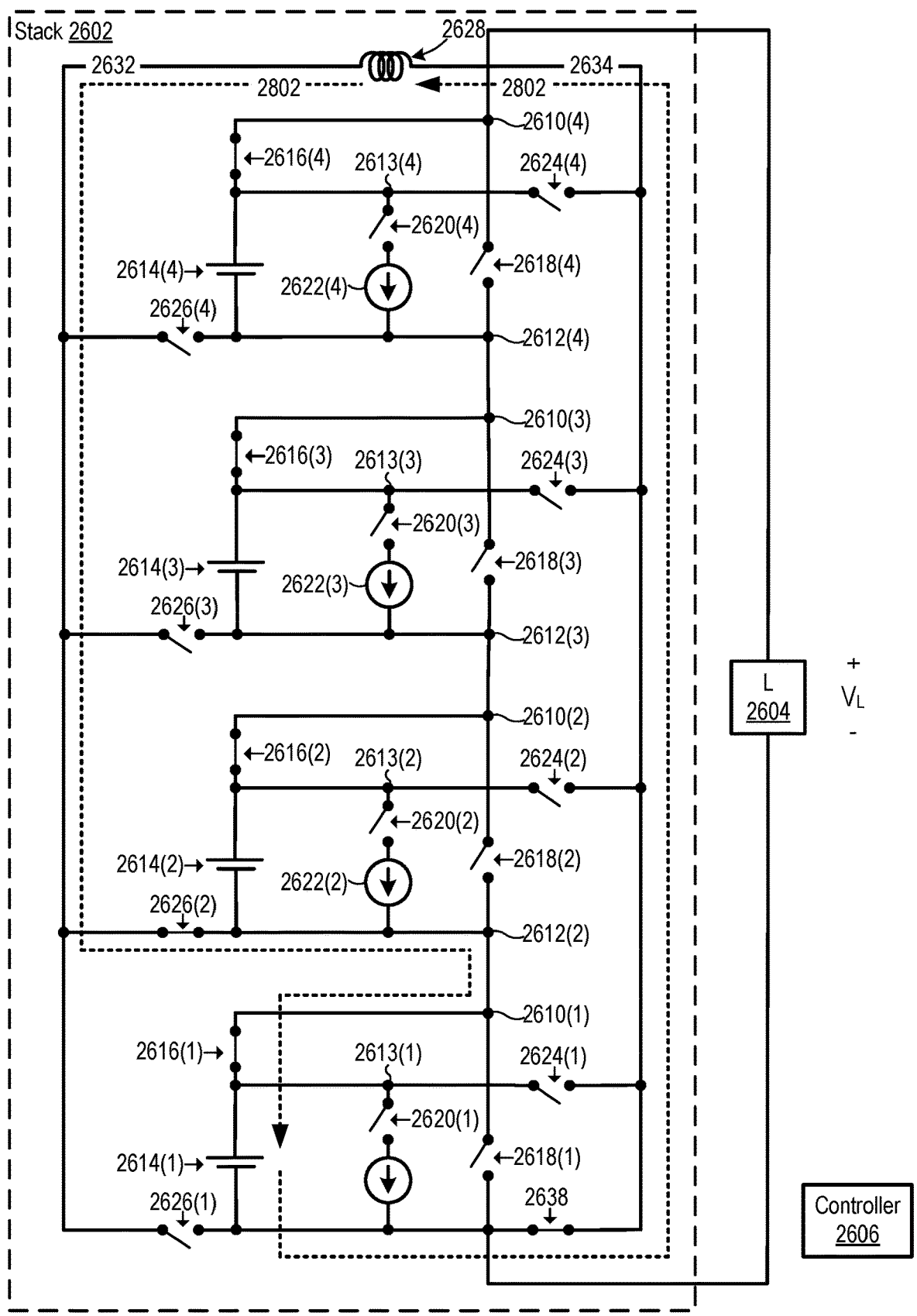
FIG. 28 illustrates a second step of the method for transferring charge between two batteries of the FIG. 26 energy storage system.

FIG. 27 illustrates energy storage system 2600 during the first step where transfer switches 2624(4) and 2626(4) are closed and all other transfer switches are open. Consequently, transfer inductor 2628 is charged from battery 2614(4), as illustrated by dotted lines 2702 illustrating current flow between battery 2614(4) and transfer inductor 2628. FIG. 28 illustrates energy storage system 2600 during the second step where transfer switches 2626(2) and 2638 are closed, and all other transfer switches are open. Consequently, transfer inductor 2628 is discharged to battery 2614(1), as illustrated by dotted lines 2802 illustrating current flow between transfer inductor 2628 and battery 2614(1). Thus, the two steps illustrated in FIGS. 27 and 28 collectively transfer charge from battery 2614(4) to battery 2614(1) via transfer inductor 2628. Similar steps could be performed to transfer charge between batteries 2614 of other BMS nodes 2608 of stack 2602.

Additionally, some embodiments of energy storage system 2600 are configured to safely discharge a battery 2614, such as in response to the battery being identified as unsafe, by transferring the battery 2614's charge to one or more other batteries 2614 of stack 2602. For example, assume that battery 2614(4) is identified as being unsafe. Certain embodiments of energy storage system 2600 are configured to safely discharge battery 2614(4) by transferring its charge to battery 2614(1), and/or to one or more other batteries 2614, such as by using the procedure discussed above with respect to FIGS. 27 and 28 or a similar procedure.

Figure 29:
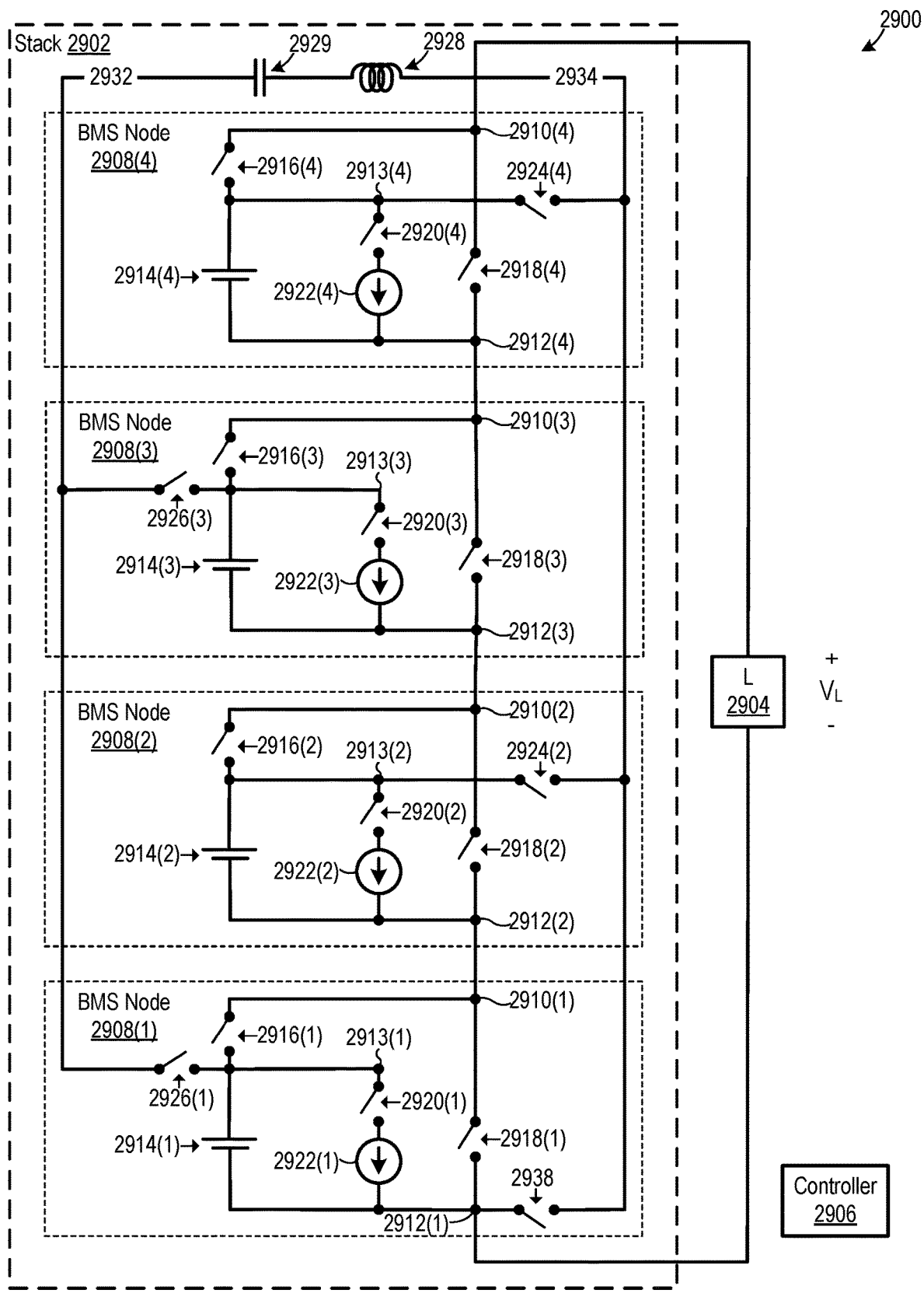
FIG. 29 is an illustrative block diagram of an example energy storage system that includes multiple BMS nodes capable of transferring charge between batteries of the BMS nodes via a stack-level resonant circuit including an inductor and a capacitor.

FIG. 29 is an illustrative block diagram of an example energy storage system 2900 including a stack 2902, an electrical load 2904, and a controller 2906. Energy storage system 2900 could include additional stacks 2902 without departing from the scope hereof, and each stack 2902 need not have the same configuration. Electrical load 2904 is electrically coupled to stack 2902, and electrical load 2904 is analogous to electrical load 204 of FIG. 2. Accordingly, electrical load 2904 can both receive power from energy storage system 2900 as well as provide power to energy storage system 2900 for charging batteries. Controller 2906 is configured to control energy storage system 2900, and connections between controller 2906 and other elements of energy storage system 2900 are not shown for illustrative clarity. Although controller 2906 is depicted as being a single element, some embodiments of controller 2906 are embodied by two or more sub-elements that need not be disposed at a common location. For example, some embodiments of controller 2906 are at least partially embodied by a distributed computing system. Although controller 2906 is depicted as being separate from stack 2902, controller 2906 could be at least partially integrated with stack 2902. In particular embodiments, controller 2906 is analogous to stack controller 210 of FIG. 2 and/or host controller 212 of FIG. 2. In some embodiments, controller 2906 is at least partially embodied by a respective node controller (not shown) of each BMS node 2908, where the node controllers of all BMS nodes 2908 collectively perform at least some of the functions of controller 2906.

Stack 2902 includes a plurality of BMS nodes 2908, a transfer inductor 2928, and a transfer capacitor 2929. Although stack 2902 is illustrated as including four BMS nodes 2908, stack 2902 can include any number of BMS nodes as long as stack 2902 includes at least two BMS nodes 2908. Each BMS node 2908 includes a positive output node 2910, a negative output node 2912, and a battery node 2913. BMS nodes 2908 are electrically coupled in series in stack 2902 such that a positive output node 2910 of one BMS node 2908 is electrically coupled to a negative output node 2912 of an adjacent BMS node 2908. For example, positive output node 2910(1) of BMS node 2908(1) is electrically coupled to negative output node 2912(2) of adjacent BMS node 2908(2). Transfer inductor 2928 and transfer capacitor 2929 are electrically coupled in series between a first transfer node 2932 and a second transfer node 2934, and transfer nodes 2932 and 2934 collectively form an energy transfer bus accessible to each BMS node 2908. Transfer inductor 2928 and transfer capacitor 2929 are used to temporarily store energy while transferring charge between batteries 2914 of BMS nodes 2908, as discussed below.

Each BMS node 2908 includes a battery 2914, an isolation switch 2916, and a bypass switch 2918. Even number BMS nodes 2908 additionally include an upper transfer switch 2924, and odd number BMS nodes 2908 additionally include a lower transfer switch 2926. Within each BMS node 2908, battery 2914 and isolation switch 2916 are electrically coupled in series between positive output node 2910 and negative output node 2912 such that battery 2914 and isolation switch 2916 are joined at battery node 2913, and bypass switch 2918 is electrically coupled between positive output node 2910 and negative output node 2912. Additionally, within each even number BMS node 2908, upper transfer switch 2924 is electrically coupled between battery node 2913 and second transfer node 2934, and within each odd number BMS node 2908, lower transfer switch 2926 is electrically coupled between battery node 2913 and first transfer node 2932. Each BMS node 2908 optionally further includes a discharge switch 2920 and a current source 2922 electrically coupled in parallel with battery 2914 of the node. The first BMS node 2908 in stack 2902, i.e., BMS node 2908(1) in the FIG. 29 example, further includes an additional transfer switch 2938 electrically coupled between negative output node 2912(1) and second transfer node 2934.

Controller 2906 is configured to control each switch 2916, 2918, 2920, 2924, 2926, and 2938 such as to cause the switches to open or close, although connections between controller 2906 and the switches are not shown for illustrative clarity. Isolation switches 2916 and bypass switches 2918 are analogous to isolation switches 1616 and bypass switches 1618 of FIG. 16. Accordingly, controller 2906 is configured to control isolation switches 2916 and bypass switches 2918 to cause stack 2902 and/or BMS nodes 2908 to transition between operating modes, such as a normal charge/discharge mode, a floating mode, a bypass mode, and a safe mode, in the same manner discussed above with respect to energy storage system 1600. Additionally, discharge switches 2920 and current sources 2922 are analogous to discharge switches 1620 and current sources 1622 of FIG. 16. Accordingly, controller 2906 is configured to control discharge switches 2920 to safely discharge batteries 2914 in the same manner discussed above with respect to FIG. 16. Furthermore, some embodiments of energy storage system 2900, such as embodiments omitting discharge switches 2920 and current sources 2922, are configured to safely discharge a battery 2914 via electrical load 2904 in a manner similar to that discussed above with respect to FIGS. 13A-13C.

Moreover, controller 2906 is further configured to control transfer switches 2924, 2926, and 2938 of BMS nodes 2908 to transfer charge between batteries 2914 of BMS nodes 2908 via transfer inductor 2928 and transfer capacitor 2929. For example, FIGS. 30 and 31 collectively illustrate a two-step process where charge is transferred from battery 2914(4) to battery 2914(1). Dashed-lines delineating BMS nodes 2908, as well as several reference numbers, are omitted in FIGS. 30 and 31 for illustrative clarity. Energy storage system 2900 operates in a normal charge/discharge mode during the charge transfer process of FIGS. 30 and 31. Consequently, isolation switches 2916 are closed, bypass switches 2918 are open, and discharge switches 2920 are open, in FIGS. 30 and 31.

Figure 30:
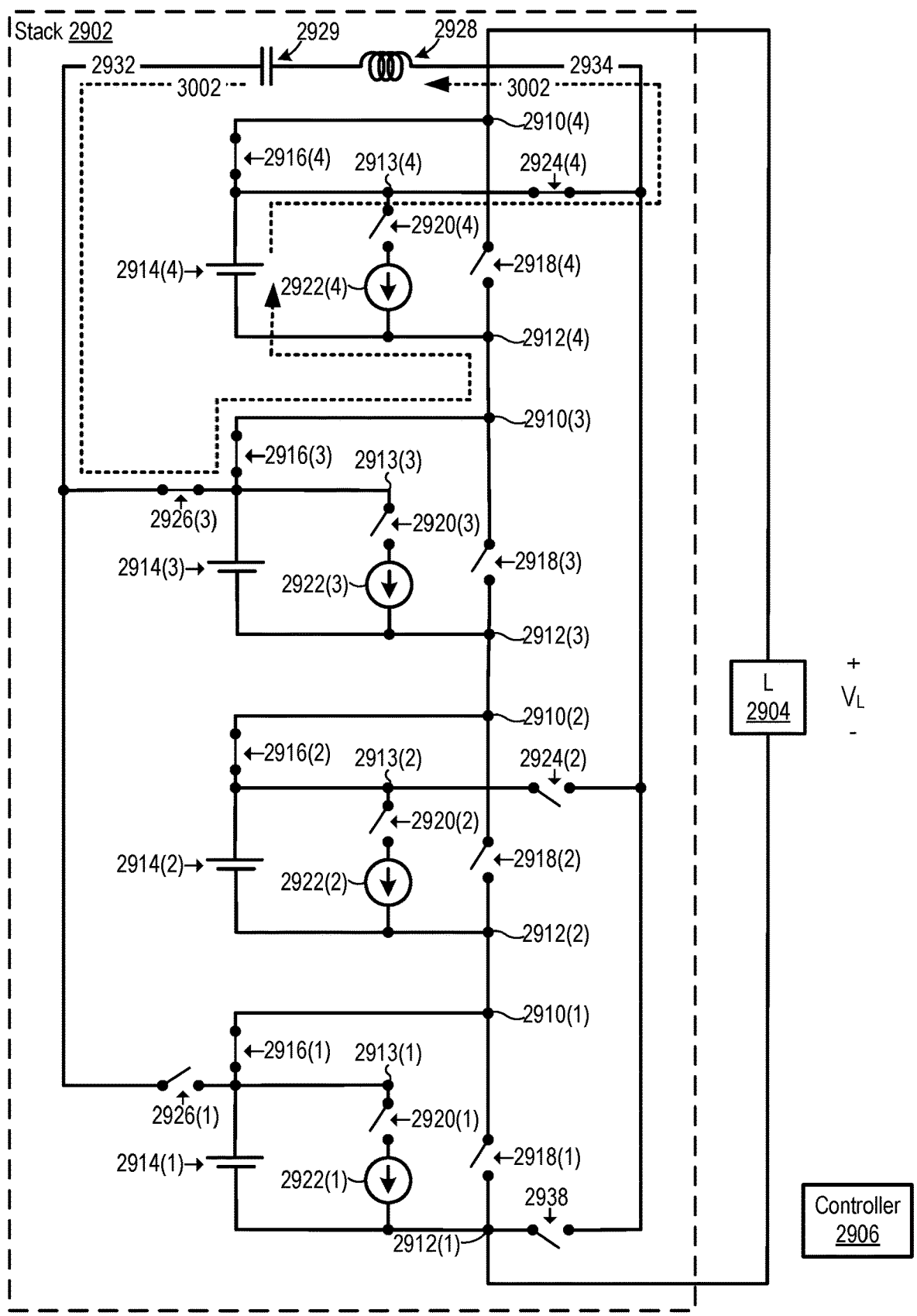
FIG. 30 illustrates a first step of a method for transferring charge between two batteries of the FIG. 29 energy storage system.
Figure 31:
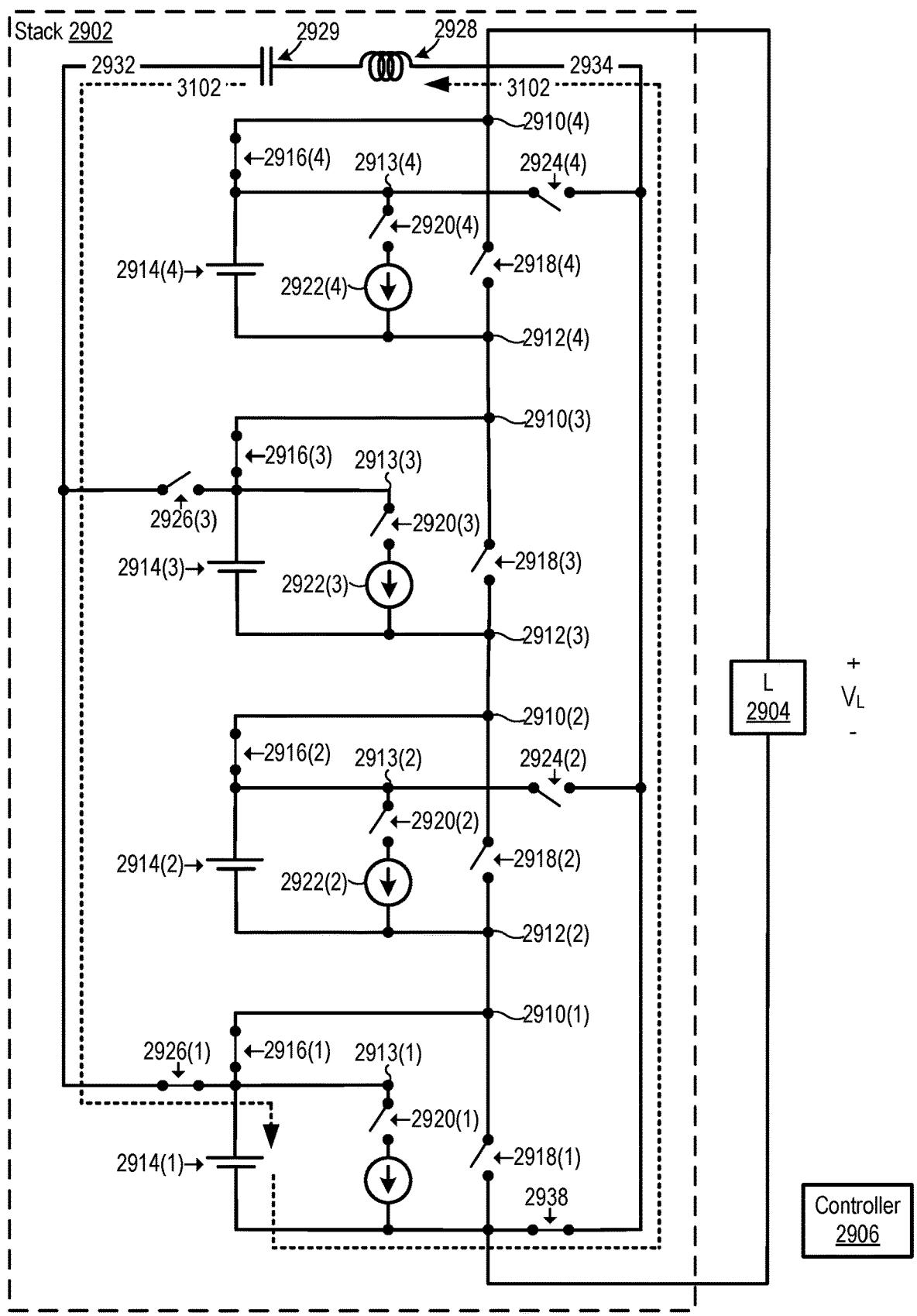
FIG. 31 illustrates a second step of the method for transferring charge between two batteries of the FIG. 29 energy storage system.

FIG. 30 illustrates energy storage system 2900 during the first step where transfer switches 2924(4) and 2926(3) are closed, and all other transfer switches are open. Consequently, a resonant circuit consisting of transfer inductor 2928 and transfer capacitor 2929 is charged from battery 2914(4), as illustrated by dotted lines 3002 illustrating current flow between battery 2914(4) and the resonant circuit. FIG. 31 illustrates energy storage system 2900 during the second step where transfer switches 2926(1) and 2938 are closed, and all other transfer switches are open. Consequently, the resonant circuit is discharged to battery 2914(1), as illustrated by dotted lines 3102 illustrating current flow between the resonant circuit and battery 2914 (4). Thus, the two steps illustrated in FIGS. 30 and 31 collectively transfer charge from battery 2914(4) to battery 2914(1) via transfer inductor 2928 and transfer capacitor 2929. In certain embodiments, controller 2906 is configured to transition operation of energy storage system 2900 between the respective steps of FIGS. 30 and 31 at a time when magnitude of current flowing through the resonant circuit is at a peak value. Similar steps to those illustrated in FIGS. 30 and 31 could be performed to transfer charge between batteries 2914 of other BMS nodes 2908 of stack 2902.

Additionally, some embodiments of energy storage system 2900 are configured to safely discharge a battery 2914, such as in response to the battery being identified as unsafe, by transferring the battery 2914's charge to one or more other batteries 2914 of stack 2902. For example, assume that battery 2914(4) is identified as being unsafe. Certain embodiments of energy storage system 2900 are configured to safely discharge battery 2914(4) by transferring its charge to battery 2914(1), and/or to one or more other batteries 2914, such as by using the procedure discussed above with respect to FIGS. 30 and 31 or a similar procedure.

Figure 32:
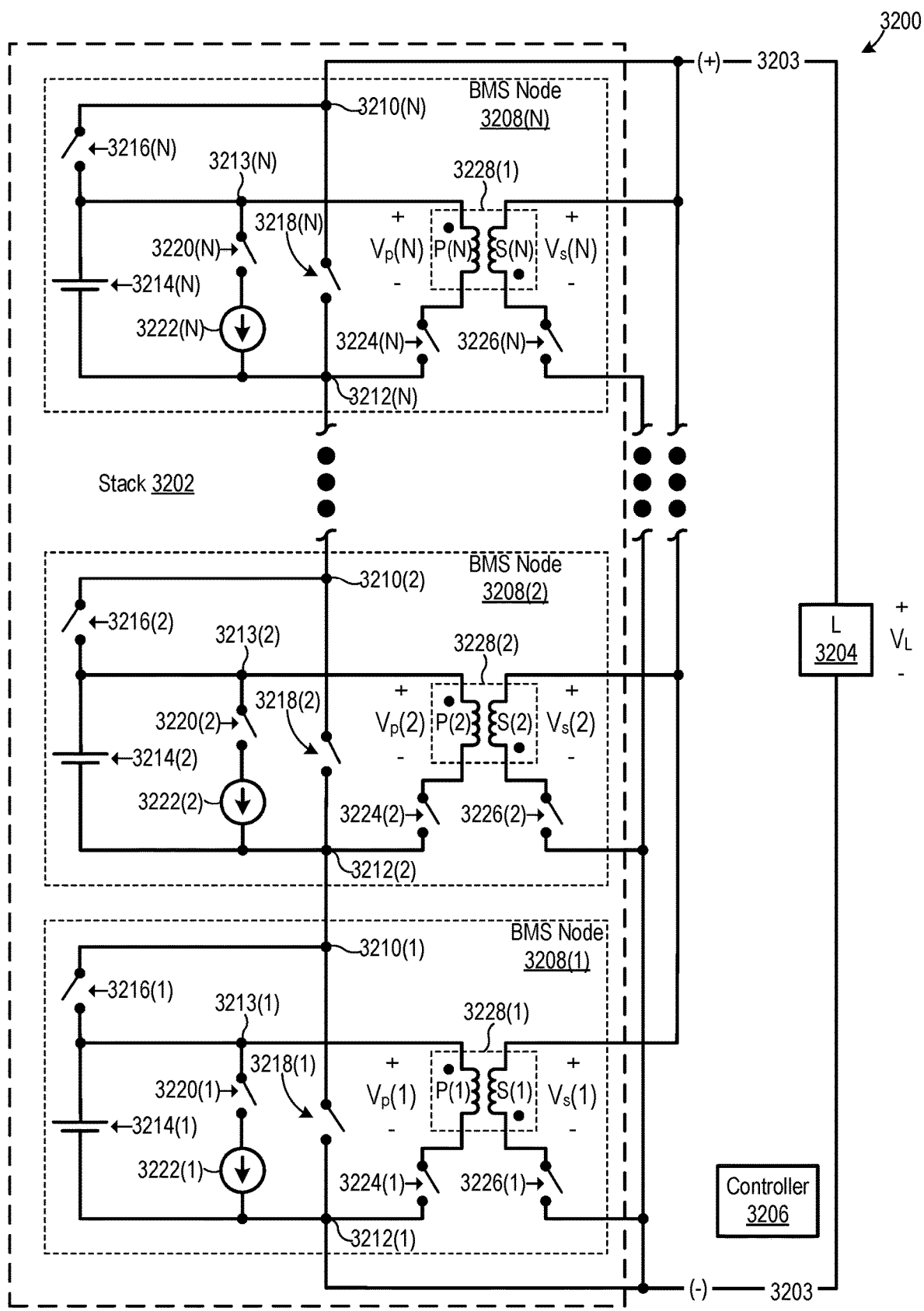
FIG. 32 is an illustrative block diagram of an example energy storage system that includes multiple BMS nodes capable of transferring charge between batteries of adjacent BMS nodes via transformers and a system bus.

FIG. 32 is an illustrative block diagram of an example energy storage system 3200 including a stack 3202, a system bus 3203, an electrical load 3204, and a controller 3206. Energy storage system 3200 could include additional stacks 3202 without departing from the scope hereof, and each stack 3202 need not have the same configuration. Electrical load 3204 is electrically coupled to stack 3202 via system bus 3203, and electrical load 3204 is analogous to electrical load 204 of FIG. 2. Accordingly, electrical load 3204 can both receive power from energy storage system 3200 as well as provide power to energy storage system 3200 for charging batteries. Controller 3206 is configured to control energy storage system 3200, and connections between controller 3206 and other elements of energy storage system 3200 are not shown for illustrative clarity. Although controller 3206 is depicted as being a single element, some embodiments of controller 3206 are embodied by two or more sub-elements that need not be disposed at a common location. For example, some embodiments of controller 3206 are at least partially embodied by a distributed computing system. Although controller 3206 is depicted as being separate from stack 3202, controller 3206 could be at least partially integrated with stack 3202. In particular embodiments, controller 3206 is analogous to stack controller 210 of FIG. 2 and/or host controller 212 of FIG. 2. In some embodiments, controller 3206 is at least partially embodied by a respective node controller (not shown) of each BMS node 3208, where the node controllers of all BMS nodes 3208 collectively perform at least some of the functions of controller 3206.

Stack 3202 includes N BMS nodes 3208, where N is an integer greater than one. Each BMS node 3208 includes a positive output node 3210, a negative output node 3212, and a battery node 3213. BMS nodes 3208 are electrically coupled in series in stack 3202 such that a positive output node 3210 of one BMS node 3208 is electrically coupled to a negative output node 3212 of an adjacent BMS node 3208. For example, positive output node 3210(1) of BMS node 3208(1) is electrically coupled to negative output node 3212(2) of adjacent BMS node 3208(2).

Each BMS node 3208 further includes a battery 3214, an isolation switch 3216, a bypass switch 3218, a primary transfer switch 3224, a secondary transfer switch 3226, and a transformer 3228. Within each BMS node 3208, battery 3214 and isolation switch 3216 are electrically coupled in series between positive output node 3210 and negative output node 3212 such that battery 3214 and isolation switch 3216 are joined at battery node 3213, and bypass switch 3218 is electrically coupled between positive output node 3210 and negative output node 3212. Each transformer 3228 includes a respective primary winding P and a respective secondary winding S. Within each BMS node 3208, primary winding P and primary transfer switch 3224 are electrically coupled in series between battery node 3213 and negative output node 3212, and secondary winding S and secondary transfer switch 3226 are electrically coupled in series across system bus 3203 (between a positive node (+) of system bus 3203 and a negative node (−) of system bus 3203). Accordingly, within each BMS node 3208, voltage $V_p$ across primary winding P is equal to voltage across battery 3214 when primary transfer switch 3224 is closed. Additionally, voltage $V_s$ across each secondary windings S is equal to voltage $V_L$ across load 3202 when the winding's respective secondary transfer switch 3226 is closed. Each BMS node 3208 optionally further includes a discharge switch 3220 and a current source 3222 electrically coupled in parallel with battery 3214 of the node.

Controller 3206 is configured to control each switch 3216, 3218, 3220, 3224, and 3226 such as to cause the switches to open or close, although connections between controller 3206 and the switches are not shown for illustrative clarity. Isolation switches 3216 and bypass switches 3218 are analogous to isolation switches 1616 and bypass switches 1618 of FIG. 16, respectively. Accordingly, controller 3206 is configured to control isolation switches 3216 and bypass switches 3218 to cause stack 3203 and/or BMS nodes 3208 to transition between operating modes, such as a normal charge/discharge mode, a floating mode, a bypass mode, and a safe mode, in the same manner discussed above with respect to energy storage system 1600. Additionally, discharge switches 3220 and current sources 3222 are analogous to discharge switches 1620 and current sources 1622 of FIG. 16, respectively. Accordingly, controller 3206 is configured to control discharge switches 3220 to safely discharge batteries 3214 in the same manner discussed above with respect to FIG. 16. Furthermore, some embodiments of energy storage system 3200, such as embodiments omitting discharge switches 3220 and current sources 3222, are configured to safely discharge a battery 3214 via electrical load 3204 in a manner similar to that discussed above with respect to FIGS. 13A-13C.

Moreover, controller 3206 is further configured to control primary and secondary transfer switches 3224 and 3226 of BMS nodes 3206 to transfer charge between batteries 3214 of adjacent BMS nodes 3208 via one or more energy storage elements electrically coupled to system bus 3203. Possible energy storage elements electrically coupled to system bus 3203 include, but are not limited to, capacitance (not shown) of electrical load 3204, batteries 3214 of stack 3203, and/or batteries of one or more additional stacks (not shown) electrically coupled to system bus 3203. Within each BMS node 3208, transformer 3228, primary transfer switch 3224, and secondary transfer switch 3226 collectively form a flyback converter which operates under the control of controller 3206. As known in the art, a transformer of a flyback converter is configured to store energy within the transformer during switching cycles of the flyback converter. Accordingly, transformers 3228 have sufficiently high leakage inductance to store energy for transfer between batteries 3214 and energy storage elements electrically coupled to system bus 3203.

Figure 33:
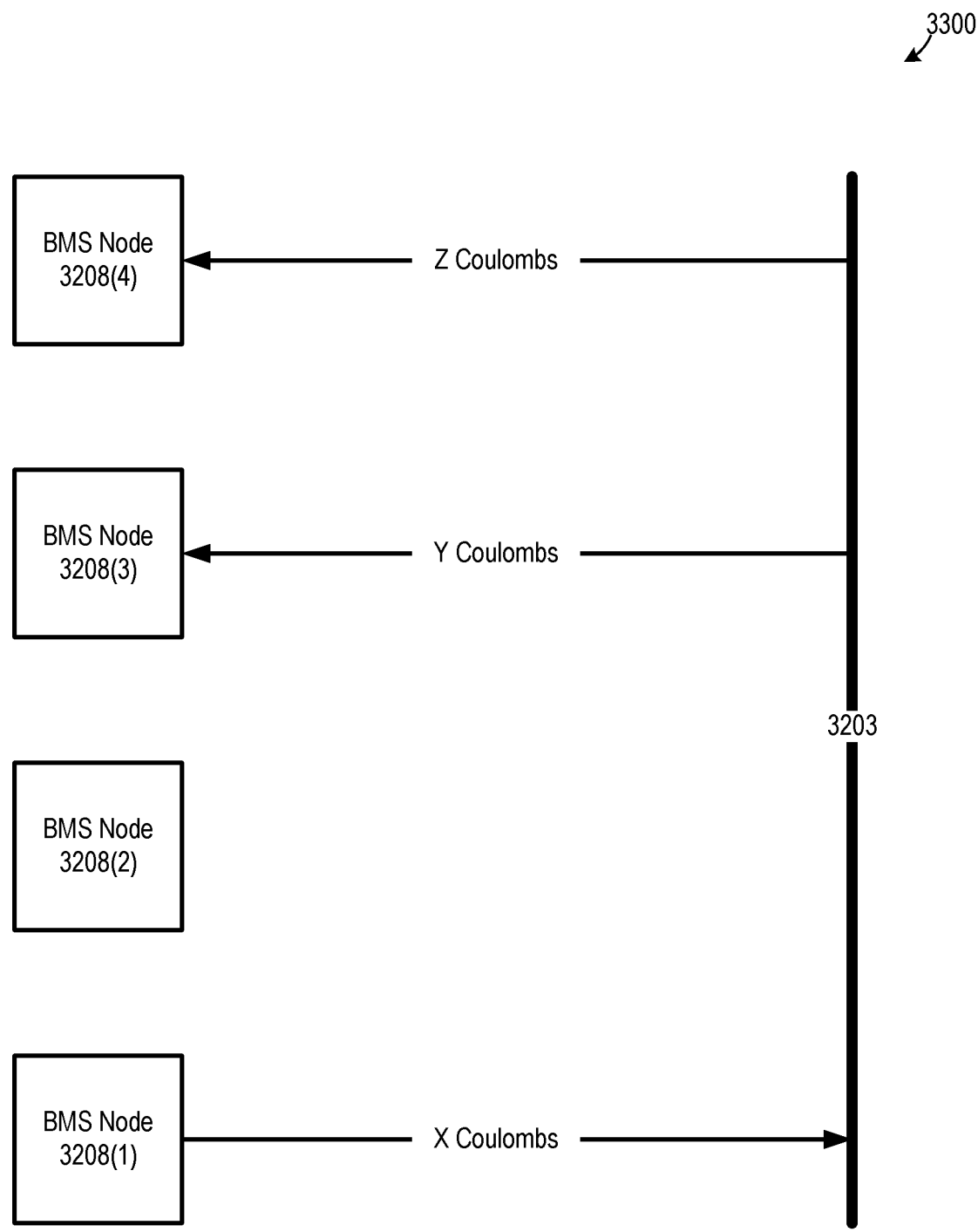
FIG. 33 is a diagram illustrating one example of charge transfer in an embodiment of the FIG. 32 energy storage system including four BMS nodes.

Controller 3206 is configured to control transfer switches 3224 and 3226 to transfer charge between batteries 3214 and energy storage elements electrically coupled to system bus 3203, such as for balancing charge among batteries 3214 and/or help ensure that each battery 3214 reaches a minimum state of charge or a maximum state of charge at approximately the same time. For example, FIG. 33 is a diagram illustrating one example of charge transfer in an embodiment of energy storage system 3200 where N is equal to four, i.e., where stack 3202 includes four BMS nodes 3208. FIG. 33 includes a respective box logically representing each BMS node 3208, as well as a vertical line logically representing system bus 3203. In the FIG. 33 scenario, battery 3214(1) of BMS node 3208 has excess charge, and controller 3206 accordingly controls transfer switches 3224(1) and 3226(1) such that transformer 3228(1) transfers X coulombs from BMS node 3208(1) to system bus 3202. Respective batteries 3214(3) and 3214(4) of BMS nodes 3208(3) and 3208(4), on the other hand, have insufficient charge. Controller 3206 accordingly controls transfer switches 3224(3) and 3226(3) such that transformer 3228(3) transfers Y coulombs from energy storage bus 3203 to BMS node 3208(3). Additionally, controller 3206 controls transfer switches 3224(4) and 3226(4) such that transformer 3228(4) transfers Z coulombs from energy storage bus 3203 to BMS node 3208(4). The three charge transfer steps depicted in FIG. 33 could occur simultaneously or they could occur at two or more different times. Additionally, while not required, in some embodiments, charge transferred from BMS nodes 3208 to system bus 3203 equals charge transferred from system bus 3203 to BMS nodes 3208, such that X Coulombs=Y Coulombs+Z Coulombs.

Additionally, some embodiments of energy storage system 3200 are configured to safely discharge a battery 3214, such as in response to the battery being identified as unsafe, by transferring the battery 3214's charge to one or more other batteries 3214 of stack 3202, and/or by transferring the battery 3214's charge to an energy storage element electrically coupled to system bus 3203. For example, assume that battery 3214(1) is identified as being unsafe. Certain embodiments of energy storage system 3200 are configured to safely discharge battery 3214(1) by transferring its charge to batteries 3214(3) and 3214(4), and/or to one or more other batteries 3214, such as by using the procedure discussed above with respect to FIG. 33 or a similar procedure.

Figure 34:
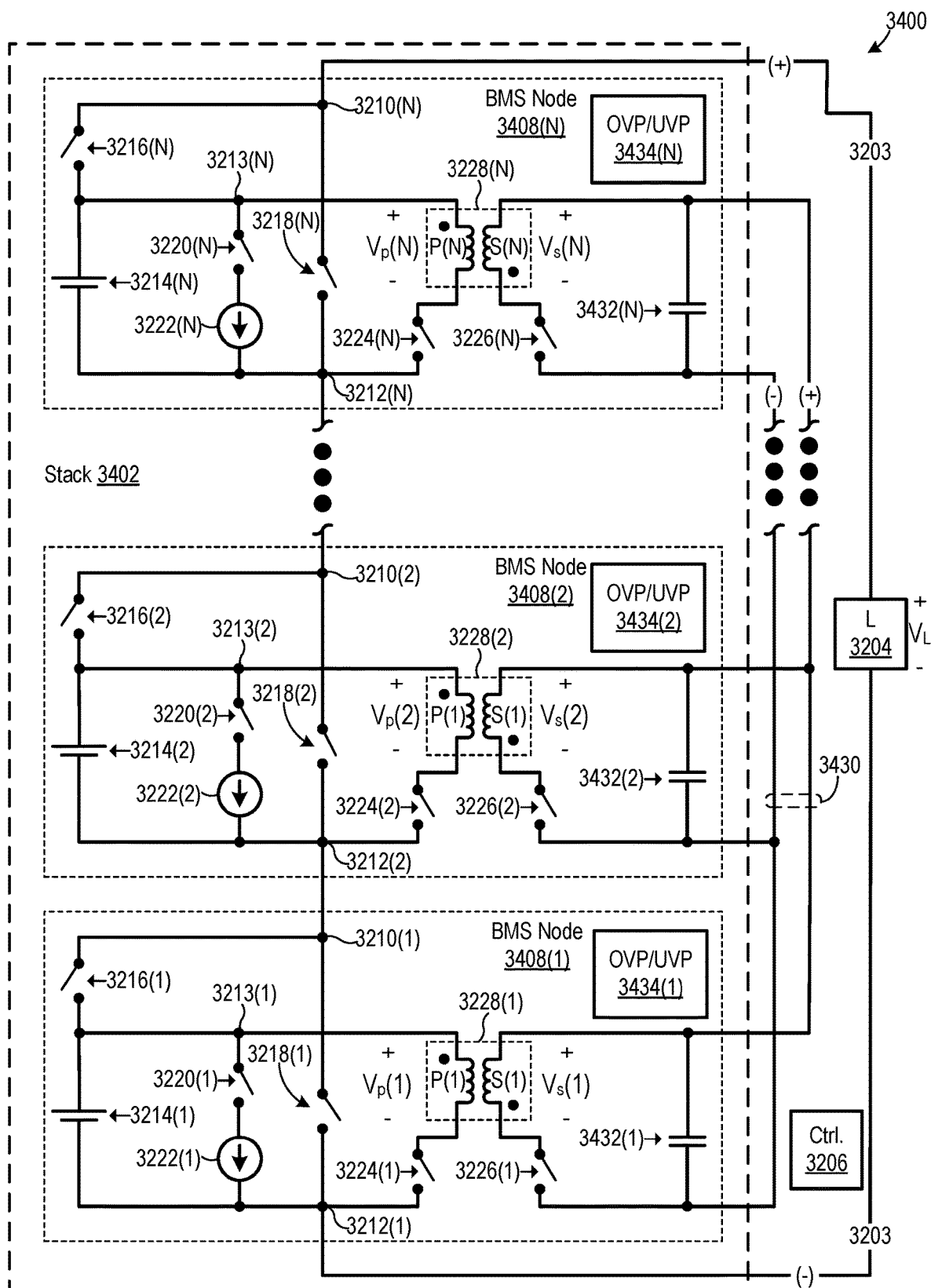
FIG. 34 is an illustrative block diagram of an alternate embodiment of the FIG. 32 energy storage system including a dedicated power transfer bus.

FIG. 34 is an illustrative block diagram of an example energy storage system 3400, which is an alternate embodiment of energy storage system 3200 of FIG. 32 including a stack 3402 of BMS nodes 3408 in place of stack 3202 of BMS nodes 3208. Additionally, energy storage system 3400 includes a power transfer bus 3430 used for transferring charge between batteries 3214, as discussed below. Power transfer bus 3430 and system bus 3203 optionally share a common negative node (−) (not shown). BMS nodes 3408 differ from BMS nodes 3208 in that within each BMS node 3408, secondary winding S and secondary transfer switch 3226 are electrically coupled in series across power transfer bus 3430, i.e., between the positive node (+) of power transfer bus 3430 and the negative node (−) of power transfer bus 3430, instead of being coupled across system bus 3203. Each BMS node 3408 optionally further includes one or more of (a) a capacitor 3432 electrically coupled across power transfer bus 3430 and (b) overvoltage protection and undervoltage protection (OVP/UVP) circuitry 3434. Capacitors 3432 provide energy storage on power transfer bus 3430, and OVP/UVP circuitry 3434 helps prevent excessively high or low voltage on power transfer bus 3430, as discussed below.

Energy storage system 3400 operates in the same manner as energy storage system 3200 except that transformers 3228 transfer charge between batteries 3214 and power transfer bus 3430, instead of transferring charge between batteries 3214 and system bus 3203. Accordingly, the FIG. 33 example scenario is applicable to energy storage system 3400, but with system bus 3203 replaced power transfer bus 3430 in FIG. 33. Additionally, some embodiments of energy storage system 3400 are configured to safely discharge a battery 3214, such as in response to the battery being identified as unsafe, by transferring the battery 3214's charge to one or more other batteries 3214 of stack 3202, and/or by transferring the battery 3214's charge to capacitors 3432 electrically coupled to power transfer bus 3430.

Voltage across power transfer bus 3430 is equal to voltage V s across each secondary winding S, and this voltage is affected by actions of BMS nodes 3408. Specifically, transfer of charge from a battery 3214 to power transfer bus 3430 raises voltage on power transfer bus 3430, and transfer of charge away from power transfer bus 3430 to a battery 3214 reduces voltage on power transfer bus 3430. Consequently, voltage on power transfer bus 3430 could rise to an excessively high value, or the voltage could fall to an excessively low value, when substantial charge is transferred to or from power transfer bus 3430. Each instance of optional OVP/UVP circuitry 3434 helps prevent excessive voltage swings on power transfer bus 3430 by preventing its respective BMS node 3408 from driving voltage on power transfer bus 3430 excessively high or low. For example, assume that BMS node 3408(2) is transferring charge from battery 3214(2) to power transfer bus 3430 and that voltage on power transfer bus 3430 rises to a maximum threshold value. OVP/UVP circuitry 3434(2) may cause BMS node 3408(2) to stop transferring charge to power transfer bus 3430 in response thereto, to prevent further rise in voltage on power transfer bus 3430. As another example, assume that BMS node 3408(1) is transferring charge from power transfer bus 3430 to battery 3214(1) such that voltage on power transfer bus 3430 falls to a minimum threshold value. OVP/UVP circuitry 3434(1) may cause BMS node 3408(1) to stop transferring charge away from power transfer bus 3430 in response thereto, to prevent further decrease in voltage on power transfer bus 3430.

Figure 35:
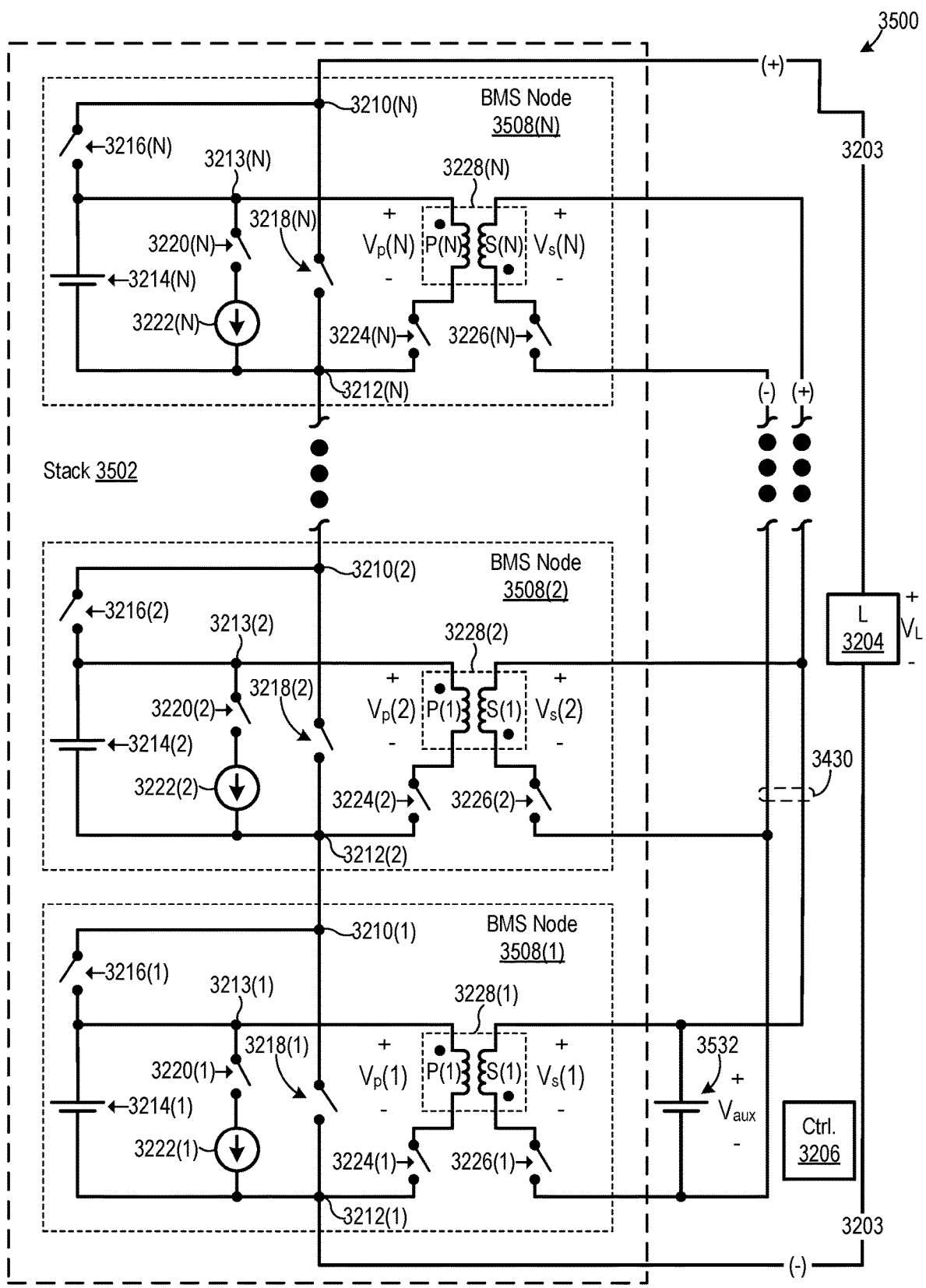
FIG. 35 is an illustrative block diagram of an alternate embodiment of the FIG. 34 energy storage system where the power transfer bus is configured to provide an auxiliary power supply rail.

FIG. 35 is an illustrative block diagram of an example energy storage system 3500, which is an alternate embodiment of energy storage system 3400 of FIG. 34 including a stack 3502 of BMS nodes 3508 in place of stack 3402 of BMS nodes 3408. Additionally, energy storage system 3500 includes a battery 3532 electrically coupled across positive terminal (+) and negative terminal (−) of power transfer bus 3430. BMS nodes 3508 of FIG. 35 are the same as BMS nodes 3408 of FIG. 34 except that BMS nodes 3508 omit capacitors 3432 and OVP/UVP circuitry 3434. Accordingly, energy storage system 3500 operates in the same manner as energy storage system 3400, except that energy storage system 3500 is configured such that controller 3206 controls operation of transfer switches 3224 and 3226 so that power transfer bus 3430 provides a regulated auxiliary power supply rail having a voltage $V_{aux}$. Additionally, some embodiments are configured to safely discharge a battery 3214, such as in response to the battery being identified as unsafe, by transferring the battery 3214's charge to one or more other batteries 3214 of stack 3202, and/or by transferring the battery 3214's charge to battery 3532 electrically coupled to power transfer bus 3430.

The auxiliary power rail is used, for example, to power one or more devices having a different voltage requirement than electrical load 3204, such as low voltage devices in automotive applications. In some embodiments, $V_{aux}$ is lower than voltage $V_L$ across electrical load 3204. For example, in particular embodiments, $V_L$ is hundreds or even thousands of volts, while $V_{aux}$ is less than one hundred volts (e.g., 12 volts, 18 volts, 24 volts, 48 volts, etc.). Battery 3532 is optionally an automobile battery in automotive applications of energy storage system 3500.

The above description is presented to enable any person skilled in the art to create and use safe battery energy management systems, safe battery management system nodes, and associated methods. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of examples in accordance with the present invention are merely illustrative of the principles of the invention. Therefore, it will be understood that various modifications can be made to the embodiments by those skilled in the art without departing from the spirit and scope of the invention, which is defined in the appended claims.

What is claimed is:

1. A first battery management system (BMS) node with reverse voltage failure mode protection, comprising:
    a battery including a positive terminal and a negative terminal;
    a direct-current to direct-current (DC-DC) converter including an output port configured to be electrically coupled in series with at least a second BMS node;
    a first isolation switch electrically coupling the battery to the DC-DC converter and configured to selectively connect and disconnect the battery from the DC-DC converter; and
    a second isolation switch configured to prevent flow of electric current in event of a short circuit between the first BMS node and the second BMS node.

2. The first BMS node of claim 1, further including a controller configured to open each of the first and second isolation switches in response to a signal to electrically isolate the battery.

3. The first BMS node of claim 1, wherein the first isolation switch is electrically coupled between the positive terminal of the battery and the DC-DC converter, and the second isolation switch is electrically coupled between the negative terminal of the battery and the DC-DC converter.

4. The first BMS node of claim 1, wherein:
    the first isolation switch includes a first transistor including a first body diode, an anode of the first body diode being connected to the DC-DC converter, and a cathode of the first body diode being connected to the positive terminal of the battery; and
    the second isolation switch includes a second transistor including a second body diode, an anode of the second body diode being connected to the negative terminal of the battery, and a cathode of the second body diode being connected to the DC-DC converter.

5. The first BMS node of claim 1, wherein the second isolation switch is electrically coupled to the output port of the DC-DC converter.

6. The first BMS node of claim 1, wherein:
    the first isolation switch includes a first transistor electrically coupled between the positive terminal of the battery and the DC-DC converter, the first transistor including a first body diode, an anode of the first body diode being electrically coupled to the DC-DC converter, and a cathode of the first body diode being electrically coupled to the battery; and
    the second isolation switch includes a second transistor including a second body diode, a cathode of the second body diode being connected to a positive terminal of the output port of the DC-DC converter.

7. The first BMS node of claim 1, wherein:
    the first isolation switch includes a first transistor electrically coupled between the negative terminal of the battery and the DC-DC converter, the first transistor including a first body diode, an anode of the first body diode being electrically coupled to the negative terminal of the battery, and a cathode of the first body diode being electrically coupled to the DC-DC converter; and
    the second isolation switch comprises a second transistor including a second body diode, a cathode of the second body diode being connected to a positive terminal of the output port of the DC-DC converter.

8. The first BMS node of claim 1, wherein the DC-DC converter is capable of operating as one or more of a boost converter and a buck converter.

9. A battery management system (BMS) stack, comprising:
    a first BMS node, including a first battery with a positive terminal and a negative terminal, a first direct-current to direct-current (DC-DC) converter, and a first isolation switch electrically coupling one of the positive and negative terminals of the first battery to the first DC-DC converter; and
    a second BMS node, including a second battery with a positive terminal and a negative terminal, a second DC-DC converter, a second isolation switch electrically coupling one of the positive and negative terminals of the second battery to the second DC-DC converter, and a third isolation switch configured to prevent flow of electric current in event of a short circuit between the first and second battery management system nodes.

10. The BMS stack of claim 9, wherein the first isolation switch is electrically coupled between the positive terminal of the first battery and the first DC-DC converter, the second isolation switch is electrically coupled between the positive terminal of the second battery and the second DC-DC converter, and the third isolation switch is electrically coupled between the negative terminal of the second battery and the second DC-DC converter.

11. The BMS stack of claim 9, wherein the third isolation switch includes a transistor including a body diode, an anode of the body diode being connected to the negative terminal of the second battery, and a cathode of the body diode being connected to the second DC-DC converter.

12. The BMS stack of claim 9, wherein the third isolation switch is electrically coupled to an output port of the second DC-DC converter.

13. The BMS stack of claim 12, wherein the third isolation switch includes a transistor including a body diode, a cathode of the body diode being connected to a positive terminal of the output port of the second DC-DC converter.

14. The BMS stack of claim 9, wherein each of the first DC-DC converter and the second DC-DC converter is capable of operating as one or more of a boost converter and a buck converter.

15. A battery management system (BMS) stack, comprising:
 a first BMS node, including:
  a first switch and a second switch electrically coupled in series,
  a first battery,
  a first inductor electrically coupled between a positive terminal of the first battery and an electrical node joining the first switch and the second switch, and
  a third switch electrically coupled in series with the first battery and the first inductor; and
 a second BMS node, including:
  a fourth switch and a fifth switch electrically coupled in series with the first switch and the second switch,
  a second battery,
  a second inductor electrically coupled between a positive terminal of the second battery and an electrical node joining the fourth switch and the fifth switch,
  a sixth switch electrically coupled in series with the second battery and the second inductor, and
  an isolation switch configured to prevent flow of electric current in event of a short circuit between the first battery and a negative electrical node of the second BMS node.

16. The BMS stack of claim 15, wherein the isolation switch is electrically coupled in series with the third switch.

17. The BMS stack of claim 16, wherein the isolation switch comprises a transistor including a body diode, the transistor being arranged such that the body diode has an orientation preventing an electric current flowing into a negative terminal of the first battery from flowing through the body diode.

18. The BMS stack of claim 15, wherein the isolation switch is electrically coupled between the second switch and the fourth switch.

19. The BMS stack of claim 18, wherein the isolation switch comprises a transistor including a body diode, the transistor being arranged such that the body diode has an orientation preventing an electric current flowing from the first BMS node to the second BMS node from flowing through the body diode.

20. The BMS stack of claim 15, wherein:
 the first switch, the second switch, and the first inductor form at least part of a first direct-current to direct-current (DC-DC) converter; and
 the fourth switch, the fifth switch, and the second inductor form at least part of a second DC-DC converter.

* * * * *